United States Patent
Saldin et al.

(10) Patent No.: US 11,749,078 B2
(45) Date of Patent: Sep. 5, 2023

(54) INTEGRATED SECURITY SYSTEM

(71) Applicant: Resolution Products, LLC, St. Paul, MN (US)

(72) Inventors: Paul G. Saldin, Stillwater, MN (US); Josh Gathje, St Paul, MN (US); Bryan Peterson, St. Paul, MN (US); Kevin Stebbins, St. Paul, MN (US); Eric Lofstad, St. Paul, MN (US); David J. Mayne, Eagan, MN (US)

(73) Assignee: Resolution Products, LLC, St. Paul, MN (US)

( * ) Notice: Subject to any disclaimer, the term of this patent is extended or adjusted under 35 U.S.C. 154(b) by 0 days.

(21) Appl. No.: 17/601,676

(22) PCT Filed: Apr. 6, 2020

(86) PCT No.: PCT/US2020/026934
§ 371 (c)(1),
(2) Date: Oct. 5, 2021

(87) PCT Pub. No.: WO2020/206453
PCT Pub. Date: Oct. 8, 2020

(65) Prior Publication Data
US 2022/0180730 A1 Jun. 9, 2022

Related U.S. Application Data

(60) Provisional application No. 62/874,283, filed on Jul. 15, 2019, provisional application No. 62/874,230, (Continued)

(51) Int. Cl.
*H04L 67/125* (2022.01)
*G08B 13/196* (2006.01)
(Continued)

(52) U.S. Cl.
CPC ... *G08B 13/19658* (2013.01); *G08B 13/1966* (2013.01); *G08B 13/19656* (2013.01);
(Continued)

(58) Field of Classification Search
CPC .................................................. H04L 12/2825
See application file for complete search history.

(56) References Cited

U.S. PATENT DOCUMENTS 4,855,713 A   8/1989   Brunius
5,801,626 A   9/1998   Addy
(Continued)

OTHER PUBLICATIONS

International Search Report and Written Opinion in International Appln. No. PCT/US2020/26934, dated Aug. 12, 2020, 17 pages.
(Continued)

*Primary Examiner* — Hua Fan
(74) *Attorney, Agent, or Firm* — Barnes & Thornburg LLP

(57) ABSTRACT

A security system is provided to integrate a local existing security system with other security and automation devices which may not be compatible with the existing security system. The security system can connect and integrate an existing security system, and provide a centralized point of controlling all existing and new security and automation devices in a premise, thereby allowing flexibility in modifying and expanding a security system in the premise without need of replacing the security system that has been already installed throughout the premise. The security system can at least partially self-program to communicate with an existing security system when the security system is connected to the existing security system.

20 Claims, 39 Drawing Sheets

Related U.S. Application Data filed on Jul. 15, 2019, provisional application No. 62/874,480, filed on Jul. 15, 2019, provisional application No. 62/874,270, filed on Jul. 15, 2019, provisional application No. 62/874,256, filed on Jul. 15, 2019, provisional application No. 62/830,359, filed on Apr. 5, 2019.

(51) Int. Cl.
*H04L 45/24* (2022.01)
*G08B 25/10* (2006.01)
*G08B 25/14* (2006.01)
*H04L 12/28* (2006.01)
*H04L 67/12* (2022.01)

(52) U.S. Cl.
CPC . *G08B 13/19678* (2013.01); *G08B 13/19695* (2013.01); *G08B 25/10* (2013.01); *G08B 25/14* (2013.01); *H04L 12/2825* (2013.01); *H04L 45/24* (2013.01); *H04L 67/125* (2013.01); *H04L 67/12* (2013.01)

(56) References Cited

U.S. PATENT DOCUMENTS

| | | | |
|---|---|---|---|
| 6,519,325 B1 | 2/2003 | Pildner et al. | |
| 6,624,750 B1 | 9/2003 | Marman | |
| 7,030,752 B2 * | 4/2006 | Tyroler | G06F 21/82 340/539.1 |
| 7,262,690 B2 | 8/2007 | Heaton | |
| 7,449,999 B2 | 11/2008 | Hevia et al. | |
| 7,633,385 B2 | 12/2009 | Cohn | |
| 7,855,635 B2 | 12/2010 | Cohn | |
| 7,956,736 B2 * | 6/2011 | Cohn | G05B 23/027 340/506 |
| 8,073,931 B2 | 12/2011 | Dawes | |
| 8,335,842 B2 | 12/2012 | Raji | |
| 8,456,278 B1 | 6/2013 | Bergman et al. | |
| 8,473,619 B2 | 6/2013 | Baum | |
| 8,478,844 B2 | 6/2013 | Baum | |
| 8,478,871 B2 | 7/2013 | Gutt | |
| 8,612,591 B2 | 12/2013 | Dawes | |
| 8,638,211 B2 | 1/2014 | Cohn | |
| 8,649,386 B2 | 2/2014 | Ansari et al. | |
| 8,779,919 B1 * | 7/2014 | Darling | G08B 25/004 340/539.16 |
| 8,970,368 B2 | 3/2015 | Bergman | |
| 9,141,276 B2 | 9/2015 | Dawes | |
| 9,412,248 B1 * | 8/2016 | Cohn | H04L 67/125 |
| 10,311,359 B2 | 6/2019 | Seemann et al. | |
| 10,516,765 B2 | 12/2019 | Seemann et al. | |
| 2004/0009751 A1 | 1/2004 | Michaelis et al. | |
| 2004/0204019 A1 | 10/2004 | Addy et al. | |
| 2005/0232186 A1 | 10/2005 | Karaoguz et al. | |
| 2006/0072542 A1 | 4/2006 | Sinnreich et al. | |
| 2008/0042826 A1 | 2/2008 | Hevia et al. | |
| 2009/0070681 A1 * | 3/2009 | Dawes | H04N 7/181 345/173 |
| 2009/0077622 A1 | 3/2009 | Baum et al. | |
| 2009/0233602 A1 | 9/2009 | Hughes | |
| 2010/0277300 A1 | 11/2010 | Cohn et al. | |
| 2010/0290424 A1 | 11/2010 | Collingrige | |
| 2010/0323665 A1 | 12/2010 | Ibe et al. | |
| 2012/0075469 A1 | 3/2012 | Oskin | |
| 2013/0051395 A1 | 2/2013 | Hansen et al. | |
| 2014/0115142 A1 | 4/2014 | Peng et al. | |
| 2014/0156819 A1 | 6/2014 | Cavgalar | |
| 2014/0173692 A1 | 6/2014 | Srinivasan et al. | |
| 2014/0207707 A1 | 7/2014 | Na et al. | |
| 2014/0340717 A1 | 11/2014 | Meiyappan | |
| 2015/0049189 A1 | 2/2015 | Yau et al. | |
| 2015/0098375 A1 | 4/2015 | Ree | |
| 2015/0170506 A1 | 6/2015 | Bergman | |
| 2015/0242455 A1 | 8/2015 | N et al. | |
| 2016/0100023 A1 | 4/2016 | Kim | |
| 2016/0182535 A1 | 6/2016 | Probin et al. | |
| 2016/0351036 A1 | 12/2016 | Saldin et al. | |
| 2017/0127124 A9 | 5/2017 | Wilson et al. | |
| 2017/0257257 A1 * | 9/2017 | Dawes | H04L 67/025 |
| 2017/0352255 A1 * | 12/2017 | Sweeney | G08B 25/10 |
| 2018/0137727 A1 * | 5/2018 | Barth | G08B 25/14 |
| 2018/0191720 A1 | 7/2018 | Dawes | |
| 2018/0357902 A1 | 12/2018 | Altintas et al. | |
| 2019/0045021 A1 * | 2/2019 | Burd | H04L 12/2818 |
| 2019/0141506 A1 | 5/2019 | Saldin | |
| 2020/0106532 A1 | 4/2020 | Leather et al. | |
| 2020/0195574 A1 | 6/2020 | Hoffman et al. | |
| 2020/0344586 A1 | 10/2020 | Saldin | |
| 2021/0014338 A1 * | 1/2021 | Lamb | H04W 52/0277 |
| 2021/0097837 A1 | 4/2021 | Saldin et al. | |
| 2021/0099430 A1 | 4/2021 | Saldin et al. | |
| 2021/0100069 A1 | 4/2021 | Saldin et al. | |
| 2021/0217415 A1 * | 7/2021 | Nallaperumal | H04L 12/2816 |

OTHER PUBLICATIONS

International Preliminary Report on Patentability in International Appln. No. PCT/US2020/26934, dated Oct. 14, 2021, 13 pages.

* cited by examiner

PACKET PROTOCOL #1

| BIT NOS. | NUMBER OF BITS | NAME / FUNCTION |
|---|---|---|
| B0-B14 | 15 | 1 PRE-START BIT AND 14 SYNCHRONIZATION BITS |
| B15 | 1 | START BIT |
| B16-B39 | 24 | UNIQUE IDENTIFY CODE FOR SENSOR (DEVICE ID) |
| B40 | 1 | SENSOR STATE INFORMATION — PIN 1 |
| B41 | 1 | SENSOR STATE INFORMATION — PIN 2 |
| B42 | 1 | SENSOR STATE INFORMATION — PIN 3 |
| B43 | 1 | SENSOR STATE INFORMATION — PIN 4 |
| B44 | 1 | SENSOR STATE INFORMATION — LOW BATTERY |
| B45 | 1 | SENSOR STATE INFORMATION — SUPERVISORY |
| B46 | 1 | SENSOR STATE INFORMATION — POWER-UP |
| B47 | 1 | SENSOR STATE INFORMATION — SUPERVISORY SIGNAL CAPABILITY |
| B48-B63 | 16 | CYCLICAL REDUNDANCY CHECK (CRC) FOR ERROR CHECKING |

FIG. 6A

| PACKET PROTOCOL #2 | | |
|---|---|---|
| BIT NOS. | NUMBER OF BITS | NAME / FUNCTION |
| B0-B14 | 15 | SYNCHRONIZATION BITS |
| B15 | 1 | START BIT |
| B16-B35 | 20 | UNIQUE IDENTIFY CODE FOR SENSOR (DEVICE ID) |
| B36-B39 | 4 | DEVICE TYPE |
| B40-B42 | 3 | PACKET COUNT BITS |
| B43 | 1 | SENSOR STATE INFORMATION — LOW BATTERY |
| B44 | 1 | SENSOR STATE INFORMATION — F1 STATE |
| B45 | 1 | SENSOR STATE INFORMATION — F1 LATCH |
| B46 | 1 | SENSOR STATE INFORMATION — F2 STATE |
| B47 | 1 | SENSOR STATE INFORMATION — F2 LATCH |
| B48 | 1 | SENSOR STATE INFORMATION — F3 STATE |
| B49 | 1 | SENSOR STATE INFORMATION — F3 LATCH |
| B50 | 1 | SENSOR STATE INFORMATION — F4 STATE |
| B51 | 1 | SENSOR STATE INFORMATION — F4 LATCH |
| B52 | 1 | SENSOR STATE INFORMATION — F5 POSITIVE LATCH |
| B53 | 1 | SENSOR STATE INFORMATION — F5 STATE |
| B54 | 1 | SENSOR STATE INFORMATION — F5 NEGATIVE LATCH |
| B55-B57 | 8 | PARITY BITS FOR ERROR CHECKING |
| B58 | 1 | STOP BIT |

FIG. 6B

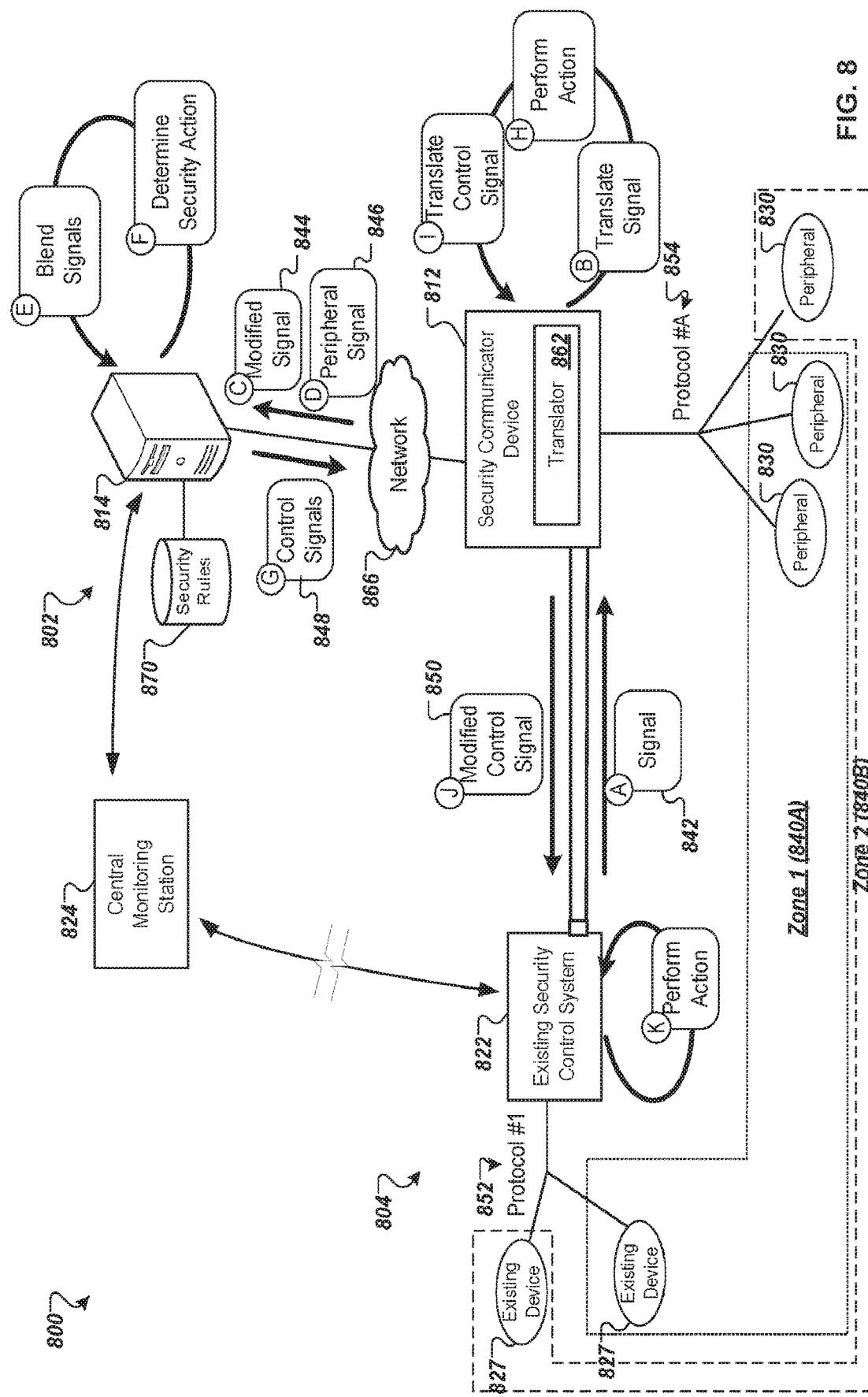

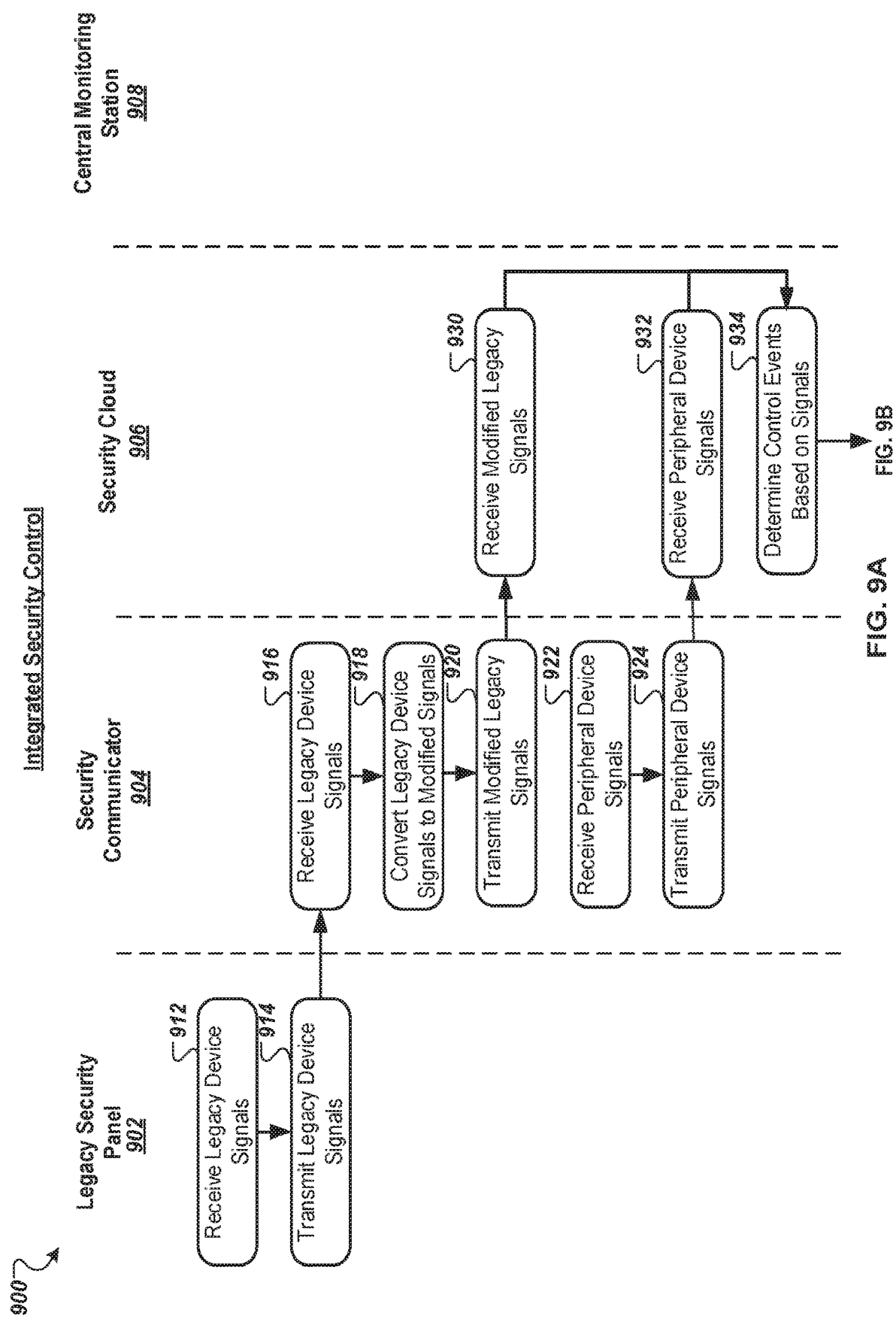

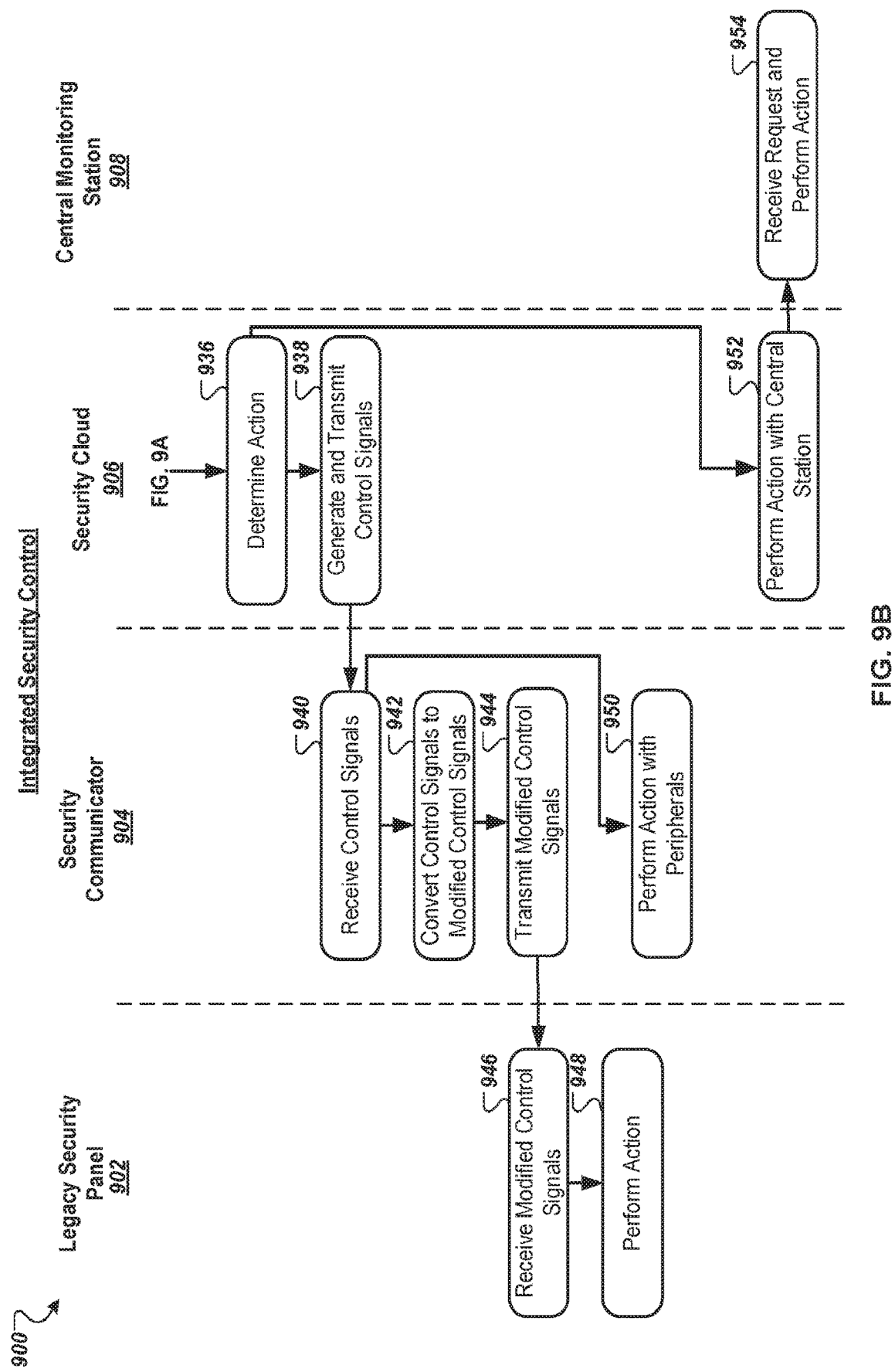

INTEGRATED SECURITY SYSTEM

CROSS-REFERENCE TO RELATED APPLICATION

This application is a National Stage Application under 35 U.S.C. § 371 of International Application No. PCT/US2020/026934, filed on Apr. 6, 2020, which claims priority to U.S. Provisional Patent Application Ser. Nos. 62/830,359, filed on Apr. 5, 2019, 62/874,480, filed on Jul. 15, 2019, 62/874,230, filed Jul. 15, 2019, 62/874,256, filed Jul. 15, 2019, 62/874,270, filed Jul. 15, 2019, and 62/874,283, filed Jul. 15, 2019. This disclosure of the prior applications is considered part of the disclosure of this application, and is incorporated in its entirety into this application.

TECHNICAL FIELD

This document describes devices, systems, and methods related to home security.

BACKGROUND

Home security systems have included a control panel that manages communications with devices, such as door and window sensors, locks, alarms, lighting, motion detectors, security cameras, etc., throughout the house using particular communication protocols. The control panel may communicate with one or more remote devices or central stations using particular communication protocols.

Home automation is building automation for a home, called a smart home or smart house. A home automation system will control lighting, climate, entertainment systems, and appliances. It may also include home security such as access control and alarm systems. Devices in such home automation can be connected with the Internet. For example, a home automation system may connect controlled devices to a central hub or gateway. The user interface for control of the system uses either wall-mounted terminals, tablet or desktop computers, a mobile phone application, or a Web interface, that may also be accessible off-site through the Internet.

For a variety of reasons, it is often desirable to upgrade an existing security system to include additional or different forms of protection. This may be the case if, for example, a facility (for example, a home, commercial facility, etc.) has expanded in size, the system in place has some features that are undesirable for the facility owner or operator, or the facility owner or operator wishes to have a different monitoring company in charge of the facility (for example, a monitoring company that charges a lower monthly fee), and that monitoring company requires a particular system control device with which to communicate. In such a case, it may be desirable to switch the existing system control device to a control device that has some advantage that is valuable to the facility owner or operator. However, an existing system control device and a new control device may be only able to detect and receive transmissions from sensors that have particular data packet protocols and definitional parameters that are specifically designed to work with the existing system control device and the new control device, respectively. That said, it is also not desirable to have to discard entirely an entire existing security system simply to migrate to a different system control device.

SUMMARY

Some embodiments described herein include a home security system that integrates a local existing security system with other security and automation devices which may not be compatible with the existing security system. For example, an existing security system, which has been used for a while, may be outdated with limited capabilities (e.g., a security alarm functionality only) and without support of additional functionalities to meet changing security environments in a premise. Some embodiments of the home security system described herein are configured to connect and integrate such an existing security system, and provide a centralized point of controlling all existing and new security and automation devices in a premise. This allows flexibility in modifying and expanding a security system in the premise without need of replacing the security system that has been already installed throughout the premise.

In some examples, a home security system provides a cloud-based security integration system configured to integrate a local security system with other security and automation devices that exist in parallel with the local security system or are later added in a premise. The integration system can include a security cloud server and a security communicator device that communicates with the security cloud server. The security communicator device can be in the form of a security panel.

Some embodiments of the security communicator device can be configured to connect with an existing home security system to upgrade or "takeover" the existing home security system, such as to enhance the system with one or more additional features. For example, the security communicator device can be wired to a control panel (e.g., a keypad) of the existing home security system to tap a data bus and/or telephone lines of the existing local security system. In addition, the security communicator device includes a communication interface (e.g., a local area network (LAN) interface) configured to communicate with one or more security and automation components at the premise.

The security communicator device can include a communication interface configured to communicate with a security cloud server. In some implementations, the security communicator device can include a plurality of communication interfaces that can be selectively used to connect to the security cloud server or other remote computing devices. The plurality of communication interfaces can include interfaces for one or more broadband protocols (e.g., Ethernet, Wi-Fi, and other suitable wired or wireless network protocols) and a cellular network of one or more protocols (e.g., CDMA, TDMA, GSM, etc.). The security communicator device can be configured to select one of the plurality of communication interfaces based on one or more factors, such as availability, quality, speed, cost of utilizing communication paths, and other requirements. In addition or alternatively, the security communicator device can be configured to select communication path priorities through preferences established in a network services platform. In some implementations, the security communicator device is configured to automatically switch to an available communication path to maintain connection to the security cloud server for intended functionalities (e.g., alarm reporting).

Some embodiments of the home security system can include one or more user controllers that are remote and connected to the security communicator device. The user controllers provide a user interface for a user to interact with the home security system including, for example, the existing local security system, the security communicator device, the security cloud server, and other security and automation devices connected to the existing local security system, the security communicator device, and/or the security cloud server. For example, the user controllers can include a touch screen that displays information about the home security system and provides control elements (e.g., GUI buttons) to receive user inputs.

Some embodiments of the security communicator device can be connected to additional security devices, such as video cameras, sensors, and home automation devices, user's mobile devices, and a central station. The security communicator device can collect data from the existing local security system, as well as data from other connected devices, and transmit them to the security cloud server so that the security cloud server can provide integrated security service.

Some embodiments of the security communicator device can at least partially self-program to communicate with an existing panel in the existing security platform when the security communicator device is connected to the existing panel. For example, when an installer connects a security communicator device to an existing panel at the premises, the security communicator device can automatically detect a type (e.g., a protocol) of the existing panel, and adapt itself to permit for communication with the existing panel to take over at least partially the features and functionalities of the existing panel. Such automatic detection and configuration may facilitate installation with the existing security platform without complicating setups and configurations.

Particular embodiments described herein include a device for enhancing a security system for a premises that includes a security control panel located at the premises. The device may include data bus terminal, ring and tip terminal, a communications interface, and a controller. The data bus terminal are configured to be wired to a data bus of the security control panel. The security control panel receives and transmits signals over the data bus related to security system. The security control panel can be communicatively connected to and receive information on sensed conditions in or around the premises from security sensors positioned at the premises. The ring and tip terminal is configured to be wired to a telephone line from the security control panel. The security control panel is configured to use the telephone line to report security alarms to a remote central monitoring system. The communications interface is configured to be connected to one or more devices or systems that are not supported directly by the security control panel. The controller is configured to enhance the security system for the premises by, at least, (i) obtaining security information from the security control panel via the data bus terminals and the ring and tip terminals and (ii) augmenting the security information with additional security information received from the one or more devices or systems over the communications interface.

In some implementations, the system can optionally include one or more of the following features.

The one or more devices or systems may include a remote server system that, in part, provides enhanced security features for the security system. The communications interface may provide communication with the remote server system. The communications interface may include a wireless communication interface through which the controller communicates with the remote server system over one or more wireless communication channels. The wireless communication interface may include a cellular communication interface and the one or more wireless communication channels include a cellular communication network. The cellular communication networks may include a mobile data network. The wireless communication interface may include a Wi-Fi communication interface and the one or more wireless communication channels include a Wi-Fi network.

The wireless communication interface may include a Bluetooth communication interface and the one or more wireless communication channels include a Bluetooth network. The communications interface may include a wired communication interface through which the controller communicates with the remote server system over one or more wired communication channels. The wired communication interface may include an Ethernet interface and the one or more wired communication channels include a local Ethernet network.

In some implementations, the security control panel does not include communication components capable of communicating with the remote server system or communicating with the remote central monitoring system beyond the telephone line.

A connection between the security control panel and the remote central monitoring system may be severed by the telephone line of the security control panel being connected to the ring and tip terminals. The remote server system may be communicatively connected to the remote central monitoring system and configured to determine whether to transmit security alarms to the remote central monitoring system based on the security information and the additional security information.

In some implementations, the security control panel does not include additional interfaces for communicating with the remote central monitoring system beyond the telephone line.

The one or more devices or systems may include wireless sensors that are different from the security sensors. The communications interface may include a wireless sensor interface that is configured to communicate with wireless sensors that are located in or around the premises. The additional information may include additional sensed conditions for the premises as sensed by the wireless sensors. In some implementations, the security control panel does not support direct enrollment of at least a portion of the wireless sensors. The controller may further be configured to enroll at least one of the wireless sensors with the security control panel via an selected protocol translation layer for translating between protocols used by the at least one of the wireless sensors and the security control panel.

The controller may be further configured to automatically detect a communication protocol used by the security control panel and to automatically configure communication with the security control panel by analyzing signals transmitted over the data bus terminal and the ring and tip terminal. Automatically configuring may include enrolling the device with the security panel using the detected communication protocol. Automatic detection of the communication protocol may include detecting the signals transmitted by the security panel, analyzing the signals to detect one or more aspects of the signal, and selecting the communication protocol from among a plurality of communication protocols based on the aspects of the signals. The aspects of the signal may include one or more of modulation types, frequency shifts, differential signals, data rates, data pack lengths, error checking, ports being used, and/or other suitable physical and/or logical aspects of data in the signal. The communication protocol used by the security control panel may be detected, at least in part, by transmitting one or more test signals over the data bus and identifying response signals, or the absence thereof, received from the security control panel. The communication protocol used by the security control panel may be detected, at least in part, by simulating a telephone service over ring and tip terminal and detecting a telephone protocol used by the security control panel over the telephone line. The telephone protocol may be selected from among a group of potential telephone protocols, including Control ID, SIA, and 4/2.

The one or more devices or systems may include a wireless user interface device that provides a user interface on premises for the security system. The communications interface may include a wireless communication interface that is configured to wirelessly communicate with the wireless user interface device to provide status information for the security system and to receive user control commands for the security system. The wireless user interface device may include a wireless touchpad device that replaces a preexisting user interface device that was connected to the security control panel. In some examples, the preexisting user interface device had a wired connection to the security control panel over the data bus that was disconnected and replaced by the wired connection to the data bus terminal. The status information may include the security information from the security control panel and the additional security information received from other devices that are connected via the communication interface. Other devices may include wireless sensors that are enrolled via the communication interface and that are not capable of being enrolled with the security control panel. The wireless user interface device may include smartphone or tablet computing device running an application specially programmed for wireless communication with the device via the communication interface.

In some implementations, the security control panel may be a preexisting security control panel that has been installed at the premises. In some implementations, the security sensors may be preexisting security sensors that have been installed at the premise.

Some embodiments of the home security system can operate to blend information from an existing local security platform (e.g., a legacy system or legacy system alarms) with other inputs from sensors and devices that are added to the home security system (e.g., sensors and devices connected directly to the security communicator device), and, based on the blended information, provide for integrated control of security and automation devices at premises where the existing local security platform is located.

For example, the security communicator device can tap signals (e.g., sensor status signals, alarm signals, etc.) from the existing local security platform (e.g., the existing security control device). In addition, the security communicator device can receive inputs (e.g., sensor status, trouble indication, low battery, alarms, etc.) from the peripheral devices (e.g., existing and new sensors and devices) connected to the security communicator device. A security cloud server that communicates with the security communicator device can blend the signals from the existing local security platform and the inputs from the peripheral devices of the security communicator device, and determine one or more appropriate actions to be performed by the security cloud server, the security communicator device, the existing local security platform, and/or other devices, systems, or entities. Such blended information is used to permit for integrated and centralized control of all security and automation devices at the premises.

Further, the home security system can operate to select from among multiple different communication channels to establish communication between a security communicator device and a cloud computing system. For example, the security communicator device can selectively use one of different types of data communications with the security cloud server, such as broadband (Ethernet and Wi-Fi) and cellular. By way of example, such multiple options can be prioritized based on, for example, the type of data being transmitted. For example, a video stream can be attempted to be sent over broadband first and, if the broadband is not available, then over cellular.

Particular embodiments described herein include a system for providing integrated security control. The system may include a security cloud server, and a security communicator device. The security communicator device is configured to communicate with the security cloud server via one or more networks. The security communicator device is configured to be connected to an existing security panel at a premises and further configured to perform operations including receiving a signal from the existing security panel, the signal representative of an existing device connected to the existing security panel; transmitting the signal to the security cloud server; receiving a peripheral device signal representative of a peripheral device connected to the security communicator device; transmitting the peripheral device signal to the security cloud server; receiving a control signal from the security cloud server, the control signal representative of a security action determined based on the signal and the peripheral device signal; and controlling the existing security panel using the control signal.

In some implementations, the system can optionally include one or more of the following features. Controlling the existing security panel may include transmitting the control signal to the existing security panel. The control signal may be usable by the existing security panel to control the existing device. The operations may include controlling the peripheral device based on the control signal. The security action may be determined using security control rules. The security control rules may include a list of actions to be taken based on different combinations between possible statuses of the existing device and possible statuses of the peripheral device. The operations may include converting the signal to a modified signal, the modified signal configured to be compatible with a protocol of the security communicator device. The operations may include converting the control signal to a modified control signal. The modified control signal may be configured to be compatible with a protocol of the existing security panel. The existing security panel may be communicatively disconnected from a central monitoring station. The existing device and the peripheral device may be arranged in a security zone being independently monitored and controlled. The security communicator device may be connected to one of data bus and/or telephone line of the existing security panel. The networks may include one or more of an Ethernet communication, a wireless communication, and a cellular communication.

Particular embodiments described herein include a security communicator. The security communicator may include a data processing apparatus, and a memory device storing instructions that when executed by the data processing apparatus cause the server to perform operations comprising: receiving a signal from an existing security panel, the signal representative of an existing device connected to the existing security panel; transmitting the signal to a security cloud server; receiving a peripheral device signal representative of a peripheral device connected to the security communicator device; transmitting the peripheral device signal to the security cloud server; receiving a control signal from the security cloud server, the control signal representative of a security action determined based on the signal and the peripheral device signal; and controlling the existing security panel using the control signal.

In some implementations, the system can optionally include one or more of the following features. Controlling the existing security panel may include transmitting the control signal to the existing security panel. The control signal may be usable by the existing security panel to control the existing device. The operations may include controlling the peripheral device based on the control signal. The security action may be determined using security control rules. The security control rules may include a list of actions to be taken based on different combinations between possible statuses of the existing device and possible statuses of the peripheral device. The operations may include converting the signal to a modified signal. The modified signal may be configured to be compatible with a protocol of the security communicator device. The operations may include converting the control signal to a modified control signal. The modified control signal may be configured to be compatible with a protocol of the existing security panel. The existing security panel may be communicatively disconnected from a central monitoring station. The existing device and the peripheral device may be arranged in a security zone being independently monitored and controlled.

Some embodiments of the home security system can permit for security and automation devices (e.g., cameras, sensors, etc.) in the system to be remotely set up and configured through a security integration system, such as the security communicator device and/or the security cloud server, instead of being set up and configured directly through a communication network (e.g., a home router). Further, local changes to the communication network environment at a premises, such as changing internet providers and credentials, can be provisioned and updated on the security and automation devices through the security integration system at the premises. For example, security and automation devices in a home security system can be connected to a security communicator device, and set up and configured through the security communicator device that integrates an existing local security system and is connected to a security cloud server. Alternatively or in addition, security and automation devices in a home security system can be set up and configured through a user controller and/or a mobile computing device that communicates with the security communicator device and/or the security cloud server.

Particular embodiments described herein include a system for remotely configuring a security device. The system may include a security cloud server, a local network access device, and a security communicator device. The security communicator device is configured to communicate with the security cloud server via one or more networks. The security communicator device is configured to perform operations including connecting to the security device; receiving local network access information from the security cloud server; and transmitting the local network access information to the security device. The local network access information may be usable to configure the security device to connect to the local network access device.

In some implementations, the system can optionally include one or more of the following features. The operations may include storing the local network access information locally. The operations may include transmitting to the security cloud server a request for the local network access information. The operations may include transmitting to the security cloud server a request for updated local network access information; receiving the updated local network access information; and transmitting the updated local network access information to the security device. The operations may include, prior to the transmitting to the security cloud server a request for updated local network access information, determining that the security device is disconnected from the local network access device. The operations may include receiving a device identifier from the security device. The request may include the device identifier. The local network access information may be determined based on the device identifier. The security device may be connected to the security communicator device in a roaming state. The security device may be a peripheral device connected to the security communicator device. The security device may be an existing device connected to an existing security panel. The existing security panel may be connected to the security communicator device. The operations may include receiving a signal from the existing security panel, the signal representative of the existing device connected to the existing security panel; transmitting the signal to the security cloud server; receiving a control signal from the security cloud server, the control signal representative of a security action determined based at least part on the signal; and controlling the existing security panel using the control signal. The security communicator device may be connected to one of data bus and/or telephone line of the existing security panel. The networks may include one or more of an Ethernet communication, a wireless communication, and a cellular communication.

Particular embodiments described herein include a security communicator. The security communicator may include a data processing apparatus, and a memory device storing instructions that when executed by the data processing apparatus cause the security communicator to perform operations including connecting to a security device; receiving local network access information from a security cloud server; and transmitting the local network access information to the security device, the local network access information usable to configure the security device to connect to a local network access device.

In some implementations, the system can optionally include one or more of the following features. The operations may include storing the local network access information locally. The operations may include transmitting to the security cloud server a request for the local network access information. The operations may include transmitting to the security cloud server a request for updated local network access information; receiving the updated local network access information; and transmitting the updated local network access information to the security device. The operations may include, prior to the transmitting to the security cloud server a request for updated local network access information, determining that the security device is disconnected from the local network access device. The operations may include receiving a device identifier from the security device. The request may include the device identifier. The local network access information may be determined based on the device identifier. The security device may be connected to the security communicator in a roaming state. The security device may be a peripheral device connected to the security communicator, or an existing device connected to an existing security panel. The existing security panel may be connected to the security communicator device.

Some embodiments of a home security system described herein allow remotely provisioning and configuring security and automation devices through a security integration system, such as a security communicator device which is connected to a security cloud server, instead of being connected directly through a network router. This enables security and automation devices to automatically connect to a network and maintain the connection without manually reconfiguring the devices when connection settings are modified, such as changes to network router setups (e.g., changing internet providers or credentials). The automated network connection allows easy setup and configuration of devices in a home security system and provide flexibility in expanding the home security system.

Some embodiments of the home security system can selectively choose multiple routes for signals (e.g., data streams) from security and automation devices to different devices such as output devices. For example, the home security system can select one of multiple routes for a video stream from a camera to a display device (e.g., a touchpad) for display. Multiple different pathways can be selectively used, such as a pathway through a remote security cloud server and another local pathway through the device itself.

Further, some embodiments of the home security system can operate to select from among multiple different communication channels to establish communication between a security communicator device and a cloud computing system. For example, the security communicator device can selectively use one of different types of data communications with the security cloud server, such as broadband (Ethernet and Wi-Fi) and cellular. By way of example, such multiple options can be prioritized based on, for example, the type of data being transmitted. In one example, a video stream can be attempted to be sent over broadband first and, if the broadband is not available, then over cellular. In another example, the system is configured to permit for a video stream to be sent over broadband only, but not over cellular.

Particular embodiments described herein include a system for providing integrated security control. The system may include an existing security panel, a security cloud server, a local network access device, an output device, and a security communicator device. The security communicator device is configured to be connected to the existing security panel. The security communicator device includes a plurality of communication interfaces and is configured to select one of the plurality of communication interfaces to communicate with the security cloud server. The security communicator device is configured to perform operations including: connecting to the existing security panel; receiving a device signal from a security device associated with the security communicator device; transmitting the device signal to the security cloud server using the one of the plurality of communication interfaces, the security cloud server configured to process the device signal and generate a processed signal; receiving the processed signal from the security cloud server using the one of the plurality of communication interfaces; and permitting the processed signal to be transmitted to the output device, the output device configured to output content contained in the processed signal.

In some implementations, the system can optionally include one or more of the following features. The output device may be connected to the security communicator device through the local network access device. The processed signal may be routed to the output device through the local network access device. The output device may be connected directly to the security communicator device. The processed signal may be routed to the output device through the security communicator device. The plurality of communication interfaces may include an Ethernet communication interface, a wireless communication interface, and a cellular communication interface. The operations may include automatically switching between the plurality of communication interfaces. The operations may include selecting communication path priorities among the plurality of communication interfaces through preferences established in a network services platform. The operations may include selecting, from among a plurality of communication paths, an optimal communication path to be used by the security communicator device based on one or more of a plurality of factors. The plurality of factors may include costs associated with using the plurality of communication paths. The plurality of factors may include current availability of the plurality of communication paths. The plurality of factors may include latency needs related to sensor data to be transmitted by the security communicator device. The plurality of factors may include sensor triggered criteria. The operations may include receiving an existing device signal from an existing security device through the existing security panel, the existing security device being connected to the existing security panel; transmitting the existing device signal to the security cloud server using the one of the plurality of communication interfaces, the security cloud server configured to process the device signal and generating a second processed signal; receiving the second processed signal from the security cloud server using the one of the plurality of communication interfaces; and permitting the second processed signal to be transmitted to the output device, the output device configured to output content contained in the second processed signal. The operations may include translating the existing device signal to be compatible with a protocol of the security communicator device. The security communicator device may be connected to one of data bus and/or telephone line of the existing security panel. The existing security panel may be disconnected from an existing communication network when connected to the security communicator device. The device signal may include media content, and wherein the device signal is transmitted from the security cloud server to a media analysis server for analysis. The output device may include a display screen for displaying the content. The local network access device may include a broadband router.

Some embodiments of the integrated security system include one or more computing devices with an integrated user interface for outputting security and automation information and receiving user inputs of controlling the system. The user interface is configured to integrate outputs from the existing local security platform and outputs from the security communicator device and associated peripheral devices, and present a blend of information for the entire integrated security system, thereby providing for integrated view and control of security and automation devices at the premises. For example, the integrated user interface can provide an all-in-one dashboard that displays both of the security information from the existing security panel and the information from additional security and automation devices (e.g., newly-added security sensors, cameras, home automation sensors, etc.). The integrated user interface permits for a user to access information from both the existing security panel platform and the security communicator device connected thereto, and provide a user control for the entire system from the same user interface, without requiring separate different credentials for logging in.

The computing devices with an integrated user interface can include one or more user controllers dedicated to the security integration system and connected to the security communicator device either directly or via a local network access device. In addition or alternatively, the computing devices can include a user computing device (e.g., a user's mobile device) running a software application configured to provide the user interface.

Particular embodiments described herein include a system for providing integrated security control. The system includes a security cloud server, a user control device, and a security communicator device. The security communicator device is configured to communicate with the security cloud server via one or more networks. The security communicator device is configured to be connected to an existing security panel at a premises and further configured to perform operations comprising receiving a signal from the existing security panel, the signal representative of an existing device connected to the existing security panel; transmitting the signal to the security cloud server; receiving a peripheral device signal representative of a peripheral device connected to the security communicator device; transmitting the peripheral device signal to the security cloud server; receiving a control signal from the security cloud server, the control signal including information about a security action determined based on the signal and the peripheral device signal; controlling the existing security panel using the control signal; connecting to the user control device; and transmitting the control signal to the user control device, the control signal being usable to generate an integrated control interface at the user control device.

In some implementations, the system can optionally include one or more of the following features. The operations may include receiving a user input from the user control device, the user input received through the integrated control interface. The integrated control interface may include a blend of information about the existing device and information about the peripheral device. The user control device may be a portable device. The user control device may be connected to the security communicator device through a local network access device. Controlling the existing security panel may include transmitting the control signal to the existing security panel. The control signal may be usable by the existing security panel to control the existing device. The operations may include controlling the peripheral device based on the control signal. The operations may include translating the signal to a modified signal, the modified signal configured to be compatible with a protocol of the security communicator device. The operations may include converting the control signal to a modified control signal, the modified control signal configured to be compatible with a protocol of the existing security panel. The existing device and the peripheral device may be arranged in a security zone being independently monitored and controlled. The security communicator device may be connected to one of data bus and/or telephone line of the existing security panel. The networks may include one or more of an Ethernet communication, a wireless communication, and a cellular communication.

Particular embodiments described herein include a user control device for an integrated security system. The user control device may include a data processing apparatus, a display screen, and a memory device storing instructions that when executed by the data processing apparatus cause the user control device to perform operations comprising: connecting to a security communicator device; receiving a control signal from the security communicator device, the control signal being generated based on a signal from an existing security panel connected to the security communicator device, and based further on a peripheral device signal from a peripheral device connected to the security communicator device; and generating an integrated control interface using the display screen, the integrated control interface displaying a blend of information about the existing security panel and information about the peripheral device.

In some implementations, the system can optionally include one or more of the following features. The operations may include receiving a user input through the integrated control interface. The user input may be for controlling the existing security panel or the peripheral device. The user control device may be a portable device. The user control device may be connected to the security communicator device through a local network access device. The user control device may be paired directly with the security communicator device. An existing device and the peripheral device may be arranged in a security zone being independently monitored and controlled. The existing device may be connected to the existing security panel. The security communicator device may be configured to communicate with a security cloud server via one or more networks, and further configured to perform operations including: receiving the signal from the existing security panel, the signal representative of an existing device connected to the existing security panel; transmitting the signal to the security cloud server; receiving the peripheral device signal representative of a peripheral device connected to the security communicator device; transmitting the peripheral device signal to the security cloud server; receiving the control signal from the security cloud server, the control signal including information about a security action determined based on the signal and the peripheral device signal; and controlling the existing security panel using the control signal. The security communicator device may be connected to one of data bus and/or telephone line of the existing security panel.

Some embodiments described herein include a communicator device that can be used to upgrade or "takeover" an existing home security system, such as to enhance the system with one or more additional features. For example, some embodiments described herein include a system, comprising a communicator device configured to connect with a legacy security panel, the communicator device including a wireless local network communication interface configured to communicate wirelessly with one or more components located at a premise, and a wireless remote communication interface.

Some embodiments described herein include a system, comprising a video camera; a communicator device including a communication interface configured to communicate with a video camera device; and a display device configured to receive video communication from the video camera via the communicator device.

Some embodiments described herein include a communicator device configured to connect with a legacy security panel, comprising: a plurality of communication interfaces, including: an Ethernet communication interface, a wireless communication interface, and a cellular communication interface. In some implementations, the communicator device is configured to select one of the plurality of communication interfaces based on a cost of utilizing the communication path. In some implementations, the communicator device is configured to automatically switch to an available communication path to maintain alarm reporting.

Some embodiments described herein include a communicator device configured to connect with a legacy security panel, comprising: a translator configured to translate a proprietary encrypted security sensor signal; wherein the communicator device is configured to communicate with proprietary encrypted security sensors using the translator.

Some embodiments described herein include a communicator device configured to facilitate local network connection configuration over a cellular link such that a system connected with the communicator device may be remotely managed.

Some embodiments described herein include a system, comprising: a communicator device configured to connect with a legacy security panel, the communicator device comprising: an Ethernet communication interface, a wireless communication interface, and a cellular communication interface; a translator configured to translate a proprietary encrypted security sensor signal; a video camera; a display device configured to receive video communication from the video camera via the communicator device. In some implementations, the communicator device is configured to communicate with proprietary encrypted security sensors using the translator, and the communicator device is configured to automatically switch to an available communication path to maintain alarm reporting.

Some embodiments described herein include a system comprising: a communicator device configured to connect to a legacy security panel, the communicator device comprising: a sensor radio, and a communication interface; and a cloud platform configured to communicate with the communicator device over one or more networks via the communicator device's communication interface; wherein sensor enrollment is provided via the sensor radio. In some implementations, the sensor enrollment is with the legacy security panel via the sensor radio. In some implementations, the sensor enrollment is with the cloud platform via the sensor radio, and sensor enrollment with the cloud platform provides for security monitoring independent of security monitoring provided by the legacy security panel. In some implementations, the communicator device is configured to add sensors to be monitored without triggering alarms on the legacy security system. In some implementations, the sensor enrollment is provided by both the legacy security panel and the cloud platform via the sensor radio.

Some embodiments described herein include a communicator device configured to self-configure itself to a separate security system by (i) sensing hardware connections with and signals transmitted with the separate security system and (ii) making responsive configurations to enable system functionality.

Some embodiments described herein include a communicator device configured to select communication path priorities through preferences established in a network services platform.

Some embodiments described herein include a communicator device configured to select, from among a plurality of communication paths, an optimal communication path to be used by the communicator device based on one or more of a plurality of factors. In some implementations, the plurality of factors include costs associated with using the plurality of communication paths. In some implementations, the plurality of factors include current availability of the plurality of communication paths. In some implementations, the plurality of factors include latency needs related to sensor data to be transmitted by the communicator device. In some implementations, the plurality of factors include sensor triggered criteria.

Some embodiments described herein include a communicator device configured to automatically switch from cloud platform control to local control based on detection by one of a plurality of local WANs provided by the communicator device.

The technologies described herein may provide one or more of the following advantages. Some embodiments described herein include a security communicator device that is connectable to an existing security platform (e.g., a legacy security panel or keypad) and can further connect to other security and home automation devices which are not compatible with the existing security platform, thereby integrating all the home security and automation devices. The security communicator device provides a centralized point of controlling all existing and new security and automation devices at a premise, and allow flexibility in modifying and expanding a security system at the premise without need of replacing the security system that has been already installed throughout the premise.

Some embodiments of the security communicator device can be controlled by one or more remote control devices, such as on-site user controllers, user mobile devices, and other remote computing devices, which can run software applications providing the same or similar user interfaces so that a user can see and interact with the same or similar user interfaces regardless of the types of security platforms, systems, devices, and components being installed on the premise. A user can interface with all security and automation devices in the same way through such remote control devices.

Some embodiments of the security communicator device, when connected to an existing security panel, is self-configured without an installer's input, to communicate with the existing security panel even if a protocol used by the existing security panel is not compatible with a protocol of the security communicator device. This can allow an installer to install a security communicator device to an existing security panel without having to be specially trained in the identification of the existing security panel and the setup of the security communicator device against the existing security panel.

Some embodiments of a home security system described herein permit for multiple different pathways to be selectively chosen to route data streams among different devices, such as from security and automation devices to output devices, thereby ensuring continuous data transmission between devices in reliable and cost-efficient manners.

The details of one or more implementations are set forth in the accompanying drawings and the description below. Other features and advantages will be apparent from the description and drawings, and from the claims.

BRIEF DESCRIPTION OF THE DRAWINGS

FIG. 6A illustrates an example packet, or data, protocols that may be used by a security system.

FIG. 6B illustrates another example packet, or data, protocols that may be used by a security system.

FIG. 8 illustrates an example technique for blending information from an existing security platform with other inputs of a security integration system.

FIGS. 9A-9B is a flowchart of an example method for providing integrated home security and automation control based on a blend of inputs from a legacy security panel and a security communicator.

DETAILED DESCRIPTION OF ILLUSTRATIVE EMBODIMENTS

Figure 1A:
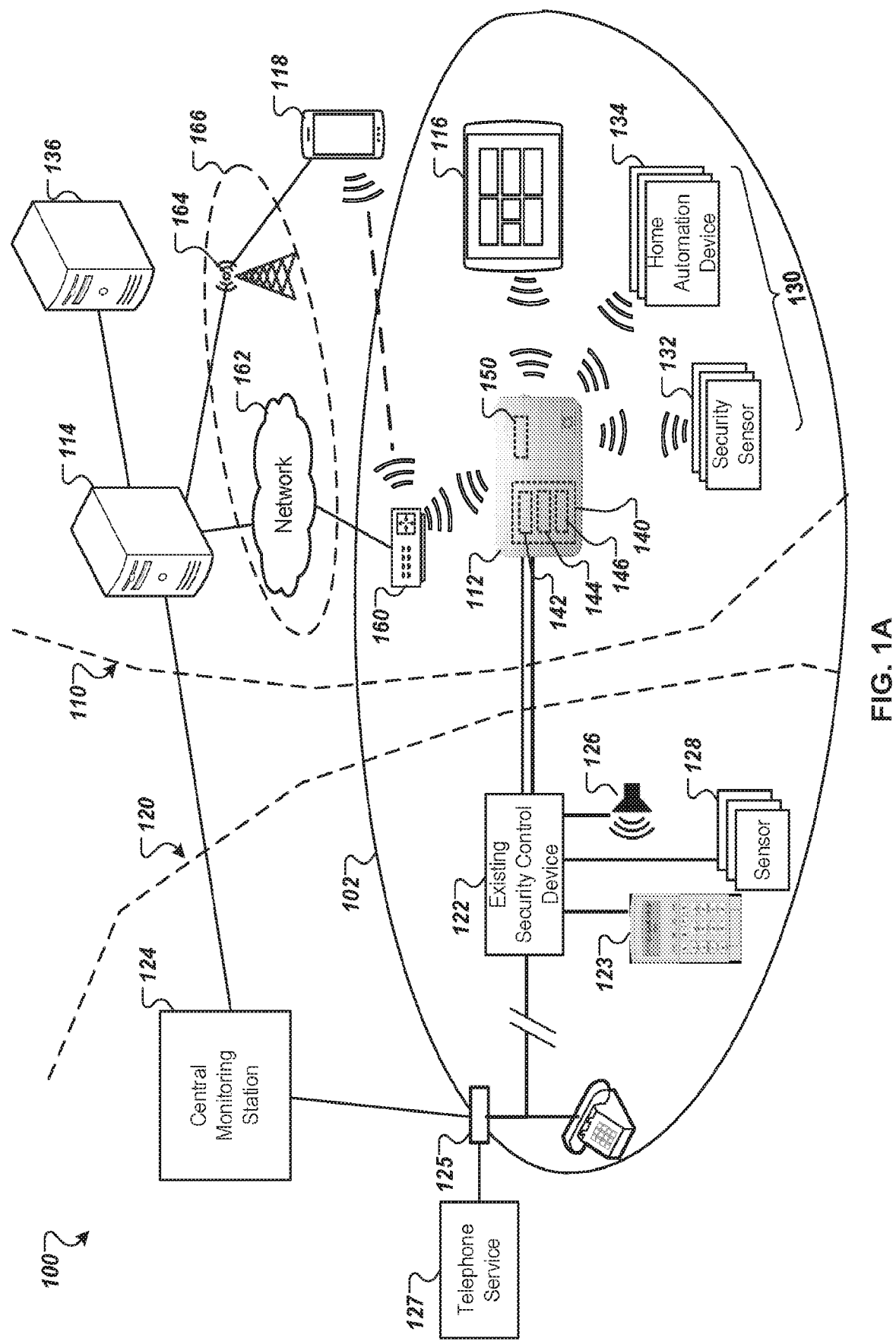
FIG. 1A illustrates an example system for integrated home security and automation services.

A home security system provides a centralized point of controlling all existing and new security and automation devices at a premise (e.g., houses, buildings, or other facilities). The system involves at least three subsystems: an existing local security platform, a security communicator device (e.g., a security panel and/or user controller(s)), and a security cloud server. A security communicator device can include a security panel that is installed in a premise and connected to the existing local security platform in the premise. The security panel can come with one or more user controllers (e.g., touchpads) that provide an integrated user interface for a user to manage and control all security and automation devices in one place. The security panel is operated to tap a data bus of the existing local security platform to obtain security data from the platform. Further, the security panel can receive data from the other security and automation devices at the premise. The security data from the existing local security platform and the data from the other security and automation devices can be used to provide integrated home security and automation management. The security panel can be connected to the security cloud server selectively through one of multiple communication interfaces (e.g., selectively using one of multiple connection options, such as Ethernet, Wi-Fi, and cellular) so that the security panel remains connected to the security cloud server at all times and provides seamless security and automation services.

The security communicator device can at least partially self-program to communicate with an existing local security panel when the security communicator device is connected to the existing panel. When an installer connects a security communicator device to an existing panel at the premise, the security communicator device can automatically detect hardware connections with and signals from the existing local security panel, and adapt itself to permit for communication with the existing local security panel to take over at least partially the features and functionalities of the existing local security panel. Some embodiments of the home security system can operate to blend information from an existing local security platform (e.g., a legacy system or legacy system alarms) with other inputs from sensors and devices that are added to the home security system, and provide for integrated control of security and automation devices at premises where the existing local security platform is located. Further, the home security system can operate to select from among multiple different communication channels to establish communication between a security communicator device and a cloud computing system.

Some embodiments of the home security system can operate to blend information from an existing local security platform (e.g., a legacy system or legacy system alarms) with other inputs from sensors and devices that are added to the home security system, and provide for integrated control of security and automation devices at premises where the existing local security platform is located. Further, the home security system can operate to select from among multiple different communication channels to establish communication between a security communicator device and a cloud computing system.

Some embodiments of the home security system can permit for security and automation devices (e.g., cameras, sensors, etc.) in the system to be remotely set up and configured through a security integration system, such as the security communicator device and/or the security cloud server, instead of being set up and configured directly through a communication network (e.g., a home router). Further, local changes to the communication network environment at a premises, such as changing internet providers and credentials, can be provisioned and updated on the security and automation devices through the security integration system at the premises.

Some embodiments of the home security system can selectively choose multiple routes for signals (e.g., data streams) from security and automation devices to different devices such as output devices. Further, some embodiments of the home security system can operate to select from among multiple different communication channels to establish communication between a security communicator device and a cloud computing system.

Some embodiments of the home security system include one or more computing devices with an integrated user interface for outputting security and automation information and receiving a user input of controlling the system. The user interface is configured to integrate outputs from the existing local security platform and outputs from the security communicator device and associated peripheral devices, and present a blend of information for the entire home security system, thereby providing for integrated view and control of security and automation devices at the premises.

Communicator devices, systems, and methods are described that can upgrade or "takeover" an existing home security system. Such devices, systems, and methods, can function to enhance an existing home security system with one or more home automation, alarm, and/or surveillance features. Various example embodiments include a triple alarm path capable of communicating across multiple communication paths (e.g., a single selected communication path or multiple communication paths in parallel), a unified dashboard for security, surveillance, and home automation features, the ability to add legacy systems over local and remote networks, the ability to view video over a home network connection, automatic failover of communication paths, encryption with sensors and other devices, the ability to configure local settings over cellular/mobile data network connection, the ability to add both panel monitored and/or cloud monitored sensors to these legacy systems, the ability to self-configure to the legacy (or new) security system (e.g., can be performed by sensing various hardware connections and signals and making responsive configurations to enable system functionality), the ability to select communication path priorities through preferences established in the network services platform, the ability to determine optimal communication path in the device based on factors including cost of data path, availability of data path, latency needs related to the sensor data or other sensor triggered criteria, the ability to automatically switch from cloud platform control to local control based on detection by one of the plurality of local WANs enabled by the BAT-Connect, and/or combinations thereof.

In some embodiments described herein, a communicator device is configured to provide a takeover device that facilitates upgrade of legacy security platforms. The communicator device may be configured to enhance an existing legacy security platform with one or more features. For example, the communicator device may interface with the legacy security platform to bridge intrusion security, video, and home automation with various operating systems (e.g., mobile device operating systems). The legacy security platform may include one or more components installed and/or in operation at a premises, and the communicator device may be installed at a later time from one or more components of the legacy security platform.

In various exemplary embodiments, the communicator device may utilize high-speed, encrypted communication protocols (e.g., such as commercially available from Alula of St. Paul, Minn.), to allow system control by various smart devices (e.g., mobile cellular phone, tablet, computer, PDA, etc.).

In an exemplary embodiment, the communicator device includes two or more, three or more, four or more, or yet additional communication interfaces. For example, the communicator device may include cellular, Ethernet, and wireless communication interfaces, each of which may be utilized in parallel or independently. The communicator device may include a housing/frame which contains components of the communicator device, and the cellular, Ethernet, and/or wireless communication interfaces may be located within the housing/frame. A communicator device including multiple communication interfaces, including cellular, Ethernet, and wireless communication interfaces, insulates the communication device (and users, installers, contractors, etc.) from cellular carrier sunsets or other communication protocol obsolescence.

The communicator devices described herein may be compatible with multiple legacy security platforms from various manufacturers. For example, some communicator devices described herein provide universal or wide compatibility with existing security platforms. Wide compatibility can facilitate installation, reducing the time required for installation of a communicator device. Furthermore, wide compatibility can simplify operations by reducing the types of devices that must be stocked and managed. In an example embodiment, the communicator device is configured to automatically link to control panels manufactured by Honeywell, Interlogix, Napco, and others, such as the Honeywell Vista and DSC PowerSeries, Interlogix NX, Interlogix Concord, and Napco Gemini panels.

The communicator device may be connected efficiently and without requiring complex training. For example, joining the communicator device to the keypad bus of an existing panel, the communicator device can automatically detect the type/brand of panel and adapt to its specifications, if appropriate. The communicator device may thus instantly join as a peripheral device, reducing technician setup time.

In various example embodiments, the communicator device communicates with one or more video components (e.g., security cameras located at a premises). The communicator device facilitates pairing of such home automation devices, intrusion and environmental sensors in a single, mobile experience. Real-time and intuitive controls may be enabled through mobile applications (e.g., based on Alula iOS, Android, etc.).

Various communicator devices described herein facilitate upgrade of services offerings by dealers. For example, the communicator device may optionally include a card (e.g., such as a Z-wave wireless communication card), a system may be efficiently enhanced with one or more peripheral devices, such as automated locks, thermostats, lights, garage door controllers, and other devices (e.g., Z-wave certified devices), to existing or new installations.

In a mobile application associated with the communicator device, users can quickly monitor and manage system components, and customize personal recipes to fit their lives. For example, the communicator device may facilitate control of all or most security, surveillance, and automation devices in a premises using a single mobile application. With only a single mobile application controlling the smart devices in a home or business, response time from the application command to the device action is perceived to be almost instant.

Communicator devices described herein can facilitate integrated smart home controls. For example, a communicator device may deliver panel-like user controls, with intuitive mobile application and touchpad flows (e.g., such as flows similar to a Connect+ device, commercially available from Alula of St. Paul, Minn.). In various example embodiments, a user can learn a single application experience for both take-over and new installs. This can streamline business operations and simplify training and setup. For example, security professionals can learn and teach one application.

Various communicator devices described herein can serve to modernize outdated security panels. The inventors have found that the addition of conventional cellular or IP communicators to existing panels are often requires continued use of an outdated LED keypad (e.g., conspicuously located on a wall of the premises) as the primary controller. In various embodiments, the communicator device described herein includes a contemporary and portable interface. In an example embodiment, the communicator device includes a touch display, and may include a table form-factor having a touchpad. The touchpad of the communicator device can be used as a new user control inside the home. In some embodiments, the user interface (e.g., appearance of the interface, controls, etc.) have a uniform appearance when viewed on either the application on a mobile device or the touchpad of the communicator device. In some embodiments, a legacy keypad may be linked to the communicator device and/or other system components without having to join the user's Wi-Fi network at the premises.

The communicator device may include various communication interfaces that facilitate broad compatibility, and that can extend the useful service life of legacy systems the communicator device is connected with. For example, with IP connections on board (e.g., Ethernet and Wi-Fi), the communicator device is less hindered by cell sunsets or communication protocol obsolescence. Unlike cellular, the internet will not likely sunset over the expected useful life of the system. Moreover, multiple communication interfaces provide a backup connection that can promote robust and reliable communication. For example, with a backup connection always at the ready, the communicator device facilitates constant connectivity. The connection is thus less dependent on a network with spotty or intermittent coverage, or that may become obsolete. Moreover, in some example embodiments, an auto-switch capability promotes a constant connection to cellular or IP communication paths (e.g., to always maintain alarm reporting).

In various example embodiments, the communicator device includes three paths of WAN connectivity (e.g., from the single communicator device housing/frame). The communicator device thus may link to a cloud service (e.g., such as a cloud service provided by Alula of St. Paul, Minn.) using Ethernet, Wi-Fi or CAT-M1 cellular communication paths. In an example embodiment, the communicator device is compatible with 5G communication. With CAT-M1 IoT-optimized communications to access the cellular network, the communication device is operational with the common and current 4G LTE networks, as well as the newest 5G cellular technology. Such flexibility in communication may further reduce exposure to cellular communication protocol obsolescence. The Wi-Fi communication interface may connect directly to a broadband router and/or create a Wi-Fi access point for a touchpad associated with the communicator device.

In various example embodiments, a communicator device described herein facilitates adoption of improved communication protocols, enhanced security, surveillance, and automation features, and reduced dependence on cellular carriers.

In an example embodiment, the communicator device includes "tip and ring" support with keyswitch arming. For example, the device may thus be enabled to be connected to any panel that supports CID reporting codes over a phone line, and keyswitch arming support for remote interactive control. Even when operating in tip/ring/keyswitch mode, home automation and video services can be readily added to these accounts (e.g., by dealers).

Referring to FIG. 1A, an example system 100 is shown that can provide integrated home security and automation services. The system 100 can include a security integration system 110 configured for connection with an existing security platform 120 and enhance the security platform 120 with additional features which may not be available from the security platform 120.

For example, the existing security platform 120 can be a legacy security platform which was previously installed and provided at a premise 102 before the security integration system 110 is employed, or other security platforms which may be installed before, when, or after the security integration system 110 is deployed and in operation at the premise 102. The existing security platform 120 may have limited functionalities and is not capable of providing flexibility in modifying and expanding a home security and automation environment at the premise 102. Examples of the existing security platform 120 include Honeywell Vista, DSC PowerSeries, Interlogix, Concord, NX, and Simon panels.

In some implementations, the existing security platform 120 includes an existing security control device 122, a control panel 123, and a central monitoring station 124. The existing security control device 122 can be installed in the premise 102 and connects to the control panel 123 configured to interact with a user to arm and disarm a home security system. The existing security control device 122 can include, or be connected to, a sound output device 126 (e.g., a siren, speaker, etc.) which can be activated to output an alarm sound when certain security events occur which generate an alarm signal. The existing security control device 122 can be housed in an enclosure and installed at a fixed location while the control panel 123 can be mounted at a fixed location and/or potable for easy programming and interaction for users. Alternatively, the existing security control device 122 may be configured to be portable. The existing security control device 122 can enable communication with an alarm company (e.g., the central monitoring station 124) that monitors the premise 102. The control panel 123 can be of various types. For example, the control panel 123 can include a keypad (with numeric and other buttons) to arm/disarm and otherwise maneuver a security system. The control panel 123 can include a touchpad, voice control, and/or wireless remotes (e.g., key fobs) for additional functionalities.

The existing security control device 122 provides an interface that communicatively connects the control panel 123 and the central monitoring station 124. The existing security control device 122 may be installed at a suitable location at the premise and connected to an existing communication network by using an existing network interface device, such as a telephone interface 125 connected to a telephone service 127 or other types of interfaces connected to cable and/or Internet services.

The central monitoring station 124 provides services to monitor a home security system, such as burglar, fire, and other residential or commercial alarm systems. The central monitoring station 124 may also provide watchman and supervisory services. The central monitoring station 124 can use telephone lines, mobile lines, and/or radio channels to connect to the existing security control device 122 and call appropriate authorities in the event an alarm signal is received.

The existing security platform 120 may include one or more sensors 128, such as door sensors, window sensors, motion sensors, etc., which are connected to the existing security control device 122. The sensors 128 can detect predetermined events (e.g., open/closed doors and windows, motions detected, etc.), and generate and transmit sensor signals representative of such events to the existing security control device 122 and/or the central monitoring station 124. The sensors 128 can be directly controlled through a user interface (e.g., keypad, buttons, etc.) (e.g., the control panel 123) of the existing security control device 122.

Referring still to FIG. 1A, the security integration system 110 can include a security communicator device 112 and a security cloud server 114. In addition, the security integration system 110 can include a user controller 116 and a mobile computing device 118.

The security communicator device 112 is configured for connection with a legacy control panel (e.g., the existing security control device 122) to enhance the existing security platform 120 with additional features. For example, the existing security platform 120, which had been deployed at a premise for a while (e.g., years), have limited hardware and/or software capabilities to keep track on technology development up-to-date, and thus typically lack additional functionalities to support user demands. By way of example, a legacy security platform may include a control panel which is not capable of supporting Z-Wave home-automation, interactive services, IP connectivity, and/or cellular communications capabilities, and/or is incompatible with newer peripheral devices (e.g., one or more of the peripheral devices 130). As described herein, the security communicator device 112 can be configured to turn a conventional control panel into an integrated home security with broadband and cellular communication capabilities, and further combine the home security with home automation to provide smart home as a service platform.

Figure 1B:
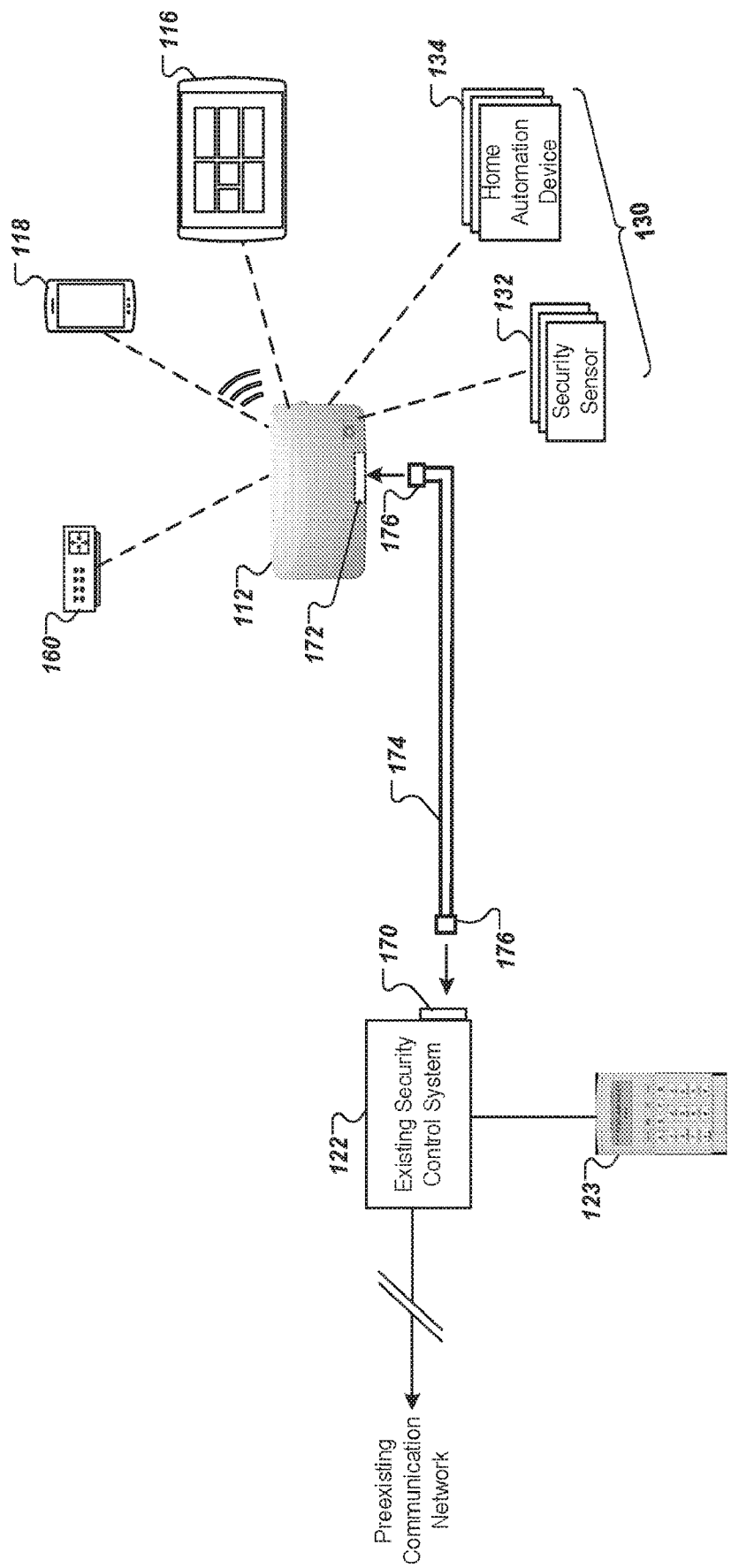
FIG. 1B illustrates an example connection between a control panel and a security communicator device.

Referring to FIGS. 1A and 1B, the security communicator device 112 can be configured to connect to the existing security control device 122 by, for example, wiring the security communicator device 112 to the existing security control device 122. In some implementations, the security communicator device 112 is configured to connect to one or more types of wired communication terminals 170 can be used to connect the security communicator device 112 to the existing security control device 122. Further, the security communicator device 112 can provide one or more types of connection terminals 172 for connection with the existing security control device 122. For example, a control panel can provide a data bus, telephone lines, and/or other suitable communication interfaces, and the security communicator device 112 can be connected to the control panel via any of the communication terminals 170 that is available from the control panel. In some implementations, a cable 174 is used to provide wired connection between the security communicator device 112 and the existing security control device 122. At least one end of the cable 174 can be provided with a connector 176 to be plugged into the terminals 170 and 172. Alternatively, the security communicator device 112 can be wirelessly connected to the existing security control device 122.

In some implementations, when the security communicator device 112 is connected to the existing security control device 122, the functionalities of the existing security control device 122 and/or other components in the existing security platform 120 can be disabled, limited and/or modified to ensure the operations of the security communicator device 112, the security cloud server 114, and/or other components in the security integration system 110 so that the entire security and automation components in the premise are fully integrated and centralized by the security integration system 110. In addition or alternatively, the existing security control device 122 can be disconnected from the existing communication network (e.g., telephone, cable, and/or Internet services).

As described herein, in an example embodiment, the security communicator device 112 is configured to be at least partially self-programming when connected to the existing security control device 122. For example, the security communicator device 112 can automatically detect a type of the existing security control device 122, or features and functionality of the existing security control device 122, when connected to the existing security control device 122. Automatic detection may facilitate installation with the existing security platform 120.

Referring to FIG. 1A, the security communicator device 112 can be connected to the security cloud server 114 using various communication protocols. The security communicator device 112 includes a plurality of communication interfaces 140. For example, the communication interfaces 140 include one or more broadband interfaces, such as a wired communication interface 142 (e.g., Ethernet) and a wireless communication interface 144 (e.g., Wi-Fi). In addition, the communication interfaces 140 can include a cellular communication interface 146 (e.g., 4G/LTE, CAT M1 for 5F transition, etc.). In addition or alternatively, the security communicator device 112 can include other wired or wireless communication interfaces. Thus, the security communicator device 112 is capable of providing multiple-path (e.g., triple-path) cloud connectivity. The security communicator device 112 can communicate security events (e.g., alarm) and/or home automation events, or other data, via one or more of the communication interfaces 140.

The broadband interfaces of the security communicator device 112, such as the wired communication interface 142 and the wireless communication interface 144, can connect to a broadband router 160 which provides access to one or more networks 162. Broadband communications between the security communicator device 112 and the security cloud server 114 can be established via the network(s) 162 and the router 160 to which the security communicator device 112 is connected.

The communication interfaces 140 can be selected based on one or more factors, such as availability, quality, speed, cost of utilizing communication paths, and other requirements. In addition or alternatively, the priorities among the communication interfaces 140 of the security communicator device 112 can be determined through preferences established in a network services platform. By way of example, a cost may be considered to select the lowest-cost communication path (e.g., the wireless communication interface 144). Alternatively or additionally, a communication interface can be selected based on available bandwidth, such as where a particular communication path is unavailable, or for a communication having particular bandwidth requirements. In an example embodiment, the security communicator device 112 can automatically select a particular communication path, and/or switch between communication paths, promoting reliable and robust communication with the security cloud server 114 or other remote computing devices.

As illustrated in FIG. 1A, the security communicator device 112 can add one or more peripheral devices 130. Such peripheral devices 130 were not part of the existing security platform 120, and are to be integrated with the existing security platform 120 after the security communicator device 112 is connected to the existing security platform 120. The peripheral devices 130 being added may be incompatible with the existing security platform 120 if directly connected to the existing security platform 120, but can be integrated with the existing security platform 120 if connected through the security communicator device 112. The security communicator device 112 is configured to operate with such peripheral devices 130 such that the peripheral devices 130 can be used with the existing security platform 120 to enhance its functionalities. The peripheral devices 130 can be connected to the security communicator device 112 via one or more wired or wireless communication protocols, such as Wi-Fi, Bluetooth, etc., which can facilitate addition of the peripheral devices 130.

In some implementations, the peripheral devices 130 include security devices 132 and home automation devices 134. Examples of the security devices 132 include door and window sensors, automated locks, alarms, lighting, motion detectors, security cameras, glass break detectors, and other suitable security components. Surveillance cameras and motion sensors work hand in hand with allowing home owners to keep an eye on areas of their home that they might not have access to at the moment. Motion sensors create zones which cannot be accessed without sounding an alarm. In addition or alternatively, cameras can be set up to detect any movement and display it on the owner's account. Glass break detectors are usually installed near glass doors or a window front of a store. Some examples of glass break detectors can use a microphone to detect when a pane of glass is broken or shattered. By monitoring the sound and vibrations the alarm only reacts to sounds above a certain threshold to avoid false alarms.

Examples of the home automation devices 134 include thermostats, lights, garage door controllers, sensors, other suitable devices associated home appliances and electronic devices. The home automation devices 134 may include a heating, ventilation and air conditioning (HVAC) system which can be remotely controlled through the security communicator device 112. Further, the security communicator device 112 can be used as a lighting control system that permits for various lighting device inputs and outputs to communicate with each other and/or with a user interface. Moreover, the home automation devices 134 may include an occupancy-aware control system that can sense the occupancy of the home using, for example, smart meters and environmental sensors (e.g., $CO_2$ sensors) which can be integrated into a home security system, and trigger automatic responses for energy efficiency and home comfort applications. Further, the home automation devices 134 may include leak detectors, smoke detectors, CO detectors, devices for tracking pets and babies' movements and controlling pet access rights, air quality monitors/controllers, smart kitchen appliances (e.g., coffee machines, ovens, fridge and multi cooker, etc.).

The cloud security server 114 communicates with the security communicator device 112 via one or more communication networks 166, such as over one or more IP networks 162 (e.g., Ethernet, Wi-Fi, and/or other IP networks) and/or cellular networks 164 (e.g., 4G LTE, 5G IoT, and/or other cellular networks). The cloud security server 114 can provide various services related to the security communicator device 112, such as real-time and/or near real-time data and control access, multipath notification alternatives, multiple service enablement, and/or other suitable services. As described herein, such services can be provided to a user across any of a variety of devices, such as the user controller 116 (e.g., a touchpad), the mobile computing device 118 (e.g., a smartphone or tablet), and/or other user devices. The services can be provided to such devices when they are local and/or remote from the premises where the security communicator device 112 is located.

In some implementations, the cloud security server 114 can communicates with a media analysis system 136 configured to process and/or analyze media data, such as image/video data, obtained from a peripheral device 130 (e.g., a surveillance camera or other image/video capturing devices). For example, such a peripheral device 130 can capture an image/video, and transmit it to the security communicator 112, which then transmits it to the security cloud server 114. If necessary, the security cloud server 114 can send the data to the media analysis system 136 for management, processing, and/or analysis. Alternatively or in addition, the security cloud server 114 and/or the security communicator device 112 can manage, process, and/or analyze such media data with or without communicating with the media analysis system 136.

The user controller 116 can be a remote device that is connected to the security communicator device 112. The user controller 116 provides a user interface for a user to interact with the home security system 100 including, for example, the existing security platform 120 (including the existing security control device 122 and/or the central monitoring station 124), the security communicator device 112, the security cloud server 114, and other security and automation devices. For example, the user controller 116 can be configured in the form of a touchpad having a touch screen that displays information about the home security system and provides virtual control elements (e.g., buttons, switches, etc.) to receive user inputs. In addition or alternatively, the user controller 116 can include a physical user interface, such as physical buttons, switches, etc., to receive user inputs.

The mobile computing device 118 can be a user's mobile device which can communicate with the security cloud server 114. The mobile computing device 118 provides a user interface for a user to interact with the security cloud server 114. For example, the mobile computing device 118 includes a touch screen that displays information about the home security system and provides virtual control elements (e.g., buttons, switches, etc.) to receive user inputs. In addition or alternatively, the mobile computing device 118 can include a physical user interface, such as physical buttons, switches, etc., to receive user inputs. The mobile computing device 118 can be connected to the security cloud server 114 via cellular networks 164. In addition or alternatively, the mobile computing device 118 can be connected to the security cloud server 114 over one or more IP networks 162 (e.g., Ethernet, Wi-Fi, and/or other IP networks). In addition or alternatively, the mobile computing device 118 can communicate with the security communicator device 112 directly, or via one or more networks (e.g., the communication networks 166). In addition or alternatively, the mobile computing device 118 can communicate with the existing security control device 122, the central monitoring station 124, and/or other security and automation devices directly, or via one or more networks (e.g., the communication networks 166).

The security communicator device 112 can include a translator 150 to facilitate communication with proprietary encrypted signals from devices (e.g., the sensors 128 and the peripheral devices 130) of the existing security platform 120.

Figure 1C:
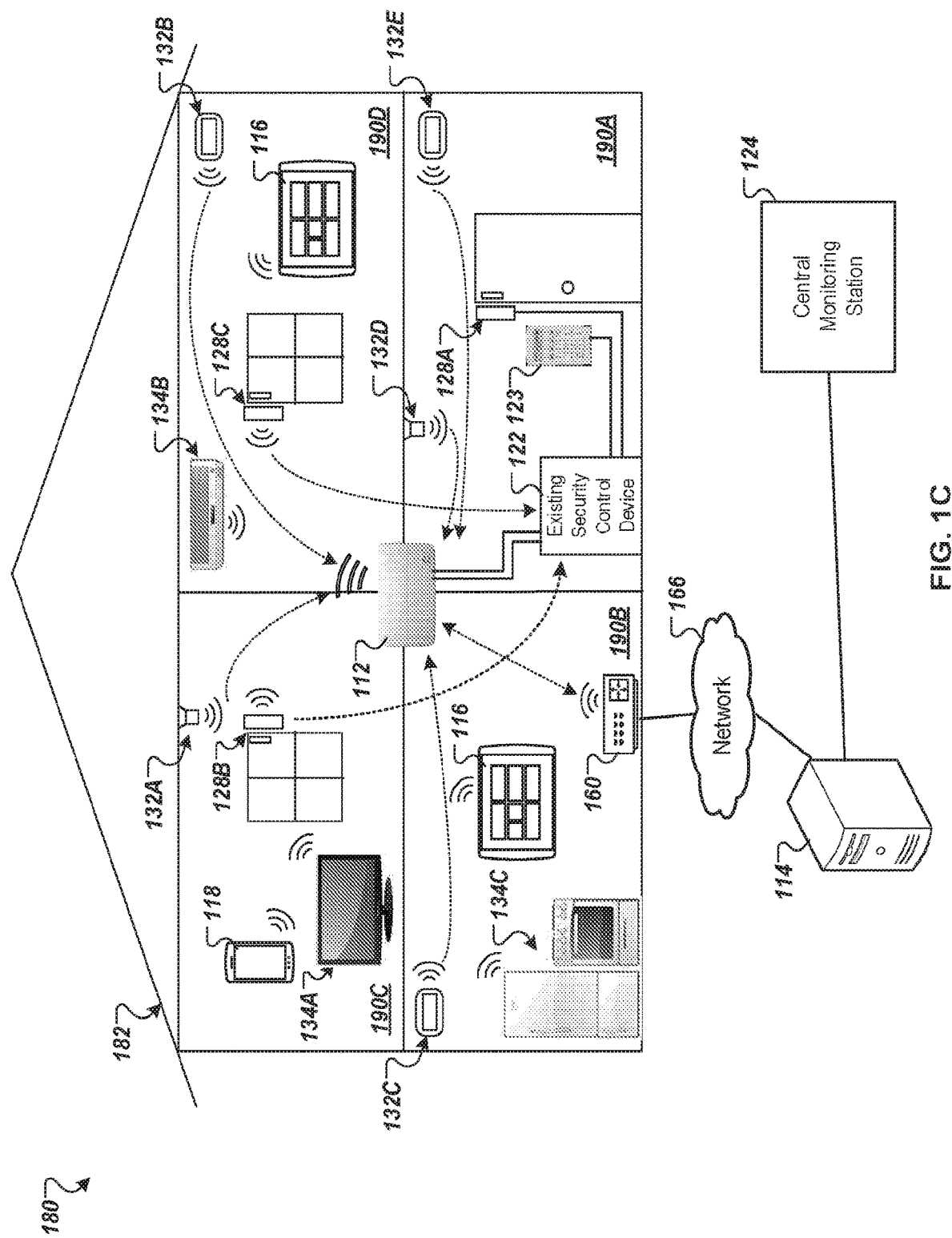
FIG. 1C is a diagram of an example environment that implements the system of FIG. 1A.

FIG. 1C is a diagram of an example environment 180 that implements the system 100 of FIG. 1A to provide integrated home security and home services at a premises 182 (e.g., a house). The premises 182 may have a plurality of zones 190A-D (collectively 190), each of which includes sensors and devices as part of the integrated home security and automation system. In the illustrated example, the zones 190 are defined by a plurality of rooms. Other ways to define multiple zones are also possible. Alternatively, the entire premises can be controlled as a single zone.

In some implementations, each zone 190 may be monitored and controlled independently, such as in different schedules and/or settings, due at least part to different user settings and/or different groups of sensors and devices installed. By way of example, a first zone 190A is configured such that a door sensor is enabled between 7 PM to 6 AM every day and a room temperature is set 70° F., while a second zone 190B is configured such that a motion sensor is enabled between 10 PM to 5 AM Monday through Saturday and a room temperature is set 68° F. Alternatively, at least some of the zones 190 may be monitored and controlled in the same manner.

The zones 190 can include a mix of sensors and devices from the existing security platform 120 and from the security integration system 110. For example, the existing security control device 122 can include a door sensor 128A in a first zone 190A, a window sensor 128B in a third zone 190C, and a window sensor 128C in a fourth zone 190D. In this example, the door sensor 128A can be wired to and controlled through the existing security control device 122. For example, the door sensor 128A can be used to monitor the door opening and closing and transmit a door status signal (e.g., door open/close events) to the existing security control device 122 so that the existing security control device 122 determines whether to generate an alarm signal. In some implementations, the door sensor 128A may be armed or disarmed by a user who can controls the control panel 123. The window sensors 128B and 128C in the third and fourth zones 190C and 190D can be wirelessly connected and controlled by the existing security control device 122. The window sensors 128B and 128C are used to monitor the window opening and closing and transmit window status signals (e.g., window open/close events) to the existing security control device 122 so that the existing security control device 122 determines whether to generate an alarm signal. The control panel 123 can be used by a user to arm or disarm the window sensors 128B and 128C.

As described herein, the security integration system 110 provides the security communicator device 112 that is connected to the existing security control device 122 to integrate and take over the existing security platform 120. In addition, the premises 182 can be provided with additional security sensors, automation devices, and other components (e.g., the peripheral devices 130) that are connected to the security communicator device 112. For example, a smoke/air sensor 132D and a motion sensor 132E are installed in the first zone 190A and wirelessly connected to the security communicator device 112. A motion sensor 132C and kitchen equipment 134C disposed in the second zone 190B are wirelessly connected to the security communicator device 112. A smoke/air sensor 132A, a television 134A, and a mobile device 118 which are disposed in the third zone 190C are wirelessly connected to the security communicator device 112. A motion sensor 132B, an air conditioner 134B, and a user controller 116 (e.g., a touchpad) arranged in the fourth zone 190D are wirelessly connected to the security communicator device 112. As described herein, the security integration system 110 including the security communicator device 112 and the security cloud server 114 operates to centrally manage and control all the sensors, devices, and components that are connected to the existing security control device 122 and the security communicator device 112.

Figure 2:
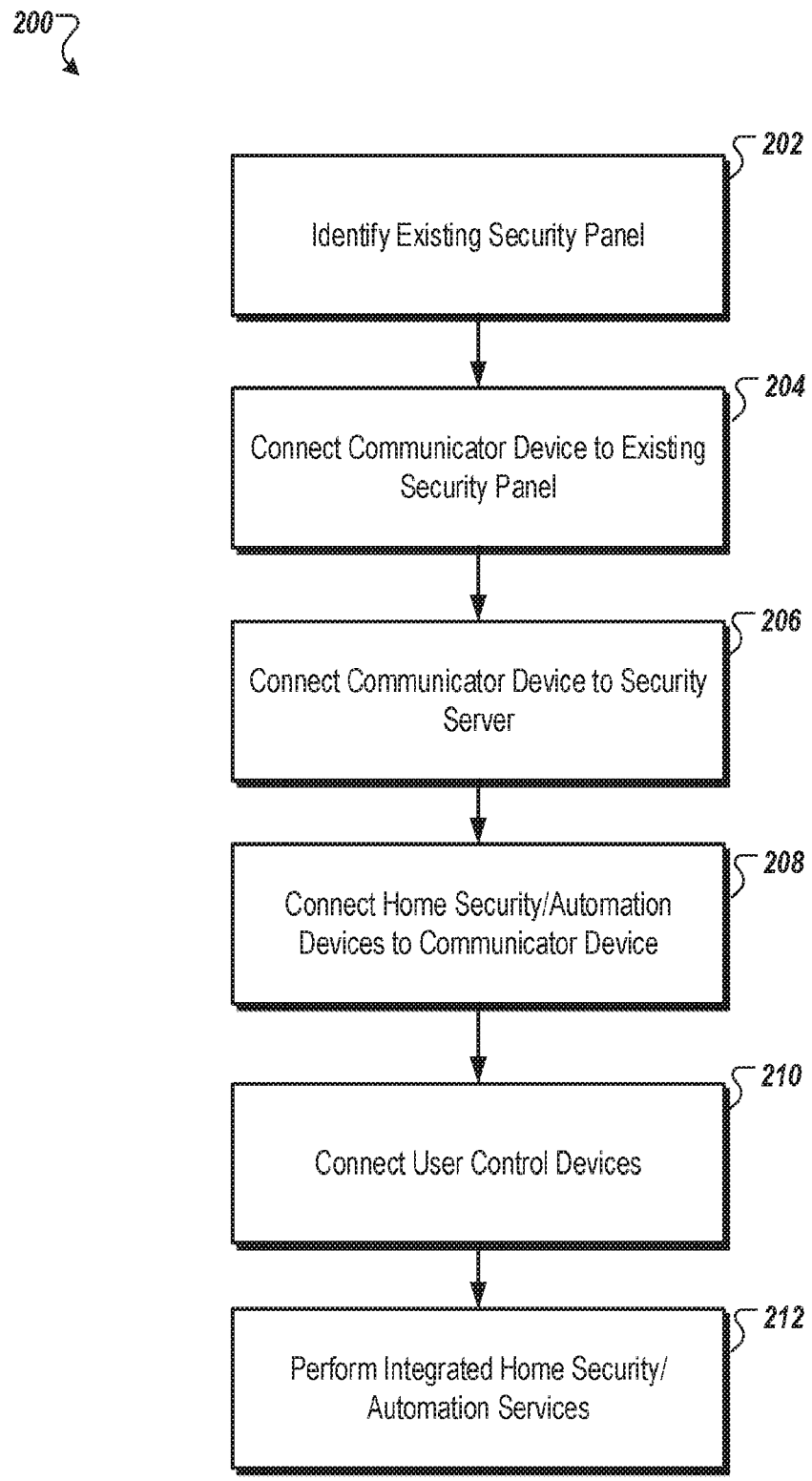
FIG. 2 is a flowchart of an example method for providing an integrated home security and automation service by installing a security communicator device at a premise

FIG. 2 is a flowchart of an example method 200 for providing an integrated home security and automation service by installing a security communicator device at a premise. The method 200 can begin by identifying a security panel (e.g., the existing security control device 122) that exists at a premise (Block 202). For example, an installer can visit a premise and identify an existing security panel at the premise. Then, the security communicator device (e.g., the security communicator device 112) is connected to the security panel (Block 204). In some implementations, the security communicator device is connected to a data bus and/or telephone lines in the security panel. When connected, the security communicator device can be configured to self-configure itself to the security panel by, for example, sensing hardware connections with and signals transmitted with the security panel, and making responsive configurations to enable system functionality.

The security communicator device can be connected to a security server (e.g., the security cloud server 114) (Block 206). The security server can provide various services through the security communicator device.

One or more peripheral devices (e.g., the security devices 132 and the home automation devices 134) can be connected to the security communicator device (Block 208). In some examples, such peripheral devices are not compatible with the security panel, and the security panel may have no hardware or software capability to support the peripheral devices. The security communicator permits for such otherwise incompatible peripheral devices to be connected to the security panel and integrated into the existing security platform. Therefore, the existing security platform can be expanded and enhanced with additional features of the peripheral devices.

User control devices (e.g., the user controller 116 and the mobile device 118) can be connected to the security communicator device (Block 210). User control devices provide a user interface to enable a user to interact with the security communicator device and/or the security server communicating the security communicator device. In addition or alternatively, the user control devices can communicate with the security panel and/or a central monitoring station (e.g., the central monitoring station 124). The user control devices can be connected to remote computing devices (e.g., the security communicator device, the security server, the security panel, and/or the central monitoring station) via one or more networks of various protocols (e.g., the communication networks 166).

When the security communicator device is connected to, and configured to communicate with, the security panel, the security server and/or the security communicator device can perform integrated home security and automation operations (Block 212). Such operations can use sensors connected to the security panel, and/or use the peripheral devices connected to the security communicator devices. For example, the security server can receive data from the security communicator device that has obtained or generated the data using, or related to, the security panel (including sensors connected thereto) and/or peripheral devices connected to the security communicator device. The security server can process the data, and generate and transmit data for controlling and managing the security panel, the sensors connected to the security panel, the security communicator device, the peripheral devices connected to the security communicator device, etc. In addition, the security server can transmit data to the user control devices to provide various home security and automation services to a user.

Figure 3A:
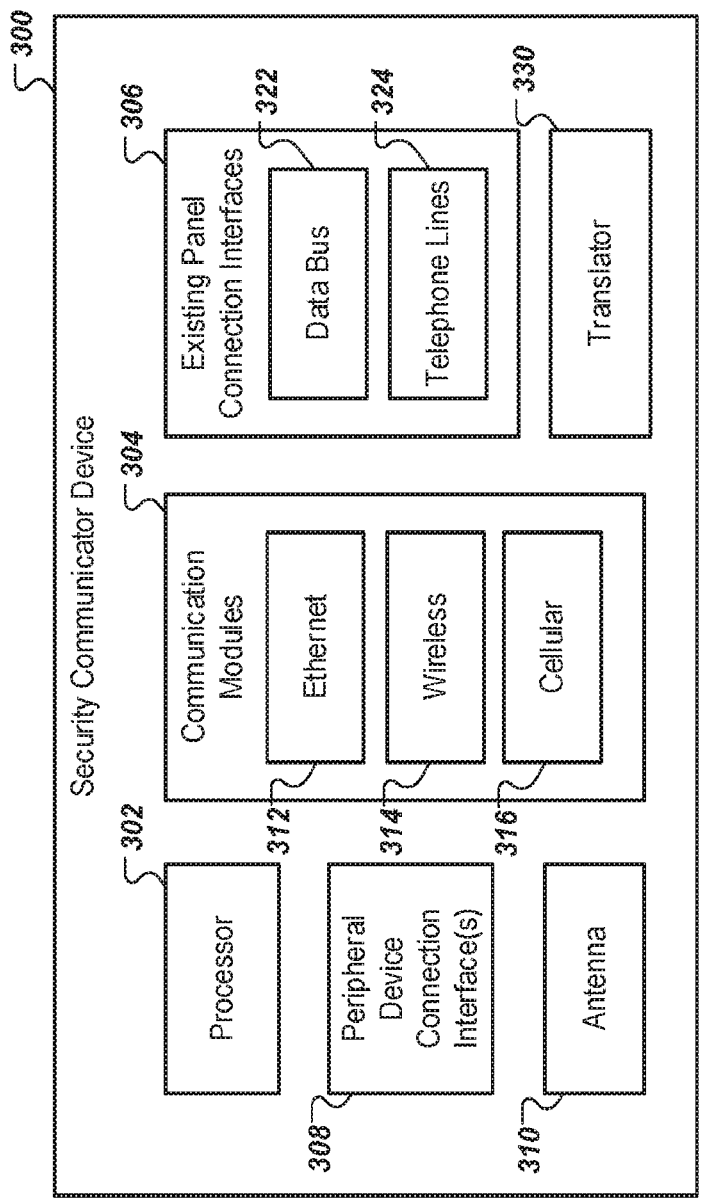
FIG. 3A is a diagram of an example security communicator device configured to provide an integrated home security and automation service

FIG. 3A is a diagram of an example security communicator device 300 configured to provide an integrated home security and automation service. The security communicator device 300 can be used to at least partially implement the security communicator device 112 in FIG. 1A. The security communicator device 300 can include a processor 302, a plurality of communication modules 304, one or more existing panel connection interfaces 306, one or more peripheral device connection interfaces 308, and an antenna 310.

The plurality of communication modules 304 can include an Ethernet port 312, a wireless communication module 314 (e.g., Wi-Fi, Bluetooth, NFC, and/or other suitable wireless protocols), and a cellular communication module 316.

The existing panel connection interfaces 306 can be connected to existing control panels. Depending on the type of an existing control panel to be connected, one of the interfaces 306 can be selected and connected to the existing control panel. The existing panel connection interfaces 306 can a data bus interface 322 (e.g., a RS485 connector), a phone line interface 324, and other data communication interfaces compatible with various types of existing control panels.

The peripheral device connection interfaces 308 can be used to connect peripheral devices (e.g., the peripheral devices 130 including the security sensors 132 and the home automation device 134). The peripheral device connection interfaces 308 can include interfaces of various wired or wireless protocols, such as Ethernet, Wi-Fi, Bluetooth, NFC, cellular, etc. The peripheral device connection interfaces 308 can share hardware and software modules with the existing panel connection interfaces 306. The peripheral device connection interfaces 308 enables peripheral devices to be enrolled into an existing control panel to which the security communicator device 300 is connected via one or more of the existing panel connection interfaces 306. In addition or alternatively, peripheral devices can communicate with a cloud platform (e.g., the security cloud server 114) either directly, or through the security communicator device 300 to which the peripheral devices are connected via one or more of the peripheral device connection interfaces 308, so that the premise is monitored by the cloud platform and/or the security communicator device independent of the security offerings from the existing control panel. This can allow users having their existing security systems upgraded to include the security communicator device 300 to add sensors or other peripheral devices that can be used without triggering alarms on the existing security platform. Accordingly, the security communicator device 300 can support an ability to add both panel monitored and/or cloud monitored sensors to these legacy systems via the existing panel connection interfaces 306. The security communicator device 300 can optionally include one or more internal options to enhance the processor 302, such as an automation hardware chipset/module that is optimized to communicate with and/or process automation-based information and/or a translator receiver chipset/module that is optimized to receive translator communication.

The security communicator device 300 can further include a translator device 330 configured to translate protocol between the security communicator device 300 and an existing security platform to which the security communicator device 300 is connected. The translator 330 can be configured to provide universal translation between a variety of different protocols of different devices.

Figure 3B:
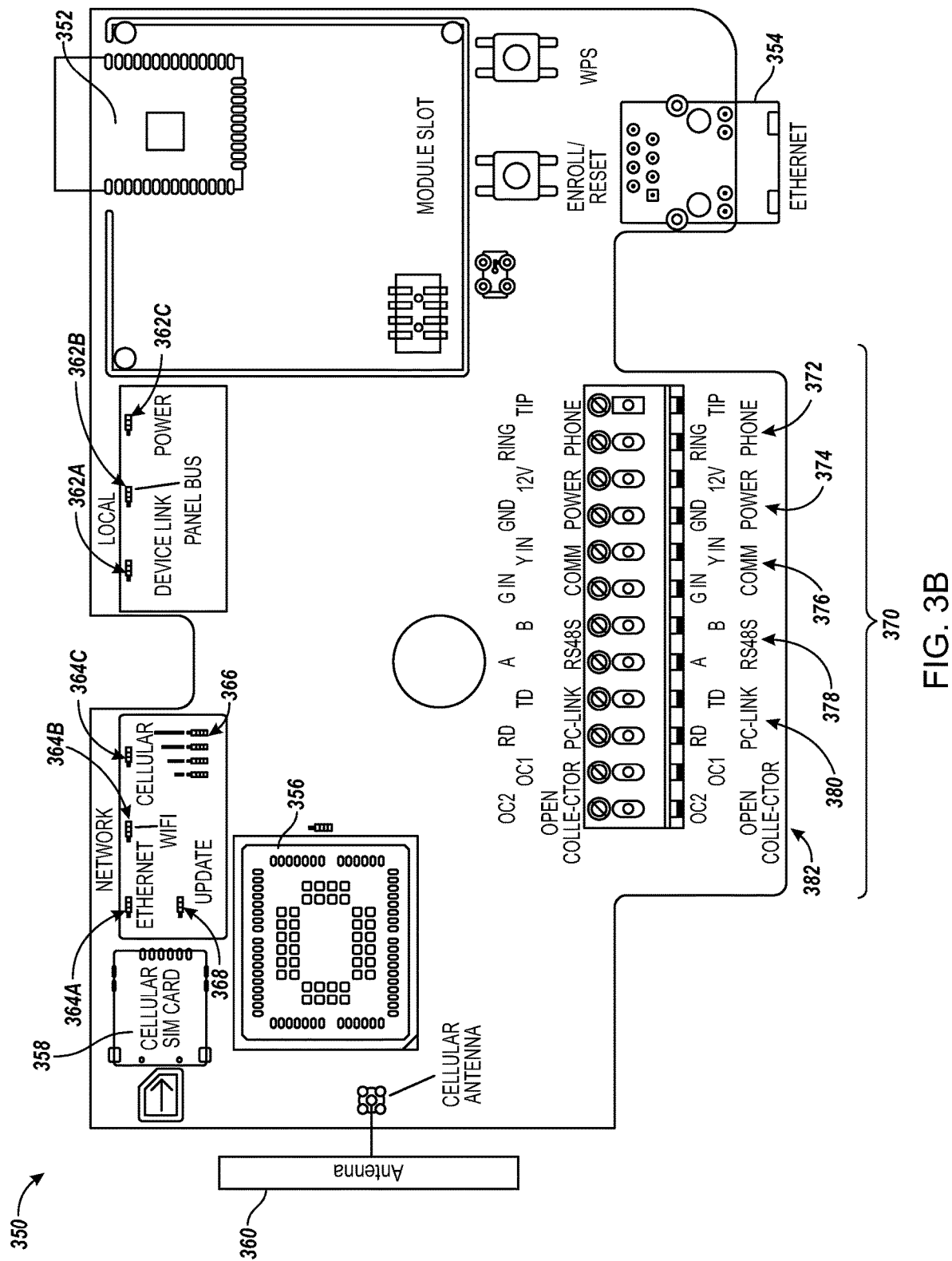
FIG. 3B is a diagram of an example circuit board of the security communicator device.

FIG. 3B is a diagram of an example circuit board 350 of a security communicator device, which can be the security communicator device 300 of FIG. 3A. The circuit board 350 includes a microcontroller 352 with one or more wireless communication capabilities embedded. The microcontroller 352 can integrate Bluetooth, Bluetooth LE, Wi-Fi, and/or other suitable wireless communication interfaces. The circuit board 350 includes an Ethernet terminal 354 which can be used for wired connection to one or more networks via, for example, a router (e.g., the router 160 in FIG. 1A). In addition, the circuit board 350 includes a cellular communication module 356 for cellular connection to one or more remote computing devices, such as the security cloud server 114. The circuit board 350 includes a cellular SIM card slot 358 for receiving a SIM card for cellular communication. The circuit board 350 can include an antenna 360 for wireless communication.

The circuit board 350 includes a plurality of different terminals 370, such as a telephone line terminal 372, a power terminal 374, a communication terminal 376, one or more data bus terminals (such as a data bus terminal 378 and a device link terminal 380), and an open collector terminal 382. The telephone line terminal 372 (e.g., ring and tip terminal) provides an interface for connection to telephone lines of an existing control panel (e.g., the existing security control device 122). The telephone line terminals can be configured to be wired to a telephone line from the existing security control panel. The preexisting security control panel can be configured to use the telephone line to report security alarms to a remote central monitoring system.

The data bus terminal 378 ("RS485") provides an interface for connection to a data bus of a type of an existing control panel (e.g., the existing security control device 122). The device link terminal 380 ("PC-Link") provides an interface for connection to a data bus of another type of an existing control panel (e.g., the existing security control device 122). The data bus terminals are configured to be wired to a data bus of the existing security control panel. The preexisting security control panel can receive and transmit signals over the data bus related to security system. The preexisting security control panel can be communicatively connected to and receive information on sensed conditions in or around the premises from existing security sensors positioned at the premises.

The communication terminal 376 provides an interface for communication with one or more devices or systems. For example, the communication terminal (e.g., a communications interface) can be configured to be connected to one or more devices or systems that are not supported directly by the existing security control panel.

The power terminal 374 provides an interface for connection to an electronic power source. The open collector terminal 382 may be an outbound control port. For example, it may be configured to drive a "keyswitch arming" input terminal on an existing control panel.

Referring still to FIG. 3B, the security communicator device can include one or more local device status indicators, such as a device link indicator 362A, a panel bus indicator 362B, and a power indicator 362C. The device link indicator 362 can indicate on whether the security communicator device connects to one or more devices or systems. For example, the device link indicator 362A can signal when one or more devices or systems are communicatively connected (wirelessly or in a wired configuration) to the security communicator device. The panel bus indicator 362B can indicate on whether the security communicator device is connected to an existing security control system, device, or panel. For example, the security communicator device is wired to the existing security control panel using one of the data bus terminals or the telephone line terminal, the panel bus indicator 362B can signal to confirm such connection. The power indicator 362C is configured to indicate on whether the security communicator device is connected to a power source via, for example, the power terminal.

The security communicator device can include network communication status indicators, such as an Ethernet connection indicator 364A, a Wi-Fi connection indicator 364B, and a cellular connection indicator 364C. The Ethernet connection indicator 364A can indicate a status of Ethernet connection (e.g., between the security communicator device and the security cloud server) using, for example, the Ethernet port. The Wi-Fi connection indicator 364B can indicate a status of Wi-Fi connection (e.g., between the security communicator device and the security cloud server) using, for example, the wireless communication interface (e.g., the microcontroller 352). The cellular connection indicator 364C can indicate a status of cellular connection (e.g., between the security communicator device and the security cloud server) using, for example, the cellular communication interface (e.g., the cellular communication module 356)

In addition, the security communicator device can include a signal strength indicator 366 to indicate the signal strength of wireless and/or wired connections, such as the signal strength of one or more of Ethernet connection, Wi-Fi connection, and the cellular connection.

In addition, the security communicator device can include an update status indicator 368 to indicate an update status of the security communicator device. In some implementations, software and/or firmware update to the security communicator device can be transmitted from the security cloud server and/or other remote computing devices connected to the security communicator device.

The local device status indicators and/or the network communication status indicators can include lighting devices (e.g., LED signal bulbs) that can turn on/off, change their colors, and/or blink at different frequencies. Other types of indicators can be used for the local device status indicators.

Figure 3C:
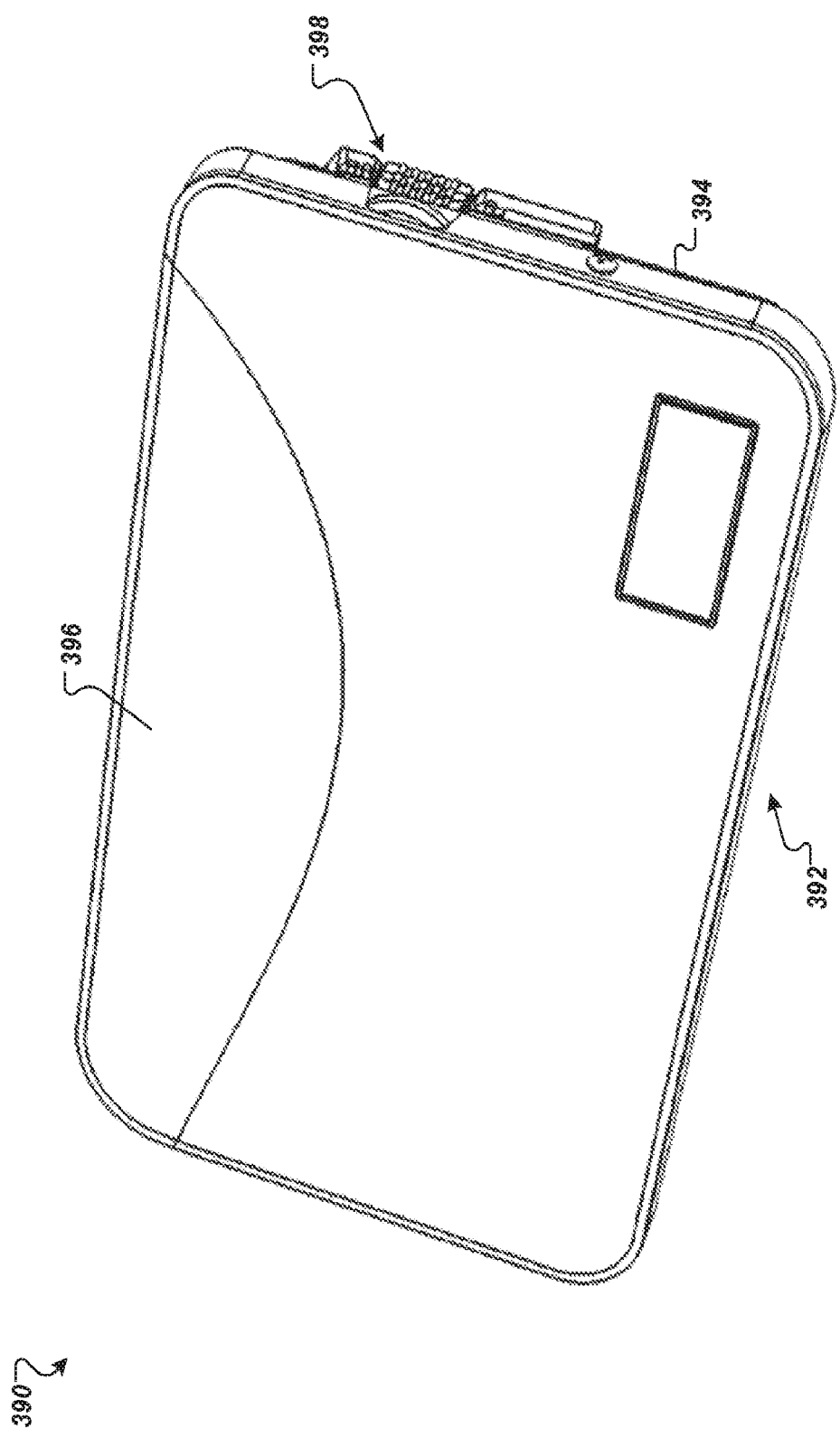
FIG. 3C illustrates an example housing for a security communicator device.

FIG. 3C illustrates an example housing 390 for a security communicator device. The housing 390 can be used to house the security communicator device 300 of FIG. 3A or the circuit board 350 of FIG. 3B. The housing 390 includes no or minimal user interface. The housing 390 includes an opening 392 at a side to permit access to the Ethernet terminal 354 and other terminals 370 of the device. The housing 390 can include a base plate 394 and a cover plate 396, which are removably coupled to each other using, for example, a snap-lock 398.

Figure 4:
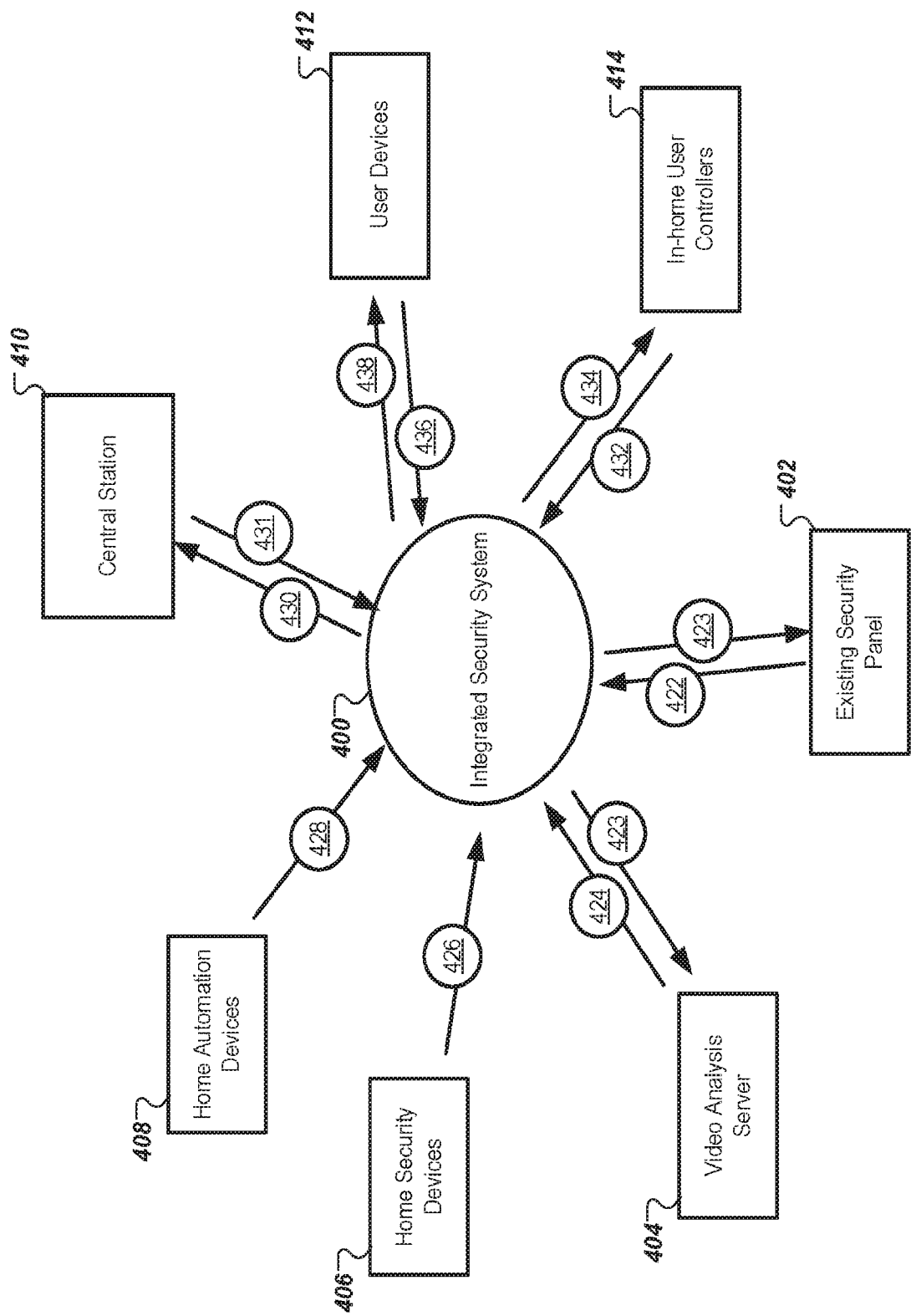
FIG. 4 illustrates an example operation of an integrated security system for centralizing all home security and automation controls.

FIG. 4 illustrates an example operation of an integrated security system 400 for centralizing all home security and automation controls. In some implementations, the integrated security system 400 can be implemented by the security cloud server 114 through the security communicator device 112. Alternatively, the integrated security system 400 can be implemented by the security communicator device 112 with or without communicating with the security cloud server 114. Alternatively, at least part of the integrated security system 400 can be implemented in the existing security platform 120.

The integrated security system 400 can communicate with an existing security panel 402, a video analysis server 404, one or more home security devices 406, one or more home automation devices 408, a central station 410, one or more in-home user control devices 412, and one or more user devices 414.

The integrated security system 400 can receive data 422 from the existing security panel 402 (e.g., the existing security control device 122). The data 422 can include an alarm status, an armed/disarmed status, sensor signals, trouble indication, etc. In some implementations, the integrated security system 400 can transmit command data 423 to the existing security panel 402 to control the existing security panel 402.

The video analysis server 404 operates to receive image data (e.g., still images or video stream) captured using an image capture sensor (e.g., a camera), and process the data for security purposes. For example, an image capture sensor can be one of the security devices 406 and/or the home automation devices 408, and operates to capture images (e.g., still images or videos) and transmit data 423 for the images to the video analysis server 404 either directly or via the existing security panel 402 and/or the integrated security system 400 (e.g., the security communicator device 112 and/or the security cloud server 114). The video analysis server 404 can process the received images and provide video verification data 424 to the integration security system 400. In addition, the video analysis server 404 can perform various analytics of the images and transmit the results to the integration security system 400.

The home security devices 406 and the home automation devices 408 can transmit to the integrated security system 400 data 426, 428 representative of detected sensor signals, status signals, and other suitable signals associated with the devices 406, 408. The home security devices 406 and the home automation devices 408 can be existing (e.g., legacy) devices connected to the existing security panel 402, and/or new devices being added to the integrated security system 400 independently from the existing security panel 402. Examples of the home security devices 406 include door and window sensors, automated locks, alarms, lighting, motion detectors, security cameras, glass break detectors, and other suitable security components. Examples of the home automation devices 408 include thermostats, lights, garage door controllers, sensors, occupancy detectors, home appliances, leak detectors, smoke detectors, CO detectors, and other suitable devices associated smart home controls.

The home automation devices 408 can communicate with the integrated security system 400 in both ways to permit for the integrated security system 400 to control the home automation devices 408. In addition, the home security devices 406 can communicate with the integrated security system 400 in both ways to permit for the integrated security system 400 to control the home security devices 406.

The integrated security system 400 can communicate with the central station 410 for various security purposes. For example, the integrated security system 400 can transmit a signal 430 to the central station 410 to report an event so that the central station 410 can take appropriate action, such as calling appropriate authorities (e.g., police or fire station). In addition, the integrated security system 400 can receive from the central station 410 a status signal 431 indicative of the status of the action being taken. In some implementations, the integrated security system 400 is connected to the central station 410 through the existing security panel 402. Alternatively, the integrated security system 400 can communicate directly with the central station 410.

The integrated security system 400 can communicate with the in-home user control devices 412 (e.g., touchpads) to receive user control inputs 432 via the in-home user control devices 412, and transmit various information 434 for displaying home security and automation status on the in-home user control devices 412. Similarly, the integrated security system 400 can communicate with the user devices 414 (e.g., user's mobile devices) to receive user control inputs 436 via the user devices 414, and transmit various information 438 for displaying home security and automation status on the user devices 414.

The integrated security system 400 operates to receive all the data from the existing security panel 402, the video analysis server 404, the home security devices 406, the home automation devices 408, the central station 410, the in-home user control devices 412, and the user devices 414, and can combine or synthesize the data for providing centralized, integrated, and enhanced home security and automation services.

Figure 5:
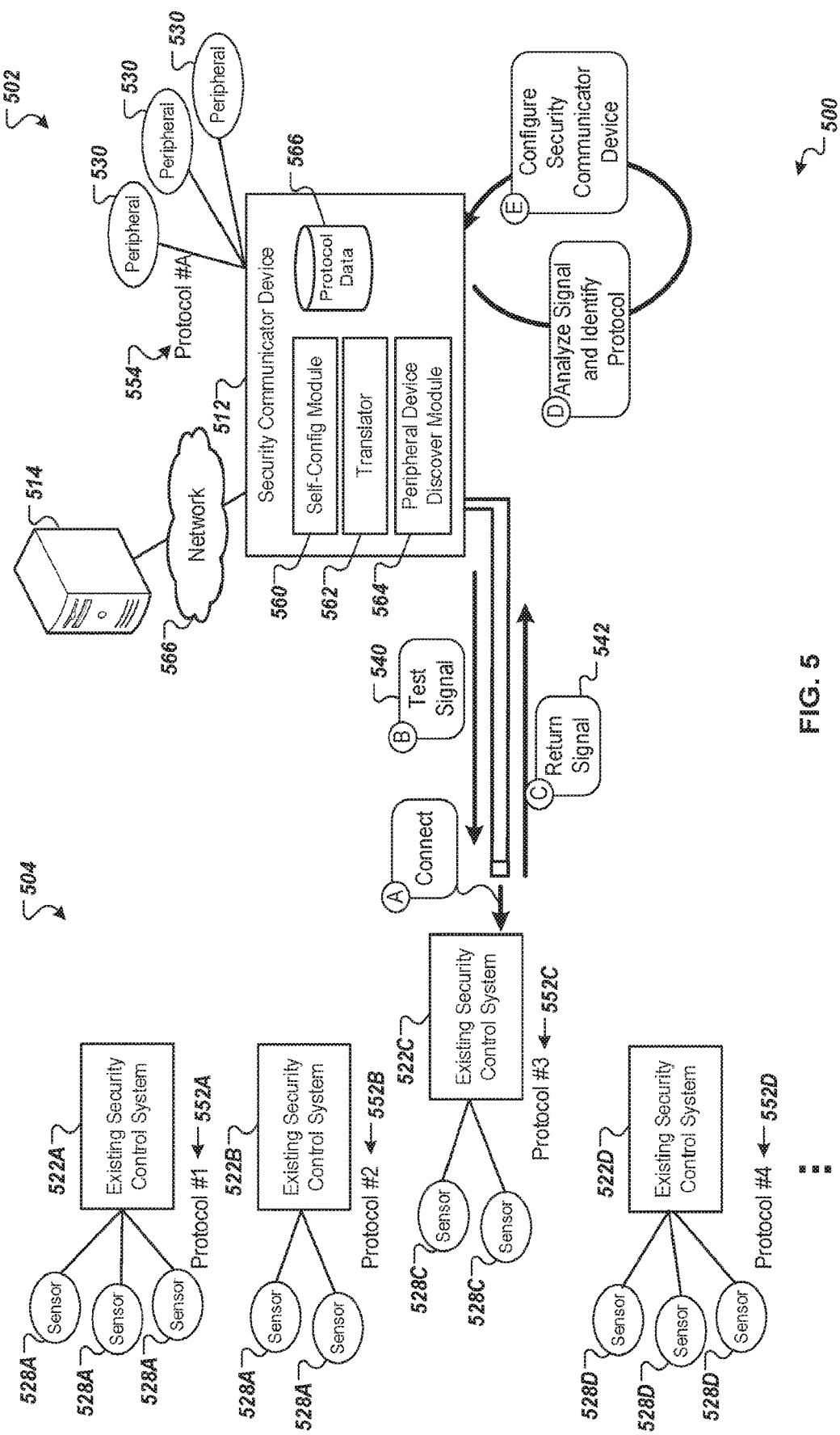
FIG. 5 illustrates an example technique for connecting a security integration system to an existing security platform.
Figure 7:
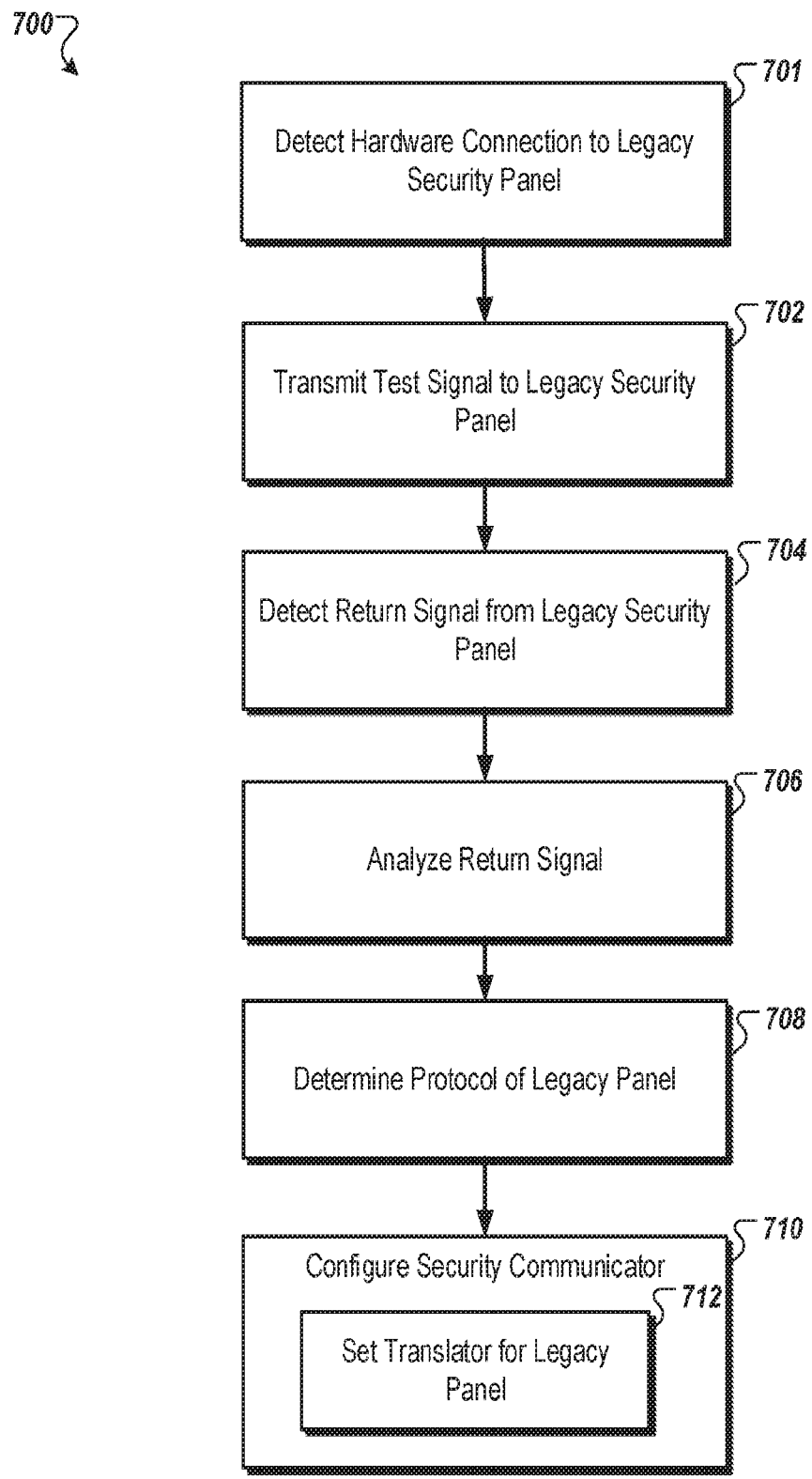
FIG. 7 is a flowchart of an example process for automatically configuring a security communicator device.

Referring now to FIGS. 5-7, an example technique 500 for connecting a security integration system 502 to an existing security platform 504 and automatically configuring the security integration system 502 to be compatible with the existing security platform 504. A security communicator device in the security integration system 502 can at least partially self-program to communicate with an existing panel in the existing security platform 502 when the security communicator device is connected to the existing panel. For example, when connected to the existing panel, the security communicator device can automatically detect a type (e.g., a protocol) of the existing panel, and adapt itself to permit for communication with the existing panel to take over at least partially the features and functionalities of the existing panel. Such automatic detection and configuration may facilitate installation with the existing security platform without complicating setups and configurations.

The security integration system 502 can be used to implement the security integration system 110 and/or the integrated security system 400, and/or be part of the security integration system 110 and/or the integrated security system 400. The security integration system 502 includes a security communicator device 512 and a security cloud server 514, which are similar to the security communicator device 112 and the security cloud server 114. The security cloud sever 514 is communicatively connected with the security communicator device 512 via one or more networks 566, which is similar to the networks 166 (including one or more broadband networks and one or more cellular networks). The existing security platform 504 is similar to the existing security platform 120, and includes an existing security control device 522, which is similar to the existing security control device of the existing security platform 120.

Similarly to those described in FIG. 1B, the security communicator device 512 is capable of being connected to one or more of different existing security control devices 522A, 522B, 522C, 522D, etc. (collectively 522) in a wired configuration using a cable 574. Alternatively, the security communicator device 512 can be wirelessly connected to one or more existing security control devices 522. Such existing security control devices 522 may be made by different manufacturers, and use different protocols, functions, and/or operational models. In the illustrated example, the security communicator device 512 is connected to an existing security control device 522C. As described herein, the security communicator device 512 can be wired to the existing security control device 522 through one or more communication interfaces (e.g., data bus, telephone lines, etc.) that are available from the existing security control device 522.

When the security communicator device 512 is connected to the existing security control device 522, the security communicator device 512 can be automatically configured (e.g., self-configuration) to be compatible with the existing security control device 522. For example, the security communicator device 512, when connected, is self-configured without an installer's input, to communicate with the existing security control device 522 even if a protocol used by the existing security control device 522 is not compatible with a protocol of the security communicator device 512. For example, the security communicator device 512 is configured to self-configure itself to the existing security control device 522 by sensing a hardware connection with, and/or a signal transmitted with, the existing security control device 522, and making responsive configurations to enable system functionality.

The security communicator device 512 can include a self-configuration module 560, a translator 562, and a peripheral device discover module 564. The self-configuration module 560 operates to identify a type of the connected existing security control system and configure the security communicator device 512 to be compatible with the connected existing security control system. The translator 562 operates to enable communication between the security communicator device 512 and the connected existing security control device 522 that use different protocols. The peripheral device discover module 564 is configured to automatically or with limited user assistance discover, enroll, and/or configure the security communicator device 512 to, respond to, and passes on information from peripheral devices 530 (similar to the peripheral devices 130).

An example self-configuration process can be performed by first connecting a security communicator device 512 to an existing security control device 522 (Step A). For example, an installer locates an existing security control device 522C at the premises, and brings and connects the security communicator device 512 to the existing security control device 522C using, for example, a cable 574. The cable 574 can be connected to data bus, telephone lines, or other available communication interfaces of the existing security control device 522C. Alternatively, the security communicator device 512 can be wirelessly connected to the existing security control device 522C at the premises. In some implementations, a wireless communication with the existing security control device 522C may be encrypted, and thus an encryption process may be required to enable a wireless communication between the security communicator device 512 and the existing security control device 522C.

When the connection is made between the security communicator device 512 and the existing security control device 522C, a test signal 540 can be transmitted to the existing security control device 522C (Step B). For example, the security communicator device 512 can transmit to the existing security control device 522C the test signal that can be generated by the security communicator device 512 and/or the security cloud server 514. The test signal 540 can be a preset signal that is dedicated for a self-configuration process, or a signal that is typically generated by the security communicator device 512 and/or the security cloud server 514 in a normal operation.

The security communicator device 512 detects a signal 542 from the existing security control device 522C (Step C). The signal 542 can be a signal returned from the existing security control device 522C in response to the test signal 540 from the security communicator device 512. Alternatively, the security communicator device 512 can receive the signal 542 without sending the test signal 540 as described in Step B above.

The security communicator device 512 can analyze the signal 542 and identify a protocol of the existing security control device 522C based on the analysis (Step D). The security communicator device 512 can analyze the signal 542 to find the types of data coming from the existing security control device 522C. One or more aspects of the signal 542 can be identified, examples of which include modulation types, frequency shifts, differential signals, data rates, data pack lengths, error checking, and/or other suitable physical and/or logical aspects of data. In addition, different physical ports being used can be detected and used for the signal analysis.

A variety of methods can be used to determine a protocol of the existing security control device 522 based on the identified aspects of the signal 542. For example, a pattern matching can be used to identify a protocol that matches one or more of the identified aspects of the signal 542. In some implementations, protocol data 568 is provided which provides a list of protocols that are used by different types of multiple existing security control devices 522, and attributes of each of the protocols. The protocol data 568 can be used to identify a protocol of the connected existing security control device 522 by comparing the identified aspects of the signal 542 with the attributes of different protocols provided by the protocol data.

Although the security communicator device 512 is primarily described as analyzing the signal and identifying the protocol, it is understood that the security cloud server 514 can perform at least part of the analysis and identification and communicate with the security communicator device 512.

When the protocol of the existing security control device 522 is identified, the security communicator device 512 can configure itself to be compatible with the existing security control device 522 (Step E). In some implementations, the security communicator device 512 is provided with a translator 562. Self-configuration of the security communicator device 512 can include setup of the translator 562 for the existing security control device 522. The translator 562 may be configured to enable communication between the security communicator device 512 and an existing security control device 522 to which the security communicator device 512 is connected, when the security communicator device 512 and the connected existing security control device 522 use different protocols. As illustrated in FIG. 5, for example, the existing security control device 522C connected to the security communicator device 512 may communicate with associated sensors and other devices 528 (e.g., the sensors 128) using a first protocol 552C (e.g., Protocol #3), and process information provided by the sensors and other devices and determine an appropriate system operation, such as issuing an alarm message. In the meantime, the security communicator device 512 is configured to communicate with the peripheral devices 530 (e.g., the peripheral devices 130) using a second protocol 554 (e.g., Protocol #A). The translator 562 is configured to serve integration and translation functions so that the security communicator device 512 communicates with the existing security control device 522 and/or take over at least part of the features and functionalities of the existing security control device 522.

Referring still to FIG. 5, the translator 562 is configured to translate protocol between the security communicator device 512 and the existing security control device 522. The translator 562 is configured to translate one or more multiple protocols 552 (including 552A-D) (e.g., Protocols #1, #2, #3, #4, etc.) to a protocol 554 (e.g., Protocol #A) that is used by the security communicator device 512, and/or translate the protocol 554 to the multiple protocols 552. The translator 562 may provide universal translation between a variety of different protocols 552 of different existing security control devices 522 and the protocol 554 of the security communicator device 512. This includes translating between protocols with mismatched features, such as translating between a first protocol that includes device types and a second protocol that does not include device types, and translating between a third protocol that uses a single packet to represent an event and a fourth protocol that uses multiple packets to represent the same event. The self-configuration process of the security communicator device 512 includes automatically identifying a protocol of the existing security control device 522 to which the security communicator device 512, and configuring the translator 562 to be able to translate between the protocol of the existing security control device 522 and the protocol of the security communicator device 512.

The translator 562 can translate among multiple different protocols by using a universal/intermediate protocol into which an incoming packet is translated and then from which the outgoing packet is translated. For example, the translator 562 can translate from a first protocol into the universal/intermediate protocol and then from the universal/intermediate protocol into a second protocol. The universal/intermediate protocol can provide a variety of advantages, including efficiently providing a system that can translate between multiple different protocols without requiring specific protocol-to-protocol mappings.

FIGS. 6A and 6B illustrate two different example packet, or data, protocols that may be used by a wireless and/or wired security system, such by the translator devices and systems described throughout this document. Protocol #1 shown in FIG. 6A is described in part in U.S. Pat. No. 5,801,626 to Addy, and Protocol #2 shown in FIG. 6B is described in part in U.S. Pat. No. 4,855,713 to Brunius. The charts of FIGS. 6A and 6B show the order and nature of the bits of data that are sent in a data packet. Protocol #1 is a 64-bit packet, whereas Protocol #2 is a 59-bit packet. The example Protocol #1 and Protocol #2 are examples of the multiple protocols that the translator devices and systems described throughout this document, such as the translator 562, can translated between.

The data packet protocol in FIG. 6A may be referenced, for illustration purposes, as an existing system protocol that a universal translator translates into another protocol, such as data packet protocol in FIG. 6B, which may be referenced as an expansion system protocol. As such, and referring to FIG. 5, the existing security control device 522 and its peripheral sensors and devices 528 may use the Protocol #1 of FIG. 6A, and the security communicator device 512 may use the Protocol #2 of the FIG. 6B. That said, it will be appreciated that Protocol #1 may be the protocol used by the existing system-sensors, and Protocol #2 is the expansion protocol used by the new system control device and new sensors that may be implemented in the system. In addition, the two protocols may simply both be used in a new system being installed.

Referring to FIG. 6A, Protocol #1 is a 64 bit protocol, and starts with 16 introductory bits that may be referred to as training bits so the receiver sees that a message is coming (bits B0 through B15). The introductory bits include one pre-start bit (B0), 14 synchronization bits (B1-B14), and one start bit (B15). The synchronization bits have a predefined pattern and may be used to allow a receiver (for example, a system control device) to synchronize its detection capabilities with the timing of the transmission so that the information provided later in the data packet can be accurately and reliably detected. These synchronization bits may also be used to give the receiver time to settle its AGC (automatic gain control) and antenna switching activities in preparation for the data bits to come. Bits B16-B39 provide a unique identifier code for the particular sensor-transmitter device, or in other words, a device ID code. These numbers may be randomly assigned at a factory (with 1×224 different numbers possible), with the idea being that it is extremely unlikely that two sensor-transmitters with the same identity code will be distributed by the manufacturer for installation in or near the same wireless security system installation, and hence, every sensor-transmitter in a given system will have a unique identifier code that distinguishes it from the identifier codes of the other sensor-transmitters in the system and any sensor-transmitters used in any neighboring systems.

In some cases, a manufacturer may not utilize all possibilities of identity codes (that is, all of the 1×224 different ID codes) for fielded systems. For example, some ID codes (or ranges of ID codes) may be reserved for future use, testing, or some other reason. There may also be restrictions in certain alarm panels (system control devices) on acceptable or valid ID codes, and as such, an integration device may need to be aware of this. For example, if an integration device blindly translates an ID code for a sensor-transmitter (for example, a Protocol #1 sensor-transmitter) into another format (for example, Protocol #2), the integration device may translate the ID code (for example, for a Protocol #1 sensor-transmitter) to a rejected ID code on that panel (for example, a panel that is designed to communicate using Protocol #2), and thus would be rejected by the control panel. Accordingly, in these cases the integration device may check for these cases and ensure that all transmitted IDs in Protocol #2 are valid ID codes that will be received by a Protocol #2 control panel.

It also deserves mention that while some protocols have device type indicator bits, Protocol #1 shown in FIG. 6A does not, on its face, utilize a device type indicator. Typical device types may be, for example, a door-window sensor, a smoke sensor, a key fob device, etc. Device type information may useful to the system control device, so that the system control device is able to interpret the sensor state information unique to that device type provided by a particular sensor-transmitter, and react appropriately. Although the identity code information would not appear to utilize a device type indicator, it may be in some cases that the assignment of identity codes is not entirely random, and that certain sets of identity codes (ranges of ID codes, for example) may be put only in a certain type of sensor-transmitter. In such a case, the 24-bit identity code may contain sensor type information that a system control device would interpret as such (for example, because the ID code is within a range specifically for the particular device type).

Protocol #1 includes eight sensor state information bits (B40-B47). This group of bits provides information about the sensor and sensed conditions made by the sensor. The first four of these bits (B40-B43) are state bits for particular pins that may be in the sensor device and connected to a sensing point. For example, one pin may be connected to a reed switch that is able to detect if a door or window is open or closed. In other words, if the door is open (and the reed switch is normally closed when the door is closed), the pin would be high (and the bit would be 1), whereas the pin would be low when the door is closed (and the bit would be 0). Another pin may be tied to a tamper switch, intended to detect a situation wherein someone is trying to destroy or open up a sensor housing to disable the sensing and transmitting components. Another pin may be tied, for example, to external contacts provided on the sensor-transmitter housing. For example, a single sensor-transmitter may have a built-in reed switch monitoring a door, and its external contact may be wired to another reed switch that monitors a nearby window, for example. Not all the pins for which state information is provided need be used. Indeed, it is often the case that one or more of the pins are configured so that they are not used, and are always a 1 (tied high) or always a 0 (tied low), for example.

The next sensor state information bit B44 is a low-battery indicator. As described previously, the sensor-transmitters may be battery operated, and this information may be provided so as to inform a facility operator, for example a homeowner, and/or a monitoring company that a battery of a particular one of the sensor-transmitters needs to be replaced. A one (1) being transmitted for this bit may indicate, for example, that the battery is low. The next bit B45 is a supervisory bit, which indicates, for example, that the transmission is one that is a periodic "checking in," or supervisory transmission, instead of a transmission that was prompted by a state change. Each of the sensor-transmitters may provide a supervisory transmission periodically, for example, every half hour or so, or other periodic intervals.

The next state information bit B47 is a power-up indicator, which indicates that the sensor-transmitter has just powered up, for example, a battery has just been put in the sensor-transmitter, and this is the first transmission being made by the sensor-transmitter. A power-up transmission may be used, for example, in the enrollment process in which sensors to be used with a security system are enrolled into a system control device, as will be explained in more detail later. The last bit B47 of the sensor state information is a bit that indicates that the sensor-transmitter has supervisory transmission capability, given that some-sensor transmitters may be configured so that they do not make frequent supervisory transmissions, which may be desirable to save battery power. In addition, sensors that are taken off-site are typically not supervised. This may include key fobs, for example.

The final 16 bits are error checking bits, which may be, for example, a cyclical redundancy check (CRC). These bits provide information to ensure that all of the preceding bits were received and detected accurately as a one or a zero, as the case may be. If there is a discrepancy, a received packet may be ignored, and the next received packet will be used instead.

In operation, a sensor-transmitter using protocol #1 may make a transmission immediately following the occurrence of a state change, for example, a door has opened, thus changing the state of a corresponding reed switch, and the state of a pin tied to that reed switch. The transmission may be done in two sets of five redundant transmissions of the entire data packet of 64 bits. For example, upon a door opening, a sensor-transmitter may send a first set of five identical packets of 64 bits each in rapid succession, followed by a pause, and then a second set of five of the same identical packets. Thus, in total, a transmission corresponding to a state change may trigger the sending of ten identical, redundant packets. This redundancy accounts for the fact that multiple different sensor-transmitters may be in the environment transmitting at the same time, and so there may be collisions of those transmissions that prevent data from being received and interpreted properly. In one manner in which this protocol may be utilized in practice, once a particular data packet configuration is determined, all 10 subsequent transmissions will be the same, and will not be interrupted despite that a change in state may have occurred during the course of the 10 packets being transmitted.

A supervisory transmission sequence may consist of only one set of five redundant packets sent in rapid succession, in that it may not be important that any one supervisory transmission be missed. Although half the number of packets as set when there is a change of state, the operation for supervisory transmissions is similar in that all five packets are sent with the same packet information, despite that state information may have changed during the course of transmitting all five of these identical packets.

Referring now to FIG. 6B, Protocol #2 is a 59-bit protocol, and starts with 16 introductory bits of data (bits B0 through B15). The introductory bits include 15 synchronization bits (B0-B14), and one start bit (B15). As with Protocol #1, the synchronization bits of Protocol #2 are provided in a predefined pattern and may allow the receiver (system control device, for example) to synchronize its detection capabilities with the timing of the transmission so that the information provided later in the data packet can be accurately and reliably detected, and/or give the receiver time to settle its AGC and antenna switching activities in preparation for the data bits to come.

The next set of bits B16-B35 provide a unique identifier code for the particular sensor-transmitter device. As with Protocol #1, these identifier code numbers may be randomly assigned at a factory (with 1×220 different numbers possible for this protocol), with the idea being again that it is extremely unlikely that two sensor-transmitters with the same identity code will be distributed by the manufacturer for installation in or near the same wireless security system installation. As such, every sensor-transmitter in a given system will have a unique identifier code that distinguishes it from the identifier codes of the other sensor-transmitters in the system and any sensor-transmitters used in any neighboring systems.

Bits B36-B39 in Protocol #2 are a four-bit device type indicator. Typical device types may be, for example, a door-window sensor, a smoke sensor, a key fob device, etc. Sixteen different device types are possible with protocol #2, owing to the fact that four bits define the device type. Device type information may need to be known by the system control device 106, so that the system control device 106 is able to interpret the sensor state information provided by a particular sensor-transmitter. For example, in one device type, an external contact switch may be associated with certain sensor state information bit (for example, bits B50-B51), whereas in a different device type, those bits may be unused. In another example, the interpretation of a key fob may be programmed to be completely different than a door-window sensor; for example, the key fob can arm/disarm the security system while the door-window sensor does not typically have this ability.

The next set of three bits (B40-B42) are packet count bits. These bits increment on each packet that is transmitted. This allows a receiver to determine if a packet was missed, or that the receiver is receiving a duplicate transmission of a set of eight packets and thus the transmission can be ignored.

Protocol #2 includes twelve sensor state information bits (B43-B54), four more than Protocol #1. This group of bits in Protocol #2 provides information about the sensor and sensed conditions of the sensor as is the case with the eight sensor state information bits from Protocol #1, but the nature of the state information is quite different between the two protocols. For example, Protocol #1 provides information about the recent past (a latch state) in addition to the currently existing state of the sensor.

The sensor state information bits of Protocol #2 begin with a low battery indicator bit (B43), similar to bit B44 from Protocol #1. The remaining 11 bits (B44-B54) of the sensor state information for Protocol #2 provides state and latch information for five separate channels F1 to F5. These five channels are similar to the pins in Protocol #1, and may be tied to one or two reed switches, an external switch, a tamper switch, etc. The F3 channel may be tied to a tamper switch in all device types. Not all of the channels need to be used with every sensor-transmitter.

A state bit for a channel indicates the current state for a particular channel. For example, if a reed switch for a door tied to channel F1 indicates that the door is currently closed, the state bit for F1 (B44) will have a value that indicates a closed state for the door. A latch bit for a channel reflects a latch having been set associated with the channel going into a state that may in some cases be an alarm condition, such as the opening of the door. Thus, if a door associated with channel F1 is opened, state bit B44 will have a value that indicates the state of the door is open, and the latch bit B45 will have a value that indicates the door has been recently opened (for example, a value of one). The opening of the door sets the latch regardless of whether the opening of the door is an alarm condition or not. That is because if the system control device has been armed, the opening of the door will be considered an alarm, but if the system is not armed, the opening of the door will not be considered to be an alarm. The door sensor-transmitter does not know, however, whether the system is armed or not; hence, the latch is set whenever the door is opened.

The opening of the door initiates the transmission of multiple 59-bit data packets in rapid succession, as with Protocol #1. In particular, a counter device of the sensor-transmitter may be set to eight, and is decremented by one as each packet is sent, and so assuming the opened door is not immediately closed again, the opening of the door will cause eight 59-bit packets to be sent in rapid succession. The latch is reset (from 1 to 0, for example) when the packet counter decrements zero.

If, before the packet counter device decrements all the way to zero, the opened door is then closed, the counter in the sensor-transmitter will be reset to eight again, so that a full complement of eight packets are sent for the newly closed condition of the door. The latch bit will remain set (for example, with a value of one) reflective of the fact that the door was recently opened, because as mentioned, the latch bit does not reset (to a zero value, for example) until the transmission counter device decrements all the way to zero. If the open door, instead of being closed again before eight packets are sent, instead is closed only after all of the eight packets are sent, and the latch bit is reset to zero, then the change of state of the door (that is, the closing of the door) still initiates a new set of eight 59-bit packets. In this case, however, the latch bit is not set to one, because the closing of a door is not a condition that is indicative of an alarm condition.

As shown in FIG. 6B, each of the first four channels F1 to F4 has a state bit and a single latch bit. That is because each of these channels is associated with a normally closed contact. The fifth and final channel F5 has a state bit and two complementary latch bits, a positive latch bit (B52) and a negative latch bit (B52). That is because this channel F5 is associated with an external contact that may have a normally closed contact or a normally open contact. In that a normally closed contact will want its latch set upon the contact being opened (an alarm condition), the positive latch and associated latch bit B53 serves that purpose. In that a normally open contact will want its latch set upon the contact being closed (an alarm condition), the negative latch and negative latch bit B52 serves that purpose.

The next three bits (B55-57) of Protocol #2 are parity bits for error checking on the bits sent in the preceding bits of information. The final bit (B58) for Protocol #2 is a stop bit.

FIG. 7 is a flowchart of an example process 700 for automatically configuring a security communicator device. The security communicator device, such as the security communicator device 112, can be self-configured when connected to an existing security panel (e.g., a legacy security panel). This can allow an installer to install a security communicator device to a legacy security panel without having to be specially trained in the identification of the legacy security panel and the setup of the security communicator device against the legacy security panel.

The process 700 can begin by detecting hardware connection to the legacy security panel (Block 701). For example, when a security communicator device is first wired to the legacy security panel by an installer, the security communicator device can automatically detect connection with the legacy security panel.

A test signal is transmitted to the legacy security panel that has been installed at the premises (Block 702). For example, when a security communicator device is first wired to the legacy security panel by an installer, the security communicator device can automatically transmit a test signal to the legacy security panel to monitor the operation of the legacy security panel in response to the test signal.

A return signal from the legacy security panel is detected (Block 704). For example, the security communicator device can receive a signal returned from the legacy security panel in response to the test signal. Alternatively, Block 702 is optional, and the security communicator device can simply tap a signal from data bus, telephone lines, or other available data transmission lines from the legacy security panel, without transmitting the test signal to the legacy security panel.

The signal from the legacy security panel is analyzed (Block 706). For example, the signal can be analyzed to detect one or more aspects of the signal. Examples of such signal aspects include modulation types, frequency shifts, differential signals, data rates, data pack lengths, error checking, ports being used, and/or other suitable physical and/or logical aspects of data in the signal.

A protocol of the legacy security panel is determined (Block 708). The protocol that is used for communication between the legacy security panel and legacy sensors and devices connected thereto is determined. The protocol of the legacy security panel can be determined based on the identified signal aspects. A variety of methods can be used to determine the protocol of the legacy security panel. For example, a pattern matching can be used to identify a protocol that matches one or more of the identified signal aspects. In some implementations, protocol data can be stored and provided by, for example, the security communicator device and/or a cloud server connected to the security communicator device. The protocol data include a list of protocols which are used by different types of legacy security panels. The protocol data can be used to identify the protocol of the legacy security panel at the premises by comparing the identified signal aspects with the attributes of different protocols provided by the protocol data.

The security communicator device is automatically configured (Block 710). For example, the security communicator device can configure itself to be compatible with the legacy security panel. In some implementations, the security communicator device is self-configured by setting a translator for the legacy security panel (Block 712). For example, the determined protocol can be used to set up and configure the translator such that the translator permits communication between the security communicator device and the legacy security panel which use different protocols.

Figure 10:
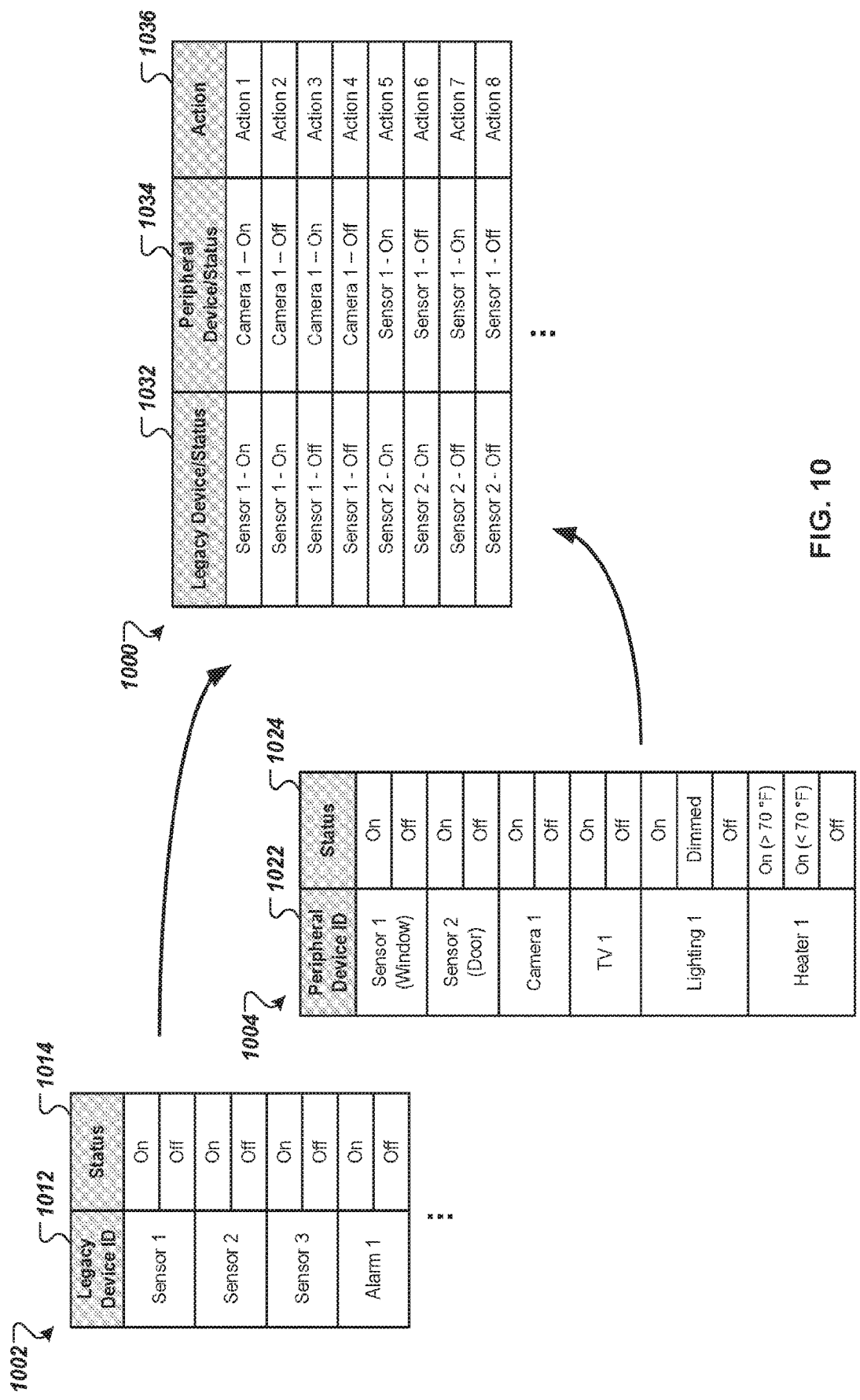
FIG. 10 illustrates example data that provide a list of actions according to a blend of legacy data from a legacy security panel and additional data from a security communicator.

Referring now to FIGS. 8-10, an example technique 800 for blending information from an existing security platform 804 with other inputs, such as inputs from peripheral devices 830 (e.g., sensors, automation devices, etc.) of a security integration system 802, to provide for integrated control of security and automation devices at a premise.

The security integration system 802 can be used to implement the security integration system 110 and/or the integrated security system 400, and/or be part of the security integration system 110 and/or the integrated security system 400. The security integration system 802 includes a security communicator device 812 and a security cloud server 814, which are similar to the security communicator device 112 and the security cloud server 114. The security cloud sever 814 is communicatively connected with the security communicator device 812 via one or more networks 866, which is similar to the networks 166 (including one or more broadband networks and one or more cellular networks). The existing security platform 804 is similar to the existing security platform 120, and includes an existing security control system 822, which is similar to the existing security control device of the existing security platform 120. The existing security control system 822 can connect to one or more existing devices 827, such as sensors (e.g., the sensors 128), control panels (e.g., keypads) (e.g., the control panel 123), and an audio output device (e.g., the sound output device 126). The security communicator device 812 can connect to one or more peripheral devices 830, such as sensors (e.g., the security sensors 132) and automation devices (e.g., the home automation devices 134).

Similarly to those described in FIG. 1B, the security communicator device 812 is capable of being connected to one of different existing security control systems 822 in a wired configuration. Alternatively, the security communicator device 812 can be wirelessly connected to the existing security control system 822. Such existing security control systems 822 may be made by different manufacturers, and use different protocols, functions, and/or operational models. As described herein, the security communicator device 812 can be wired to the existing security control system 822 through one or more communication interfaces (e.g., data bus, telephone lines, etc.) that are available from the existing security control system 822.

When the security communicator device 812 is connected to the existing security control system 822, the existing security control system 822 can be disconnected from the existing communication network (e.g., telephone, cable, and/or Internet services) so that the existing security control system 822 does not communicate with a central monitoring station 824 (e.g., the central monitoring station 124). In addition or alternatively, the functionalities of the existing security control system 822 can be at least partially disabled, and/or modified so that the security communicator device 812 takes over at least part of the operation of the existing security control system 822.

When the security communicator device 812 is connected to the existing security control system 822, the security communicator device 812 can listen to data from the existing security control system 822. Such data can include information about alarm status, device status (e.g., status of an existing device 827 connected to the existing security control system 822), etc. The data can be tapped from the communication interface (e.g., data bus, telephone lines, etc.) of the existing security control system 822 to which the security communicator device 812 is connected.

In addition, the security communicator device 812 can receive inputs from other security and automation devices which are separate from the existing security control system 822 and connected to the security communicator device 812. For example, the security communicator device 812 can receive inputs from peripheral devices 830 (e.g., the peripheral devices 130), such as sensors, cameras, home automation devices, etc., connected to the security communicator device 812. Such inputs can include sensor/device status, trouble indication, battery status, alarm status, and other information associated with the peripheral devices 830 connected to the security communicator device 812.

The data from the existing security control system 822 can be blended with the inputs from the devices connected to the security communicator device 812, and such blended data can be used to determine one or more actions for controlling at least part of the entire security and automation system (including both the security integration system 802 and the existing security platform 804). For example, as illustrated also in FIG. 1C, a premise may have a plurality of zones 840 (including 840A and 840B) (e.g., the zones 190 in FIG. 1C), each of which may be controlled independently. Each of the zones 840 may include one or more existing devices 827 being part of the existing security platform 804, and/or one or more peripheral devices 830 being added as part of the security integration system 802. The blended data can be used to determine an appropriate action for controlling a mix of the existing devices 827 and the peripheral devices 830 in each of the zones 840.

In some implementations, the security cloud server 814 can receive and combine the data from the existing security control system 822 and the inputs from the peripheral devices 830, and determine one or more appropriate actions for controlling the existing devices 827 and the peripheral devices 830 through the security communicator device 812 and/or the existing security control system 822. Alternatively, at least part of such process in the security cloud server 814 can be performed locally by the security communicator device 812.

The control scheme by the security communicator device 812 can vary for different existing security control systems 822. For example, for an existing security control system having data bus, the security communicator device can intercept the data bus to take over the control of the existing security control system (e.g., control alarm). For an existing security control system without data bus or for an existing security control system that haven't been integrated with the security communicator device, the security communicator device can intercept a phone line from the existing security control system to get information (e.g., alarm report). Further, the security communicator device can transmit the intercepted data (e.g., alarm report) over to the cloud server for processing and analysis. In addition, the cloud server can obtain other data (which are not available from legacy systems) from other sources (existing and new sensors, etc.). The cloud server can process the intercepted data (e.g., the alarm report) and such other data, and use the data for integrated controls and functionalities with multiple devices/systems together.

Referring still to FIG. 8, the security communicator device 812 can include a translator 862 that enables communication between the security communicator device 812 and the connected existing security control system 822 that use different protocols. Alternatively, the translator 862 is not included in the security communicator device 812 and may be provided separately.

The existing security control system 822 connected to the security communicator device 812 may communicate with associated existing devices 827 using a first protocol 852 (e.g., Protocol #1), and process information provided by the sensors and determine an appropriate system operation, such as issuing an alarm message. In the meantime, the security communicator device 812 is configured to communicate with the peripheral devices 830 using a second protocol 854 (e.g., Protocol #A). The translator 862 is configured to serve integration and translation functions so that the security communicator device 812 communicates with the existing security control system 822 and/or take over at least part of the features and functionalities of the existing security control system 822.

In some implementations, the translator 862 is configured to translate one or more multiple protocols 852 used by different existing security control systems to a protocol 854 (e.g., Protocol #A) that is used by the security communicator device 812, and/or translate the protocol 854 to the multiple protocols 852. This includes translating between protocols with mismatched features, such as translating between a first protocol that includes device types and a second protocol that does not include device types, and translating between a third protocol that uses a single packet to represent an event and a fourth protocol that uses multiple packets to represent the same event. In some implementations, the translator 862 can translate among multiple different protocols by using a universal/intermediate protocol into which an incoming packet is translated and then from which the outgoing packet is translated. For example, the translator 862 can translate from a first protocol into the universal/intermediate protocol and then from the universal/intermediate protocol into a second protocol. The universal/intermediate protocol can provide a variety of advantages, including efficiently providing a system that can translate between multiple different protocols without requiring specific protocol-to-protocol mappings.

With reference still to FIG. 8, an example process for integrated security and automation control can be performed by obtaining a signal 842 from the existing security control system 822 (Step A). The signal 842 can represent a signal generated by one or more existing devices 827 and received by the existing security control system 822. The signal 842 can include information about sensor status, alarm status, and other suitable information associated with the existing security control system 822 and/or the existing devices 827 connected to the existing security control system 822.

The security communicator device 812 can receive and translate the signal 842 to a modified signal 844 (Step B). In some implementations, the security communicator device 812 converts the signal 842 to the modified signal 844 when the protocol of the signal 842 is not compatible with the protocol of the security communicator device 812. For example, the translator 862 can convert the signal 842 of a first protocol (e.g., Protocol #1) to the modified signal 844 of a second protocol (e.g., Protocol #A). Once converted, the security communicator device 812 can transmit the modified signal 844 to the security cloud server 814 for analysis (Step C). In embodiments where no translation is needed, the security communicator device 812 can route the signal 842 to the security cloud server 814 with no or little modification to the signal 842.

In addition, a peripheral signal 846 to the security cloud server 814 can be obtained from one of more peripheral devices 830 connected to the security communicator device 812 (Step D). For example, the security communicator device 812 receives the peripheral signal 846 from the peripheral devices 830 and transmits it to the security cloud server 814 for analysis. The peripheral signal 846 can represent inputs from the peripheral devices 830, such as sensor/device status, trouble indication, battery status, alarm status, and other information associated with the peripheral devices 830 connected to the security communicator device 812.

The security cloud server 814 can receive the modified signal 844 (or the signal 842 if there is no translation) and/or the peripheral signal 846, and blend the signals to generate combined data (Step E). Then, the security cloud server 814 can determine a security action based on the combined data (Step F). In some implementations, security control rules 870 are provided and used to determine such a security action. The security control rules 870 can provide a list of actions to be taken based on different combinations between possible statuses of existing devices connected to the existing security control system and possible statuses of peripheral devices connected to the security communicator device.

The security action includes one or more operations to be performed by the security communicator device 812, the existing security control system 822, and/or the security cloud server 814, and/or other components associated with the device 812, the system 822, and/or the server 814.

By way of example, if a sensor signal representative of a motion in a room (e.g., a zone) is first detected from one of the peripheral devices connected to the security communicator device 812, no surveillance image for a space outside a house near the room is captured from one of the peripheral devices connected to the security communicator device 812, and an alarm signal representative of an open window is detected from the existing security control system 822, then the combination of the detected sensor signal, no surveillance image, and the alarm signal can lead to a security action that causes the security communicator device 812 (and then the existing security control system 822) to stop the alarm, understanding that a resident inside the house accidentally opens the window without disarming the security system.

The security cloud server 814 can transmit one or more control signals 848 to the security communicator device 812 (Step G). The control signals 848 can be generated to represent the security action determined by the security cloud server 814. The security communicator device 812 can perform a desired action based on the control signals 848 (Step H). By way of example, the security communicator device 812 can control the peripheral devices 830 according to the control signals 848.

In addition or alternatively, the control signals 848 can include data for controlling the existing security control system 822 and/or the existing devices 827 associated with the system 822. In such cases, the security communicator device 812 converts at least part of the control signals 848 to one or more modified control signals 850 (Step I). In some implementations, the security communicator device 812 converts the control signals 848 to the modified control signal 850 when the protocol of the control signals 848 is not compatible with the protocol of the existing security control system 822. For example, the translator 862 can convert the control signals 848 of the second protocol (e.g., Protocol #A) to the modified control signals 850 of the first protocol (e.g., Protocol #1). Once converted, the security communicator device 812 can transmit the modified control signals 850 to the existing security control system 822 (Step J). When receiving the modified control signals 850, the existing security control system 822 can perform a desired action based on the modified control signals 850 (Step K). By way of example, the existing security control system 822 can control the existing devices 827 according to the modified control signals 850. In embodiments where no translation is needed, the security communicator device 812 can route at least part of the control signals 848 to the existing security control system 822 with no or little modification to the control signals 848.

FIGS. 9A and 9B is a flowchart of an example method 900 for providing integrated home security and automation control based on a blend of inputs from a legacy security panel 902 (e.g., the existing security control system) and a security communicator 904 (e.g., the security communicator device). As described herein, the security communicator 904 and a security cloud 906 are used to upgrade or take over a legacy security platform associated with the legacy security panel 902 with additional functionalities provided by the security communicator 904 and the security cloud 906. In some implementations, at least some functionalities of the legacy security panel 902 can be disabled, limited, and/or modified when connected to the security communicator 904 so that the entire security system at the premise are fully integrated and centralized by the security communicator 904 and the security cloud 906. For example, the legacy security panel 902 is communicatively disconnected from a central monitoring station 908, and the security cloud 906 and/or the security communicator 904 can instead communicate with the central monitoring station 908 for appropriate actions.

The legacy security panel 902 can receive one or more legacy device signals from legacy sensors and other devices connected to the legacy security panel 902 (Block 912). The legacy device signals can include information about device status, alarm status, and other information associated with the legacy sensors and other devices. The legacy security panel 902 transmits the legacy device signals to the security communicator 904 connected to the legacy security panel 902 (Block 914).

The security communicator 904 receives the legacy device signals from the legacy security panel 902 (Block 916). In some implementations, the security communicator 904 converts the legacy device signals to modified legacy signals when a protocol used by the legacy security panel 902 is not compatible with a protocol used by the security communicator 904 (Block 918). The modified legacy signals have the protocol compatible with the security communicator 904. The security communicator 904 transmits the modified legacy signals to the security cloud 906 (Block 920).

In addition or alternatively, the security communicator 904 receives peripheral device signals from peripheral devices (e.g., sensors and automation devices) connected to the security communicator 904 (Block 922). The peripheral device signals can include information about device status, alarm status, and other information associated with the peripheral devices connected to the security communicator 904. The security communicator 904 transmits the peripheral device signals to the security cloud 906 (Block 924).

The security cloud 906 receives the modified legacy signals from the security communicator (Block 930). In addition or alternatively, the security cloud 906 receives the peripheral device signals from the security communicator (Block 932). The security cloud 906 determines security/automation events based on the modified legacy signals and/or the peripheral device signals (Block 934). For example, the statuses of the devices, structures, and elements being associated with and/or modified by the legacy devices and/or the peripheral devices can be identified based on the modified legacy signals and/or the peripheral device signals. By way of example, the security cloud 906 can interpret the modified legacy signals and/or the peripheral device signals to determine whether a window in a basement is opened, whether a motion is detected in a living room, whether a refrigerator door is closed in a kitchen, whether smoke is detected in an upper room, etc.

The security cloud 906 determines one or more actions to be taken based on the identified security/automation events (Block 936). Such actions can include turning on/off an alarming sound, controlling home automation devices (e.g., thermostats, air conditioners, heaters, boilers, lights, stoves, refrigerators, etc.), controlling sensors and cameras, sending notifications to user computing devices, reporting to appropriate authorities (e.g., police, fire station, etc.), etc. The security cloud 906 generates control signals based on the determined actions and transmit the control signals to the security communicator 904 (Block 938).

The security communicator 904 receives the control signals from the security cloud (Block 940). In some implementations, the security communicator 904 converts the control signals to modified control signals when the protocol used by the security communicator 904 is not compatible with the protocol used by the legacy security panel 902 (Block 942). The modified control signals have the protocol compatible with the legacy security panel 902. The security communicator 904 transmits the modified control signals to the legacy security panel 902 (Block 944).

The legacy security panel 902 receives the modified control signals from the security communicator 904 (Block 946). The legacy security panel 902 performs one or more actions based on the modified control signals (Block 948). For example, the legacy security panel 902 processes the modified control signals to identify actions to be taken, and control the legacy devices connected to the legacy security panel 902 according the identified actions.

In addition or alternatively, the security communicator 904 performs desired actions with the peripheral devices based on the control signals (Block 950). For example, the security communicator 904 processes the control signals to identify actions to be taken, and control the peripheral devices connected thereto according to the identified actions.

In addition or alternatively, the security cloud 906 performs desired actions with the central monitoring station 908 based on the determined actions (Block 952). For example, the desired action may include reporting to the central monitoring station 908 so that the central monitoring station 908 takes appropriate actions, such as deploying security personnel, calling authorities, etc. The central monitoring station receives a request/report from the security cloud 906 and performs such appropriate actions (Block 954).

Although it is primarily described that the security communicator receives and transmits the legacy device signals and the peripheral device signals separately, it is understood that the legacy device signals and the peripheral device signals are transmitted together, or transmitted as combined signals, to the security cloud. Further, the security cloud may control both the legacy devices (e.g., existing devices) and the peripheral devices (e.g., new devices) at the same time.

Referring to FIG. 10, example data 1000 are described which provides a list of actions 1010 according to a blend of legacy data 1002 from a legacy security panel and additional data 1004 from a security communicator. The data 1000 can be used to provide the security control rules 870 in FIG. 8.

For example, the legacy data 1002 include information associated with a legacy security panel and associated legacy devices, such as sensors, keypads, speakers, etc. For example, the legacy data 1002 can include a legacy device identifier 1012 for identifying each legacy device connected to the legacy security panel, and a status 1014 of each legacy device.

The additional data 1004 include information associated with a security communicator that is connected to the legacy security panel to integrate and centralize home security and automation control at a premise, thereby updating the legacy security system. In addition or alternatively, the additional data 1004 include information associated with peripheral devices which are connected to the security communicator, such as security sensors, automation devices, and other suitable devices connected to the security communicator. For example, the additional data 1004 can include a peripheral device identifier 1022 for identifying each peripheral device connected to the security communicator, and a status 1024 for each peripheral device.

The blended data 1000 provides different permutations of the legacy data 1002 and the additional data 1004, and an action to be taken according to each permutation. For example, each set 1032 of legacy device identifier 1012 and status 1014 can be combined with each set 1034 of peripheral device identifier 1022 and status 1024, and each combination is associated with an action 1036 for controlling the legacy devices and/or the peripheral devices as a whole.

Figure 11A:
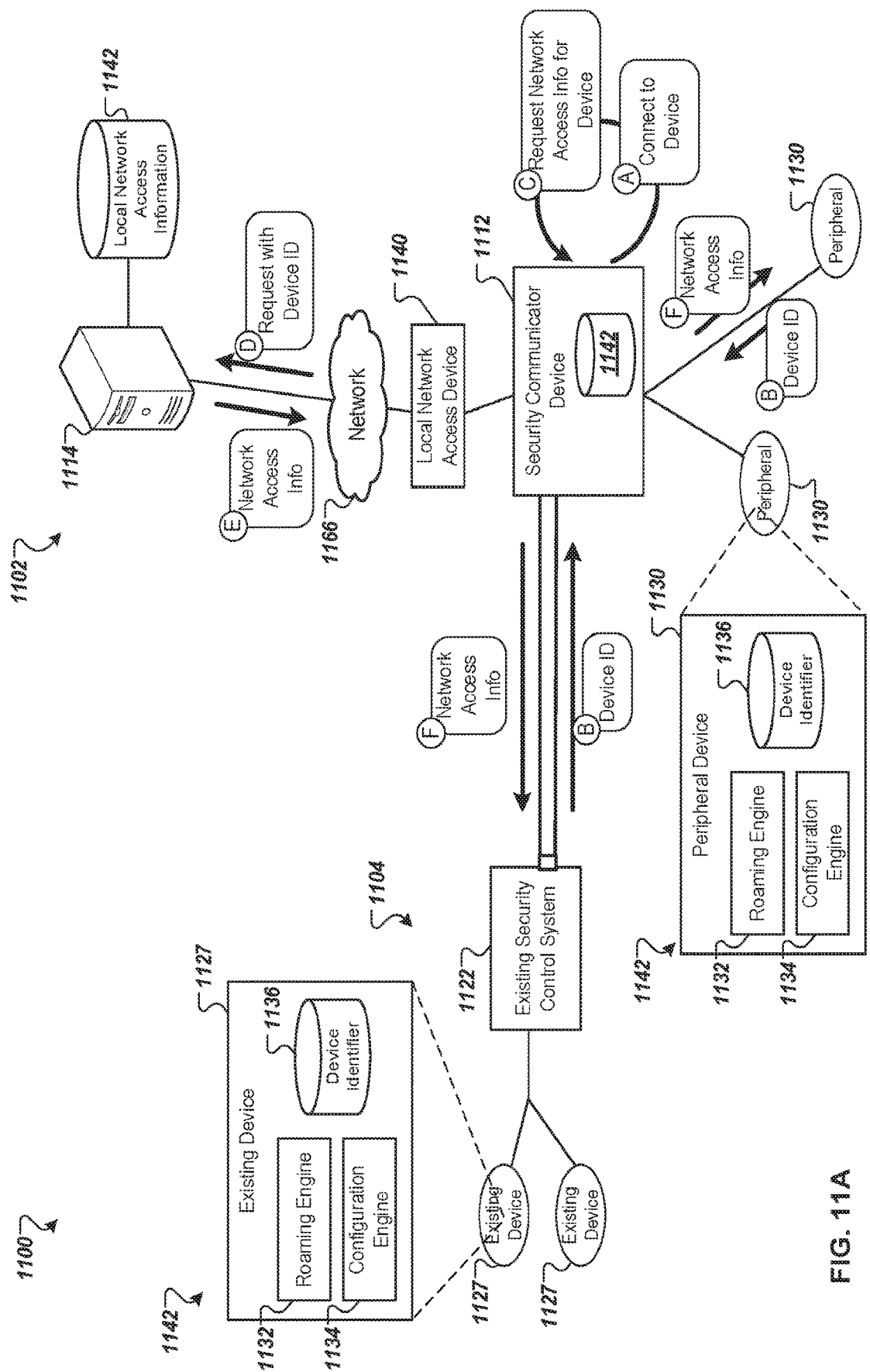
FIG. 11A illustrates an example system for provisioning and/or configuring security devices through a security communicator device.
Figure 11B:
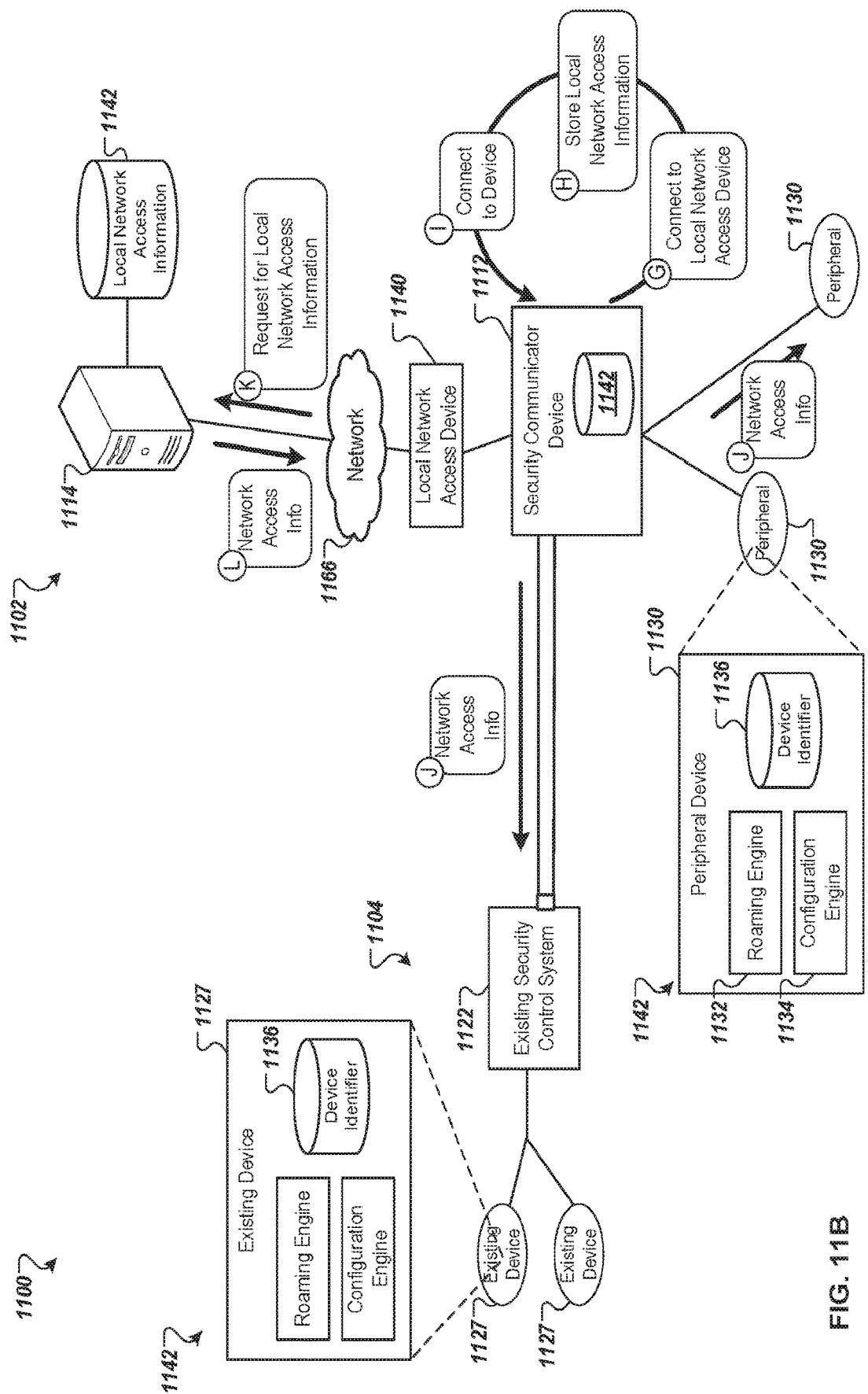
FIG. 11B illustrates an example system for provisioning and/or configuring security devices through a security communicator device.
Figure 12:
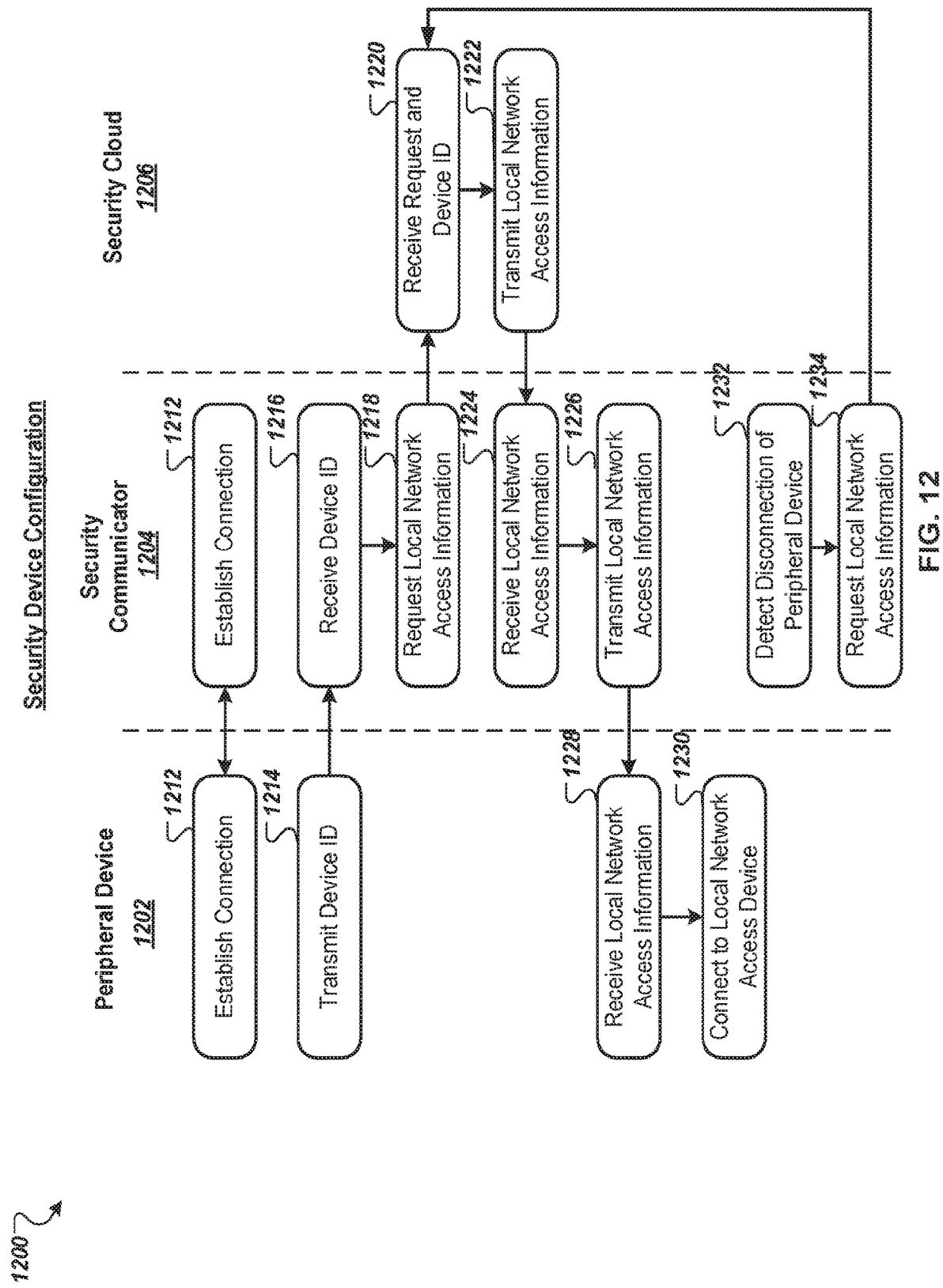
FIG. 12 is a flowchart of an example method for automatic configuration of a security device against a local network access device.
Figure 13:
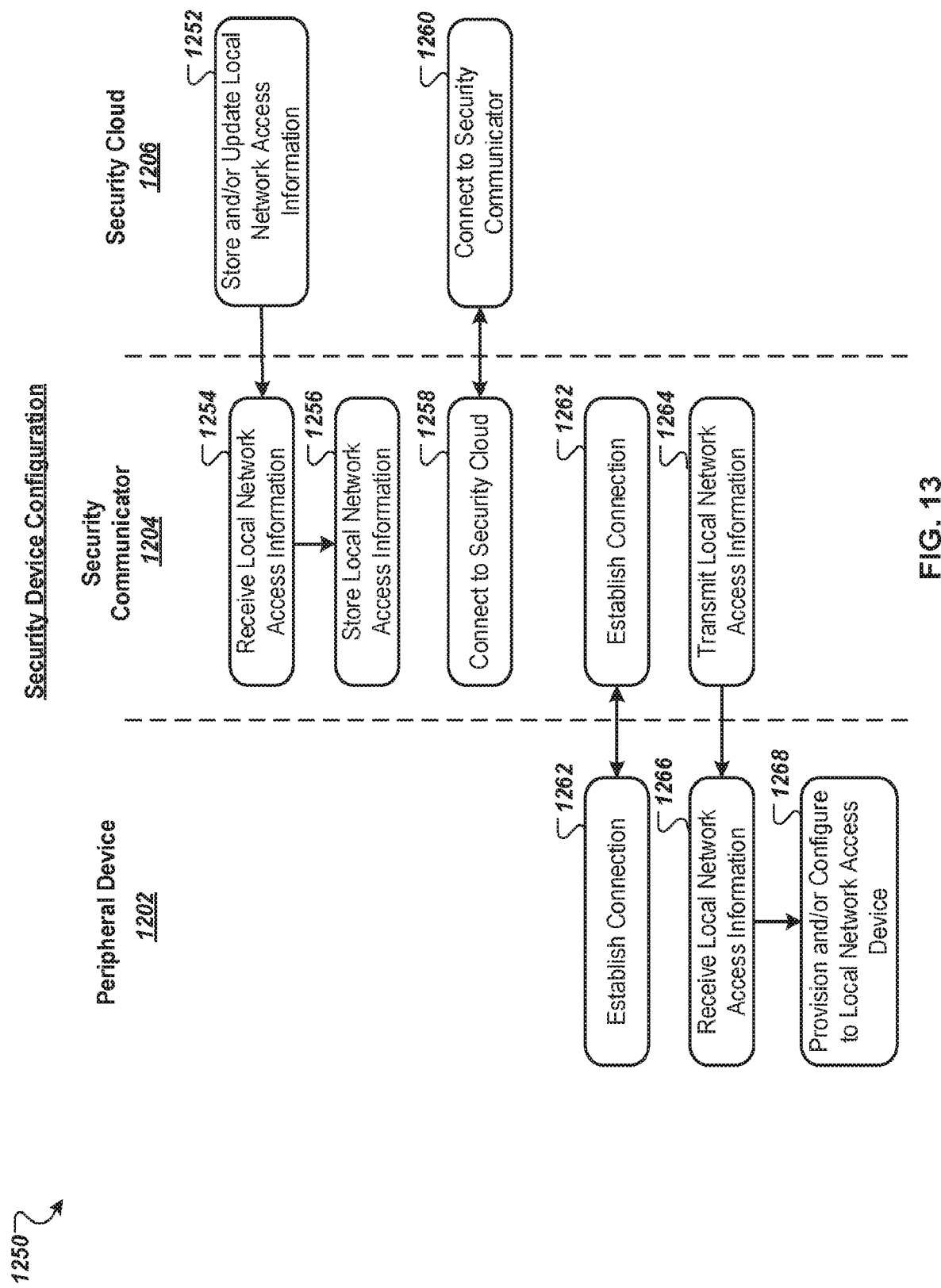
FIG. 13 is a flowchart of an example method for automatic configuration of a security device 1202 against a local network access device.

Referring now to FIGS. 11-13, an example technique 1100 for remotely setting up and/or configuring security devices (e.g., sensors, cameras, etc.) through a security integration system 1102 to allow automated setup and/or configuration of such devices and permit for the devices to be immune to changes to local network settings. Such security devices can include home automation devices.

The security integration system 1102 can be used to implement the security integration system 110 and/or the integrated security system 400, and/or be part of the security integration system 110 and/or the integrated security system 400. The security integration system 1102 includes a security communicator device 1112 and a security cloud server 1114, which are similar to the security communicator device 112 and the security cloud server 114. The security cloud server 1114 is communicatively connected with the security communicator device 1112 via one or more networks 1166, which are similar to the networks 166 (including one or more broadband networks and one or more cellular networks). The existing security platform 1104 is similar to the existing security platform 120, and includes an existing security control system 1122, which is similar to the existing security control device of the existing security platform 120. The existing security control system 1122 can connect to one or more existing devices 1127, such as sensors (e.g., the sensors 128), control panels (e.g., keypads) (e.g., the control panel 123), and an audio output device (e.g., the sound output device 126). The security communicator device 1112 can connect to one or more peripheral devices 1130, such as sensors (e.g., the security sensors 132) and automation devices (e.g., the home automation devices 134).

The security integration system 1102 can further include a local network access device 1140 (e.g., the router 160). In some implementations, the local network access device 1140 is secured and cannot be accessed without using correct local network access information. The local network access device 1140 can be a device that connects to one or more networks (e.g., a wireless or wired local area network, a wide area network, etc.). Some examples of the local network access device 1140 include Wi-Fi access points and routes, Bluetooth access points and routers, and other suitable access points and routers.

Security devices 1124, such as the existing devices 1127 and the peripheral devices 1130, can detect and transmit measurements, status information, and/or other data, to the security communicator device 1112 directly or via other devices such as the existing security control system 1122, the local network access device 1140, or other devices and/or networks. Such measurements, status information, and/or other data can be transmitted from the security communicator device 1112 to the security cloud server 1114. In addition, the security devices 1124 can receive commands or instructions from the security cloud server 1114 via the security communicator device 1112 or from the security communicator device 1112.

Similarly to those described in FIG. 1B, the security communicator device 1112 is capable of being connected to one of different existing security control systems 1122 in a wired configuration. Alternatively, the security communicator device 1112 can be wirelessly connected to the existing security control system 1122. Such existing security control systems 1122 may be made by different manufacturers, and use different protocols, functions, and/or operational models. As described herein, the security communicator device 1112 can be wired to the existing security control system 1122 through one or more communication interfaces (e.g., data bus, telephone lines, etc.) that are available from the existing security control system 1122.

When the security communicator device 1112 is connected to the existing security control system 1122, the existing security control system 1122 can be disconnected from the existing communication network (e.g., telephone, cable, and/or Internet services) so that the existing security control system 1122 does not communicate with a central monitoring station (e.g., the central monitoring station 124). In addition or alternatively, the functionalities of the existing security control system 1122 can be at least partially disabled, and/or modified so that the security communicator device 1112 takes over at least part of the operation of the existing security control system 1122.

Referring to FIG. 11A, security devices 1124 can be remotely provisioned and configured through the security communicator device 1112, instead of being connected to the network 1166 through a local network access device 1140. Such security device 1124 can include the existing devices 1127 connected to the existing security control system 1122, and the peripheral device 1130 connected to the security communicator device 1112. A security device 1124, such as the existing device 1127 and the peripheral device 1130, can include a roaming engine 1132, a configuration engine 1134, and a device identifier 1136.

The roaming engine 1132 operates when the device is in a roaming state where the device is not configured and tries to connect to the security cloud server 1114. In some implementations, in the roaming state, the device connects to the security communicator device 1112 directly, or through the local network access device 1140 or any open network access device that is available. For example, the roaming engine 1132 operates to search for an available network access device, such as the security communicator device 1112, which provides connection to the network 1166. When the roaming engine 1132 finds the security communicator device 1112, the roaming engine 1132 can attempt to connect to the security cloud server 1114 through the security communicator device 1112.

The configuration engine 1134 operates when the device has connected to the security cloud server 1114 through the security communicator device 1112. In some implementations, the configuration engine 1134 can receive local network access information 1142. For example, the configuration engine 1134 can request and receive local network access information 1142 from the security cloud server 1114 through the security communicator device 1112. In addition, the configuration engine 1134 can operate to store the received local network access information in the memory of the device. The configuration engine 1134 can attempt to connect to the network 1166 through the local network access device 1140 using the local network access information 1142 received from the security cloud server 1114 through the security communicator device 1112. The security device can transition from the roaming state to a configured state after connecting to the network 1166 through the local network access device 1140.

The device identifier 1136 can be a value that identifies the security device 1124 to the network 1166. For example, the device identifier 1136 is a serial number, a media access control (MAC) address, or other types of data that identifies the security device 1124.

Referring still to FIG. 11A, the security cloud server 1114 stores the local network access information 1142. The local network access information 1142 can include parameters the security device 1124 can use to connect to the local network access device 1140. In some implementations, the local network access information 1140 is stored in a database associated with the security cloud server 1114. In other implementations, the local network access information 1142 is stored outside of the database of the security cloud server 1114, and received by the security cloud server 1114. The security cloud server 1114 can store and/or receive up-to-date local network access information 1142 in the course of maintaining the security integration system 1102. For example, if the local network access information 1142 for the local network access device 1140 changes (e.g., the credentials or settings to the local network access device 1140 are modified by a user, or by a new internet service provider), the security cloud server 1114 receives such revised local network access information from a user via a user input device (e.g., the user controller 116, the mobile device 118, etc.), or from the internet service provider that stores the revised local network access information. In addition or alternatively, the revised local network access information can be received from the security communicator device 1112 being connected to the local network access device 1140. The revised local network access information can be transmitted to the security devices so that the security devices are automatically updated with the revised local network access information, and, therefore, the connection between the security devices and the local network access device are maintained without requiring the security devices to be separately reconfigured against the local network access device with the revised local network access information.

In some implantations, the local network access information 1142 can include credentials (e.g., wireless password) for the local network access device 1140. In addition or alternatively, the local network access information 1142 can include a service set identifier (SSID) for a wireless LAN network and an associated passphrase. In other implementations, the local network access information 1142 can include a Bluetooth device name or address and a personal identification number (PIN) code. In yet other implementations, the local network access information 1142 can include other information or parameters for the local network access device 1140.

In addition or alternatively, the security communicator device 1112 can store the local network access information 1142. In some implementations, the local network access information 1142 can be received from the security cloud server 1114. The local network access information 1142 can be updated in the security communicator device 1112 as it is updated in the security cloud server 1114. In other implementations, the security communicator device 1112 can receive the local network access information 1142 via a user input device, such as the user controller 116 and the mobile device 118, and store the information for provisioning and/or configuring security devices connected to the security communicator device 1112.

With reference still to FIG. 11A, an example process for automatically provisioning and/or configuring security devices 1124. The process can begin with connecting the security communicator device 1112 to a security device 1124 (Step A). In some implementations, when the security device 1124 is first connected to the security communicator device 1112, the device 1124 can be in a roaming state. The security device 1124, such as the peripheral devices 1130, can be connected to the security communicator device 1112 through the local network access device 1140, or directly paired with the security communicator device 1112. Further, the security device 1124, such as the existing devices 1127 can be connected to the security communicator device 1112 through the existing security control system 1122.

In some implementations, the security communicator device 1112 can receive a device identifier from the security device 1124 (Step B). The device identifier includes data for uniquely identifying the security device 1124. The security communicator device 1112 can request network access information for the security device 1124 (Step C). The request can be transmitted to the security cloud server 1114 (Step D). In some implementations, the request can include the device identifier so that the security cloud server 1114 can retrieve the network access information for the security device 1124 associated with the device identifier. The security cloud server 1114 can provide the requested network access information to the security communicator device 1112 (Step E). The security communicator device 1112 transmits the received network access information to the security device 1124 (Step F) so that the security device 1124 is automatically connected to the local network access device 1140 using the network access information.

Referring to FIG. 11B, another example process of automatically provisioning and/or configuring security devices 1124. The process can begin with connecting the security communicator device 1112 to the local network access device 1140 (Step G). To connect and configure the security communicator device 1112 to the local network access device 1140, local network access information (e.g., credentials for the local network access device 1140) can be provided via a user input device (e.g., the user controller 116, the mobile device 118, or a user interface in the security communicator device 1112), or from the security cloud server 1114. The local network access information can be stored in the security communicator device 1112 (Step H).

The security communicator device 1112 is connected to a security device 1124 (Step I).). In some implementations, when the security device 1124 is first connected to the security communicator device 1112, the device 1124 can be in a roaming state. The security device 1124, such as the peripheral devices 1130, can be connected to the security communicator device 1112 through the local network access device 1140, or directly paired with the security communicator device 1112. Further, the security device 1124, such as the existing devices 1127 can be connected to the security communicator device 1112 through the existing security control system 1122.

The security communicator device 1112 can retrieve and transmit the local network access information 1142 to the security device 1124 (Step J) so that the security device 1124 is automatically connected to the local network access device 1140 using the network access information.

In some implementations, the security communicator device 1112 can request the local network access information 1142 from the security cloud server 1114 (Step K) to obtain any change made to the local network access information 1142. The security cloud server 1114 can provide the requested network access information to the security communicator device 1112 (Step L), which can be passed to a security device so that the connection of the security device can be maintained with the updated network local network access information.

The processes above can be performed when a security device 1124 is initially connected to the security communicator device 1112 either directly or through another device, such as the existing security control system 1122 or the local network access device 1140. In addition or alternatively, the processes can be performed periodically or on a predetermined schedule to update the local network access information for the security device 1124. In addition or alternatively, the processes can be performed if it is determined that the local network access information is modified for the security device 1124.

Although it is primarily described that the security communicator device 1112 is used as an intermediary for remote provisioning and/or configuration, other devices, such as the user controller 116 and the mobile device 118, can be alternatively or additionally used to perform at least part of the process.

FIG. 12 is a flowchart of an example method 1200 for automatic configuration of a security device 1202 against a local network access device. The security device 1202 is connected directly or indirectly to a security communicator 1204, and the security communicator 1204 is connected to a security cloud 1206. The security device 1202 can include a sensor, a camera, and other devices similar to the peripheral device 1130 and/or the existing device 1127 described herein.

A connection is established between the security device 1202 and the security communicator 1204 (Blocks 1212). In some implementations, the security device 1202 is connected to the security communicator 1204 through a local network access device. For example, the security device 1202 is connected to the local network access device in a roaming state, while the security communicator device 1204 is connected and configured to the local network access device.

In some implementations, the security device 1202 can transmit a device ID to the security communicator (Block 1214). The device ID includes a value that uniquely identifies the security device 1202. The security communicator receives the device ID (Block 1216). The security communicator requests local network access information to the security cloud (Block 1218). The request can include the device ID. The security cloud 1206 receives the request (Block 1220). The security cloud 1206 retrieves and transmits the local network access information (Block 1222). The local network access information that is stored in the security cloud 1206 may have been provided by a user who entered the local network access information (e.g., using the user controller 116 or the mobile device 118) when the security communicator was set up. The user can also provide updated local network access information when such information is revised. In addition or alternatively, the local network access information may be provided and/or updated by a service provider (e.g., an internet service provider) that provides network services through the local network access device. In some implementations, the local network access information can be specific to the security device 1202 connected to the security communicator 604, and can be determined based on the device ID of the security device 1202.

The security communicator 1204 receives the local network access information from the security cloud 1206 (Block 1224). The security communicator 1204 transmits the local network access information to the security device 1202 (Block 1226). The security device 1202 receives the local network access information (Block 1228). The security device 1202 performs provisioning and/or configuration to communicate with the local network access device using the local network access information (Block 1230).

In some implementations, the security communicator 1204 can detect disconnection of the security device 1202 from the local network access device (Block 1232). For example, such disconnection can occur when the local network access information for the local network access device changes, such as when a user changes the credentials or other settings for the local network access device or when the local network access device is replaced with a new device.

The security communicator 1204 can request local network access information to the security cloud 1206 (Block 1234) to obtain new local network access information which has been updated at the security cloud 1206. In response, the security cloud 1206 can perform the processes as described in Blocks 1220-1230 so that the security device 1202 remains connected to the local network access device using such new local network access information.

FIG. 13 is a flowchart of an example method 1250 for automatic configuration of a security device 1202 against a local network access device. The security device 1202 is connected to a security communicator 1204, and the security communicator 1204 is connected to a security cloud 1206. The security device 1202 can include a sensor, a camera, and other devices similar to the security device 130 described herein.

The security cloud 1206 can store local network access information for connection to a local network access device (Block 1252). In addition, the security cloud 1206 can be updated with new local network access information which replaces the previous local network access information. The local network access information can be provided by a user through a user interface, such as the user controller 116, the mobile device 118, and other user input devices, for example when the security communicator is first installed and set up. The user can also provide updated local network access information when such information is revised by changing the credentials or changing a service provider. In addition or alternatively, the local network access information may be provided and updated by a service provider (e.g., an internet service provider) that provides network services through the local network access device.

The security communicator 1204 can receive the local network access information (Block 1254) to connect to the local network access device. The local network access information can be transmitted from the security cloud 1206. Alternatively, it can be provided by a user who inputs the information into the security communicator 604 using an input device (e.g., the user controller 116, the mobile device 118, etc.).

The security communicator 1204 can store the local network access information locally (Block 1256), which can be transmitted to a security device to automatically connect the security device to the local network access device. The local network access information stored in the security communicator 1204 may be updated to reflect any change thereto. Such updated local network access information can be obtained from the security cloud 1206 or by a user via an input device (e.g., the user controller 116, the mobile device 118, etc.) to the security communicator 1204. The updated local network access information is transmitted to the security device so that the connection between the security device and the local network access device is maintained even if the local network access information is modified.

The security communicator 1204 is connected to the security cloud 1206 (Blocks 1258 and 1260) via one or more networks (e.g., broadband or cellular connection). When a broadband network is used, the security communicator 1204 can be connected to the security cloud 1206 via the local network access device using the local network access information.

A connection is established between the security device 1202 and the security communicator 1204 (Blocks 1262). In some implementations, the security device 1202 is connected to the security communicator 1204 through a local network access device. For example, the security device 1202 is connected to the local network access device in a roaming state, while the security communicator device 1204 is connected and configured to the local network access device.

The security communicator 1204 retrieves and transmits the local network access information to the security device 1202 (Block 1264). The security device 1202 receives the local network access information (Block 1266). The security device 1202 performs provisioning and/or configuration to communicate with the local network access device using the local network access information (Block 1268).

Referring now to FIGS. 14-16, example techniques for selectively routing signals (e.g., data streams) among different devices in a home security environment are described. An example home security system 1400 permits multiple routes for signals to be selectively chosen among different devices. For example, the home security system 1400 can select one of multiple routes for data streams (e.g., a video stream) from security devices 1424 (e.g., a video stream from a surveillance camera) to output devices 1426 (e.g., a display device) through a remote security cloud server 1414 or through a security communicator device 1412 locally. Further, the home security system 1400 can select from among multiple different communication channels to establish communication between a security communicator device 1412 and a security cloud server 1414. For example, the security communicator device 1412 can selectively use one of different types of data communications with the security cloud server 1414, such as broadband (Ethernet and Wi-Fi) and cellular.

The security integration system 1402 can be used to implement the security integration system 110 and/or the integrated security system 400, and/or be part of the security integration system 110 and/or the integrated security system 400. The security integration system 1402 includes a security communicator device 1412 and a security cloud server 1414, which are similar to the security communicator device 112 and the security cloud server 114. The security cloud sever 1414 is communicatively connected with the security communicator device 1412 via one or more networks, which is similar to the networks 166 (including one or more broadband networks and one or more cellular networks). The existing security platform 1404 is similar to the existing security platform 120, and includes an existing security control system 1422, which is similar to the existing security control device of the existing security platform 120. The existing security control system 1422 can connect to one or more existing devices 1427, such as sensors (e.g., the sensors 128), control panels (e.g., keypads) (e.g., the control panel 123), and an audio output device (e.g., the sound output device 126). The security communicator device 1412 can connect to one or more peripheral devices 1430, such as sensors (e.g., the security sensors 132) and automation devices (e.g., the home automation devices 134).

The security integration system 1402 can include a local network access device 1440 (e.g., the router 160) to enable communication between the security communicator device 1412 and the security cloud server 1414. The local network access device 1440 can be a device that connects to one or more networks (e.g., a wireless or wired local area network, a wide area network, etc.). Some examples of the local network access device 1440 include Wi-Fi access points and routes, Bluetooth access points and routers, and other suitable access points and routers.

Alternatively or in addition, the security integration system 1402 can use a cellular communication network 1464 (e.g., the cellular networks 164) between the security communicator device 1412 and the security cloud server 1414.

The security integration system 1402 can include a user control device 1416 (e.g., the user controller 116) that is connected to the security communicator device 1412. The user control device 1416 can be connected to the security communicator device 1412 through the local network access device 1440, or directly paired with the security communicator device 1412 using one or more wireless and/or wired communication interfaces (e.g., Bluetooth, Wi-Fi Direct, Zigbee, NFC, and other suitable wireless or wired communication protocols). The user control device 1416 provides a user interface for receiving a user input and/or outputting information (e.g., alerts, notifications, images, videos, etc.) to the user. The user control device 1416 can provide a display device for displaying such information. The user control device 1416 can be of various types, such as a mobile computing device with a display screen (e.g., a touchpad). In some implementations, a plurality of user control device 1416 can be used which are connected to the security communicator device 1412.

In the security integration system 1402, a user computing device 1418 (e.g., the mobile computing device 118) may be used in addition to, or alternatively to, the user control device 1416. The user computing device 1418 can be a computing device which is not originally part of the security integration system 1402 but later configured to be used with the devices in the security integration system 1402. For example, the user computing device 1418 can be a user's own mobile device (e.g., a smartphone or tablet) that runs a software application designed to work with the security communicator 1412, the security cloud server 1414, the existing security control system 1422, and/or the security devices 1424 (e.g., the existing devices 1427 and the peripheral devices 1430). For example, the user computing device 1418 can be connected to the security cloud server 1414 via a cellular network (e.g., the cellular network 1464), or via a local network access device (e.g., the local network access device 1440).

The security integration system 1402 can communicate with remote computing devices, servers, or systems for additional services. For example, the security cloud server 1414 in the security integration system 1402 can communicate with a media analysis server 1436 (e.g., the media analysis system 136). The media analysis server 1436 operates to process media data for various purposes. For example, the media analysis server 1436 can receive from the security cloud server 1414 data stream representative of a video stream obtained by a surveillance camera (as an example of the security device 1424). Such a video stream may be transmitted from the surveillance camera to the cloud server 1414 through the security communicator device 1412, and the cloud server 1414 can transmit the video stream to the media analysis server 1436 for processing. As described herein, the processed media data can be transmitted to the user control device 1416 and/or the user computing device 1418 for display along various pathways. For example, the processed media data can be transmitted from the media analysis server 1436 to the user control device 1416 through the security cloud server 1414 and the security communicator device 1412 using the local network access device 1440 or the cellular network 1464. Further, the processed media data can be transmitted from the media analysis server 1436 to the user computing device 1418 through the security cloud server 1414 using the broadband network 1462 (through the local network access device 1440) or using the cellular network 1464. Alternatively, the processed media data can be transmitted from the media analysis server 1436 directly to the user control device 1416 and/or the user computing device 1418 via one or more networks (e.g., cellular network).

Similarly to those described in FIG. 1B, the security communicator device 1412 is capable of being connected to one of different existing security control systems 1422 in a wired configuration. Alternatively, the security communicator device 1412 can be wirelessly connected to the existing security control system 1422. Such existing security control systems 1422 may be made by different manufacturers, and use different protocols, functions, and/or operational models. As described herein, the security communicator device 1412 can be wired to the existing security control system 1422 through one or more communication interfaces (e.g., data bus, telephone lines, etc.) that are available from the existing security control system 1422.

When the security communicator device 1412 is connected to the existing security control system 1422, the security communicator device 1412 can listen to data from the existing security control system 1422. Such data can include information about alarm status, device status (e.g., status of an existing device 1427 connected to the existing security control system 1422), etc. The data can be tapped from the communication interface (e.g., data bus, telephone lines, etc.) of the existing security control system 1422 to which the security communicator device 1412 is connected. In addition, the security communicator device 1412 can receive inputs from other security and automation devices which are separate from the existing security control system 1422 and connected to the security communicator device 1412. For example, the security communicator device 1412 can receive inputs from peripheral devices 1430 (e.g., the peripheral devices 130), such as sensors, cameras, home automation devices, etc., connected to the security communicator device 1412. Such inputs can include sensor/device status, trouble indication, battery status, alarm status, and other information associated with the peripheral devices 1430 connected to the security communicator device 1412. The data from the existing security control system 1422 can be blended with the inputs from the devices connected to the security communicator device 1412, and such blended data can be used to determine one or more actions for controlling at least part of the entire security and automation system (including both the security integration system 1402 and the existing security platform 1404).

In some implementations, the security cloud server 1414 can receive and combine the data from the existing security control system 1422 and the inputs from the peripheral devices 1430, and determine one or more appropriate actions for controlling the existing devices 1427 and the peripheral devices 1430 through the security communicator device 1412 and/or the existing security control system 1422. Alternatively, at least part of such process in the security cloud server 1414 can be performed locally by the security communicator device 1412.

Referring to FIGS. 14A-14D, example processes for routing data along different pathways in the home security system 1400. In these examples, the security communicator device 1412 uses a broadband network (e.g., Ethernet or Wi-Fi communication) via the local network access device 1440, and communicates with the security cloud server 1414.

Figure 14A:
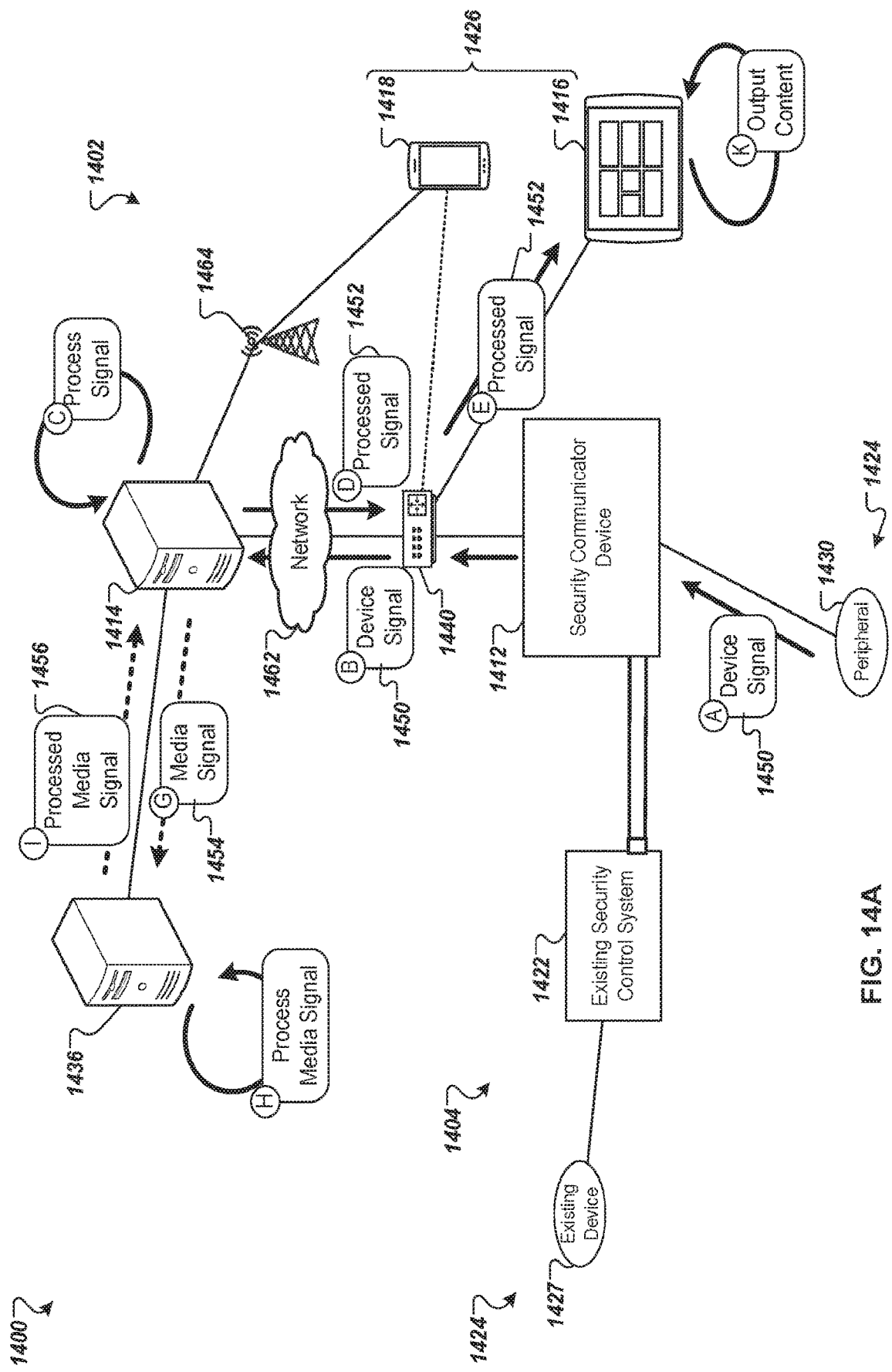
FIGS. 14A-14D illustrate example pathways for routing data from a security device to an output device in the integrated home security system.

FIG. 14A illustrates an example pathway for routing data from a security device to an output device in the integrated home security system. In this example, a peripheral device 1430 connected to the security communicator device 1412 transmits a device signal 1450 to the security communicator device 1412 (Step A). As described herein, the peripheral device 1430 can be a sensor, camera, or other security and/or automation devices. The device signal 1450 can be generated at the peripheral device 1430 and represent measurements, status information, image (still image or video), sound, and/or other data stream which may be detected by the peripheral device 1430.

The security communicator device 1412 receives the device signal 1450 from the peripheral device 1430, and transmits the device signal 1450 to the security cloud server 1414 through one or more broadband networks 1462 (e.g., the networks 162) using the local network access device 1440 (Step B). In some implementations, the security communicator device 1412 can route the device signal 1450 from the peripheral device 1430 to the security cloud server 1414. In other implementations, the security communicator device 1412 can process the device signal 1450 before transmitting it to the security cloud server 1414.

When the security cloud server 1414 receives the device signal 1450 from the security communicator device 1412, the security cloud server 1414 can process the device signal 1450 for analysis or other purposes (Step C). In one example, the device signal 1450 can be processed to identify media data, such as images (still images or video) and/or sounds, which may be displayed to a user using a media output device (e.g., the user control device 1416 or the user computing device 1418). In another example, the device signal 1450 can be processed to identify the status information and/or measurements obtained by the peripheral device 1430.

Figure 15A:
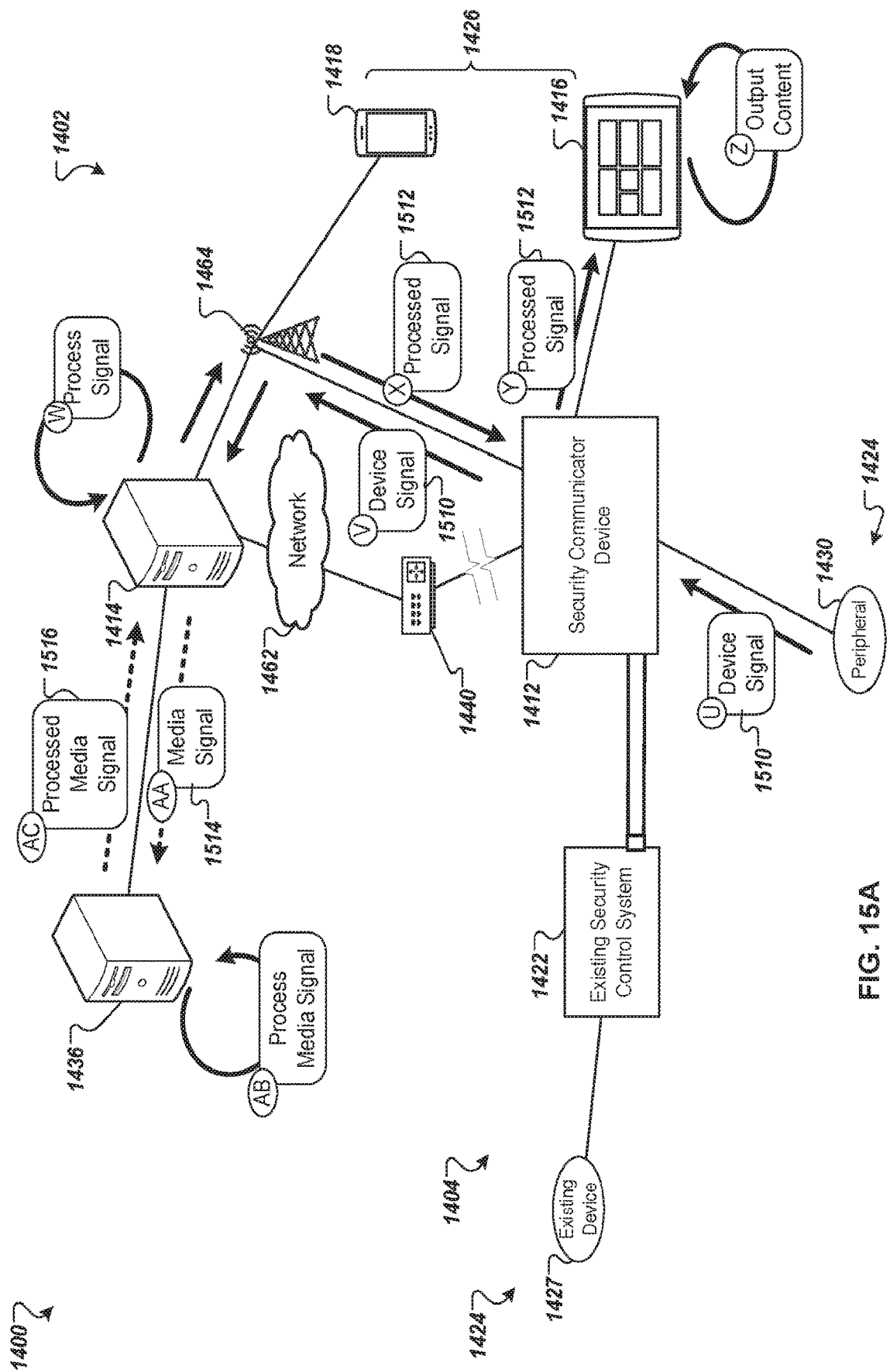
FIGS. 15A-15B illustrate other example pathways for routing data from a security device to an output device in the integrated home security system.

The security cloud server 1414 can transmit a processed signal 1452 over the broadband networks 1462 (Step D). In this example, the user control device 1416 is connected to the local network access device 1440. Thus, the processed signal 1452 can be routed through the local network access device 1440 to the user control device 1416 (Step E). In alternative embodiments, the security cloud server 1414 can transmit the processed signal 1452 over the cellular network 1464, for example when the broadband networks 1462 and/or the local network access device 1440 are not available or do not provide quality connectivity, as illustrated in FIG. 15A below. The processed signal 1452 can be a signal generated by the security cloud server 1414 or a signal modified from the device signal 1450.

The user control device 1416 can output content using the processed signal 1452 (Step F). In embodiments where the processed signal 1452 represents media data stream (e.g., still images or video), the user control device 1416 can display the media conveyed by the processed signal 1452. In embodiments where the processed signal 1452 includes information about sensor status information, the user control device 1416 can display or present the sensor status information.

In some embodiments, when the device signal 1450 is, or includes, a media signal 1454 that represents a media stream (e.g., still images, video, sound, etc.), the media signal 1454, or the device signal 1450 including the media signal 1454, can be transmitted to the media analysis server 1436 (Step G) over, for example, one or more networks. The media analysis server 1436 can process the media signal 1454 for analysis or other purposes (Step H). The media analysis server 1436 can transmit a processed media signal 1456 to the security cloud server 1414 (Step I). The processed media signal 1456 can be the processed signal 1452, or be included in the processed signal 1452, which is routed to the user control device 1416 as described above.

Figure 14B:
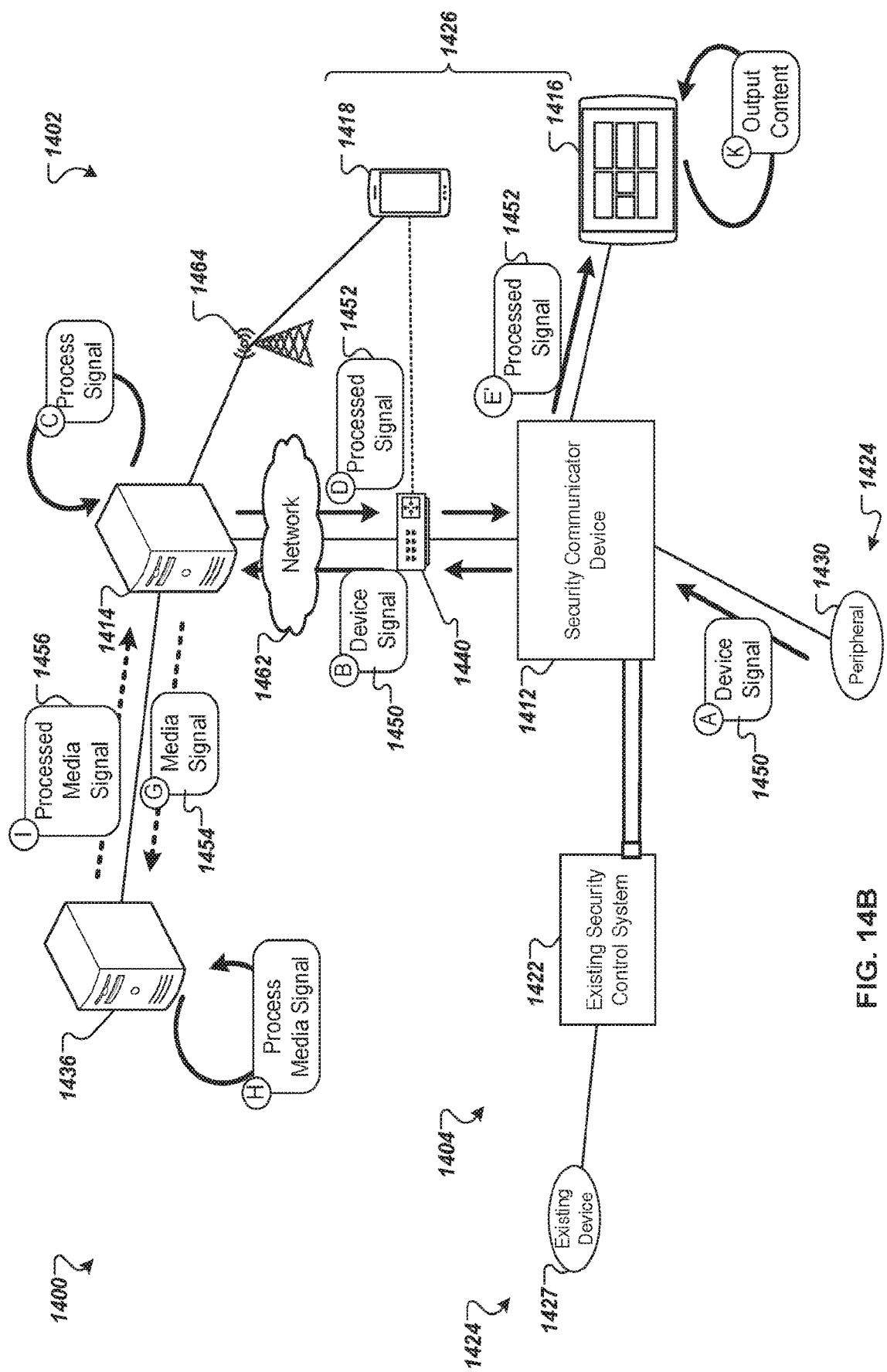

FIG. 14B illustrates an example pathway for routing data from a security device to an output device in the integrated home security system. The pathway in this example is similar to the pathway in the example of FIG. 14A except that the processed signal 1452 that is transmitted from the security cloud server 1414 is transmitted to the security communicator device 1412 and routed to the user control device 1416 (Step E'). In the example of FIG. 14B, the user control device 1416 is directly connected to the security communicator device 1412 and receives the processed signal 1452 from the security communicator device 1412, instead of being routed directly from the local network access device 1440 (Step E of FIG. 14A).

Figure 14C:
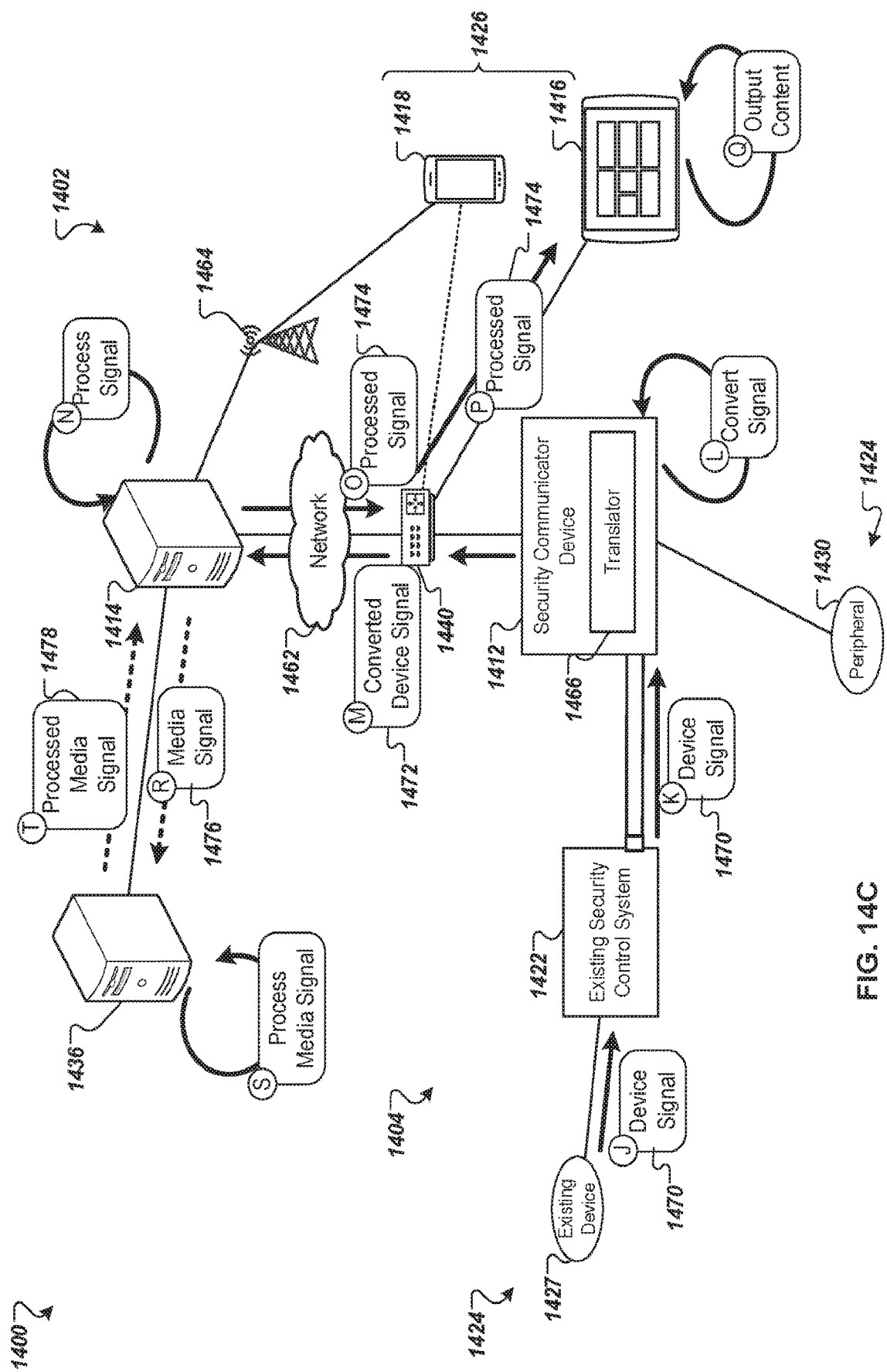

FIG. 14C illustrates an example pathway for routing data from a security device to an output device in the integrated home security system. In this example, an existing security device 1427 connected to the existing security control system 1422 transmits a device signal 1470 to the existing security control system 1422 (Step J). As described herein, the existing security device 1427 can be a sensor, camera, or other security and/or automation devices which are installed by connecting to the existing security control system 1422 at the premises. The device signal 1470 can be generated at the existing security device 1427 and represent measurements, status information, image (still image or video), sound, and/or other data stream which may be detected by the existing security device 1427.

The existing security control system 1422 receives the device signal 1470 from the existing security device 1427, and transmits the device signal 1470 to the security communicator device 1412 (Step K).

In some implementations, the security communicator device 1412 can convert the device signal 1470 to a converted device signal 1472 (Step L). For example, the security communicator device 1412 can include a translator 1466 that enables communication between the security communicator device 1412 and the connected existing security control system 1422 that use different protocols. The translator 1466 can convert the device signal 1470 to the converted device signal 1472 to satisfy the protocol used by the security communicator device 1412.

For example, the existing security control system 1422 connected to the security communicator device 1412 may communicate with associated existing devices 1427 using a first protocol, and process information provided by the sensors and determine an appropriate system operation, such as issuing an alarm message. In the meantime, the security communicator device 1412 is configured to communicate with the peripheral devices 1430 using a second protocol. The translator 1466 is configured to serve integration and translation functions so that the security communicator device 1412 communicates with the existing security control system 1422 and/or take over at least part of the features and functionalities of the existing security control system 1422.

The security communicator device 1412 transmits the converted device signal 1472 to the security cloud server 1414 through one or more broadband networks 1462 (e.g., the networks 162) using the local network access device 1440 (Step M). In some implementations, the security communicator device 1412 can route the converted device signal 1472 to the security cloud server 1414. In other implementations, the security communicator device 1412 can process the converted device signal 1472 before transmitting it to the security cloud server 1414.

When the security cloud server 1414 receives the converted device signal 1472 from the security communicator device 1412, the security cloud server 1414 can process the converted device signal 1472 for analysis or other purposes (Step N). In one example, the converted device signal 1472 can be processed to identify media data, such as images (still images or video) and/or sounds, which may be displayed to a user using a media output device (e.g., the user control device 1416 or the user computing device 1418). In another example, the converted device signal 1472 can be processed to identify the status information and/or measurements obtained by the existing security device 1427.

Figure 15B:
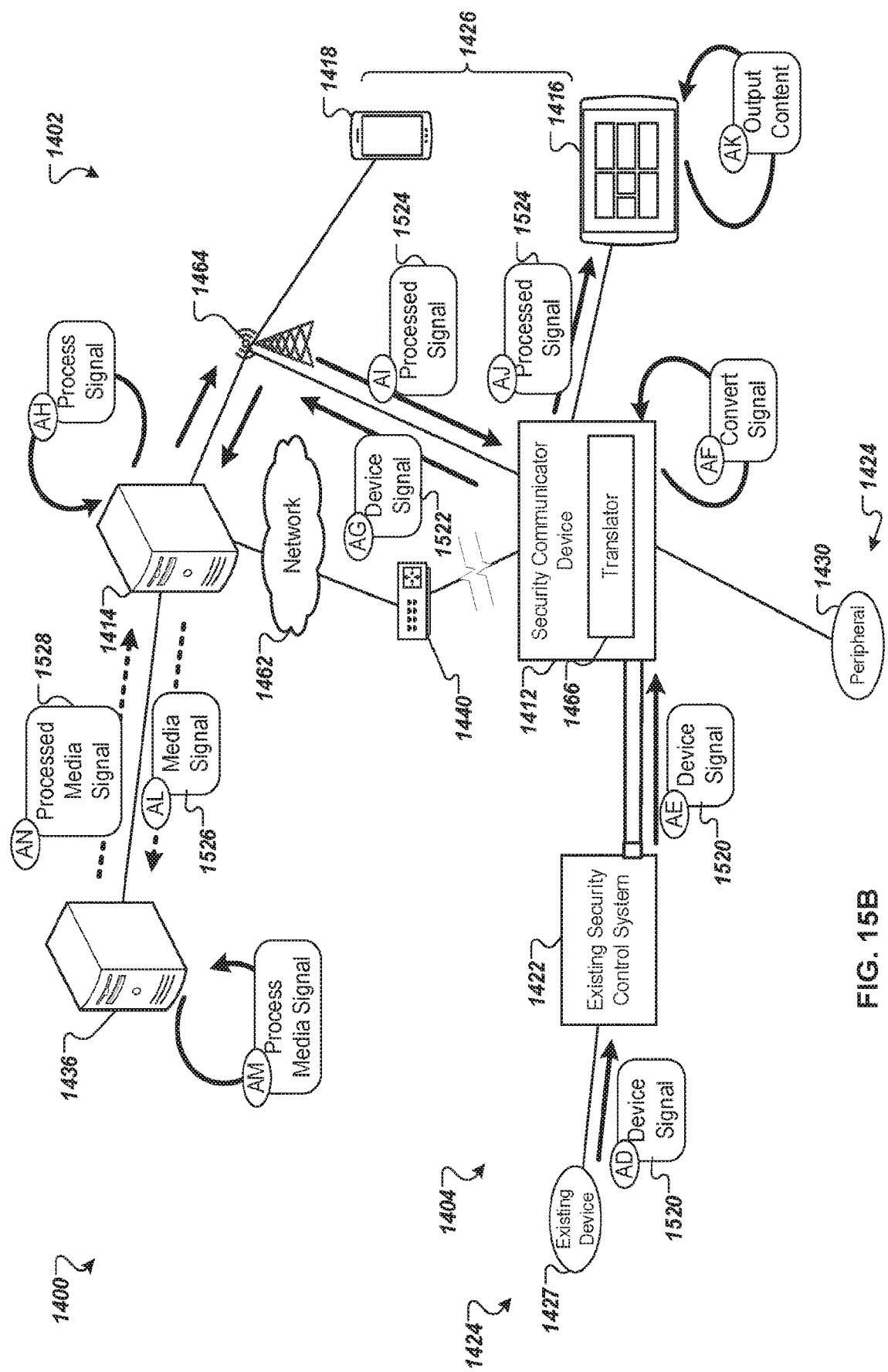

The security cloud server 1414 can transmit a processed signal 1474 over the broadband networks 1462 (Step O). In this example, the user control device 1416 is connected to the local network access device 1440. Thus, the processed signal 1474 can be routed through the local network access device 1440 to the user control device 1416 (Step P). In alternative embodiments, the security cloud server 1414 can transmit the processed signal 1474 over the cellular network 1464, for example when the broadband networks 1462 and/or the local network access device 1440 are not available or do not provide quality connectivity, as illustrated in FIG. 15B. The processed signal 1474 can be a signal generated by the security cloud server 1414 or a signal modified from the converted device signal 1472.

The user control device 1416 can output content using the processed signal 1474 (Step Q). In embodiments where the processed signal 1474 represents media data stream (e.g., still images or video), the user control device 1416 can display the media conveyed by the processed signal 1474. In embodiments where the processed signal 1474 includes information about sensor status information, the user control device 1416 can display or present the sensor status information.

In some embodiments, when the converted device signal 1472 is, or includes, a media signal 1476 that represents a media stream (e.g., still images, video, sound, etc.), the media signal 1476, or the converted device signal 1472 including the media signal 1476, can be transmitted to the media analysis server 1436 (Step R) over, for example, one or more networks. The media analysis server 1436 can process the media signal 1476 for analysis or other purposes (Step S). The media analysis server 1436 can transmit a processed media signal 1478 to the security cloud server 1414 (Step T). The processed media signal 1478 can be the processed signal 1452, or be included in the processed signal 1452, which is routed to the user control device 1416 as described above.

Figure 14D:
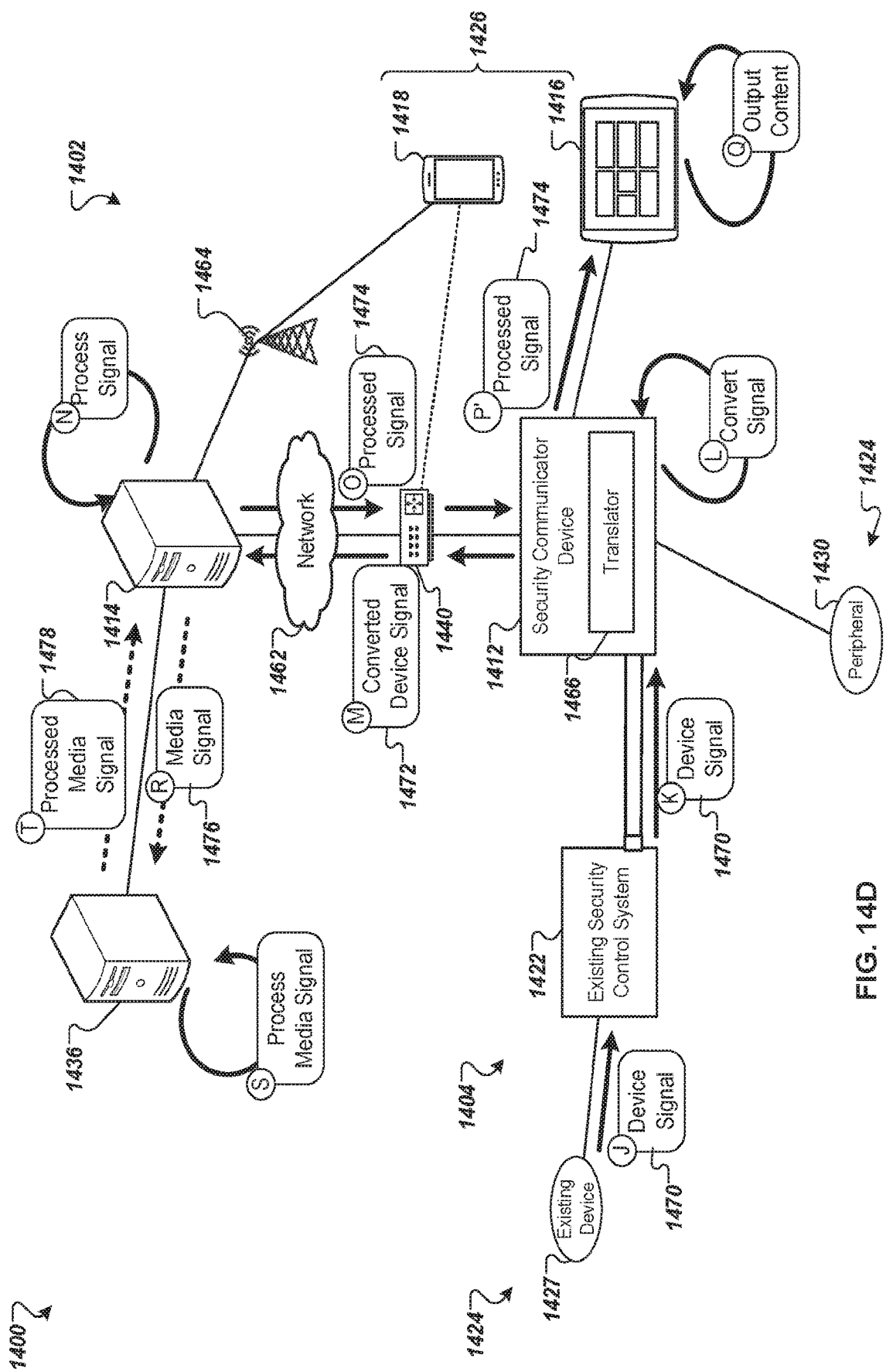

FIG. 14D illustrates an example pathway for routing data from a security device to an output device in the integrated home security system. The pathway in this example is similar to the pathway in the example of FIG. 14C except that the processed signal 1474 that is transmitted from the security cloud server 1414 is transmitted to the security communicator device 1412 and routed to the user control device 1416 (Step P'). In the example of FIG. 14D, the user control device 1416 is directly connected to the security communicator device 1412 and receives the processed signal 1474 from the security communicator device 1412, instead of being routed directly from the local network access device 1440 (Step P of FIG. 14C).

Referring to FIGS. 15A-15B, example processes for routing data along different pathways in the home security system 1400. In these examples, the security communicator device 1412 uses a cellular network 1464 to communicate with the security cloud server 1414.

FIG. 15A illustrates an example pathway for routing data from a security device to an output device in the integrated home security system. In this example, a peripheral device 1430 connected to the security communicator device 1412 transmits a device signal 1510 to the security communicator device 1412 (Step U). As described herein, the peripheral device 1430 can be a sensor, camera, or other security and/or automation devices. The device signal 1510 can be generated at the peripheral device 1430 and represent measurements, status information, image (still image or video), sound, and/or other data stream which may be detected by the peripheral device 1430.

The security communicator device 1412 receives the device signal 1510 from the peripheral device 1430, and transmits the device signal 1510 to the security cloud server 1414 through the cellular network 1464 (Step V). In some implementations, the security communicator device 1412 can route the device signal 1510 from the peripheral device 1430 to the security cloud server 1414. In other implementations, the security communicator device 1412 can process the device signal 1510 before transmitting it to the security cloud server 1414.

When the security cloud server 1414 receives the device signal 1510 from the security communicator device 1412, the security cloud server 1414 can process the device signal 1510 for analysis or other purposes (Step W). In one example, the device signal 1510 can be processed to identify media data, such as images (still images or video) and/or sounds, which may be displayed to a user using a media output device (e.g., the user control device 1416 or the user computing device 1418). In another example, the device signal 1510 can be processed to identify the status information and/or measurements obtained by the peripheral device 1430.

The security cloud server 1414 can transmit a processed signal 1512 to the security communicator device 1412 over the cellular network 1464 (Step X). In alternative embodiments, the security cloud server 1414 can transmit the processed signal 1512 through the local network access device 1440, as illustrated in FIGS. 14A and 14B. The processed signal 1512 can be a signal generated by the security cloud server 1414 or a signal modified from the device signal 1510.

The security communicator device 1412 transmits the processed signal 1512 to the user control device 1416 (Step Y). The user control device 1416 can output content using the processed signal 1512 (Step Z). In embodiments where the processed signal 1512 represents media data stream (e.g., still images or video), the user control device 1416 can display the media conveyed by the processed signal 1512. In embodiments where the processed signal 1512 includes information about sensor status information, the user control device 1416 can display or present the sensor status information.

In some embodiments, when the device signal 1510 is, or includes, a media signal 1514 that represents a media stream (e.g., still images, video, sound, etc.), the media signal 1514, or the device signal 1510 including the media signal 1514, can be transmitted to the media analysis server 1436 (Step AA) over, for example, one or more networks. The media analysis server 1436 can process the media signal 1514 for analysis or other purposes (Step AB). The media analysis server 1436 can transmit a processed media signal 1516 to the security cloud server 1414 (Step AC). The processed media signal 1456 can be the processed signal 1512, or be included in the processed signal 1512, which is routed to the user control device 1416 as described above.

In some embodiments, the security communicator device 1412 and/or the security cloud server 1414 can be configured such that, if the device signal 1510 and/or the processed signal 1512 are to include a large size of file (e.g., a video stream), the signals are not transmitted over the cellular network 1464. For example, if the device signal 1510 or the processed device signal 1512 includes data which are larger than a predetermined size, the signal will not be transmitted over the cellular network 1464 and can only be transmitted over a broadband network.

FIG. 15B illustrates an example pathway for routing data from a security device to an output device in the integrated home security system. In this example, an existing security device 1427 connected to the existing security control system 1422 transmits a device signal 1520 to the existing security control system 1422 (Step AD). As described herein, the existing security device 1427 can be a sensor, camera, or other security and/or automation devices which are installed by connecting to the existing security control system 1422 at the premises. The device signal 1520 can be generated at the existing security device 1427 and represent measurements, status information, image (still image or video), sound, and/or other data stream which may be detected by the existing security device 1427.

The existing security control system 1422 receives the device signal 1520 from the existing security device 1427, and transmits the device signal 1520 to the security communicator device 1412 (Step AE).

In some implementations, the security communicator device 1412 can convert the device signal 1520 to a converted device signal 1522 (Step AF). For example, the security communicator device 1412 can include a translator 1466 that enables communication between the security communicator device 1412 and the connected existing security control system 1422 that use different protocols. The translator 1466 can convert the device signal 1520 to the converted device signal 1522 to satisfy the protocol used by the security communicator device 1412.

For example, the existing security control system 1422 connected to the security communicator device 1412 may communicate with associated existing devices 1427 using a first protocol, and process information provided by the sensors and determine an appropriate system operation, such as issuing an alarm message. In the meantime, the security communicator device 1412 is configured to communicate with the peripheral devices 1430 using a second protocol. The translator 1466 is configured to serve integration and translation functions so that the security communicator device 1412 communicates with the existing security control system 1422 and/or take over at least part of the features and functionalities of the existing security control system 1422.

The security communicator device 1412 transmits the converted device signal 1522 to the security cloud server 1414 through the cellular network 1464 (Step AG). In some implementations, the security communicator device 1412 can route the converted device signal 1522 to the security cloud server 1414. In other implementations, the security communicator device 1412 can process the converted device signal 1522 before transmitting it to the security cloud server 1414.

When the security cloud server 1414 receives the converted device signal 1522 from the security communicator device 1412, the security cloud server 1414 can process the converted device signal 1522 for analysis or other purposes (Step AH). In one example, the converted device signal 1522 can be processed to identify media data, such as images (still images or video) and/or sounds, which may be displayed to a user using a media output device (e.g., the user control device 1416 or the user computing device 1418). In another example, the converted device signal 1522 can be processed to identify the status information and/or measurements obtained by the existing security device 1427.

The security cloud server 1414 can transmit a processed signal 1524 over the cellular network 1464 (Step AI). In alternative embodiments, the security cloud server 1414 can transmit the processed signal 1524 through the local network access device 1440, as illustrated in FIGS. 14C and 14D. The processed signal 1524 can be a signal generated by the security cloud server 1414 or a signal modified from the converted device signal 1522.

The security communicator device 1412 transmits the processed signal 1524 to the user control device 1416 (Step AJ). The user control device 1416 can output content using the processed signal 1524 (Step AK). In embodiments where the processed signal 1512 represents media data stream (e.g., still images or video), the user control device 1416 can display the media conveyed by the processed signal 1524. In embodiments where the processed signal 1524 includes information about sensor status information, the user control device 1416 can display or present the sensor status information.

In some embodiments, when the converted device signal 1522 is, or includes, a media signal 1526 that represents a media stream (e.g., still images, video, sound, etc.), the media signal 1526, or the converted device signal 1522 including the media signal 1526, can be transmitted to the media analysis server 1436 (Step AL) over, for example, one or more networks. The media analysis server 1436 can process the media signal 1526 for analysis or other purposes (Step AM). The media analysis server 1436 can transmit a processed media signal 1528 to the security cloud server 1414 (Step AN). The processed media signal 1528 can be the processed signal 1452, or be included in the processed signal 1452, which is routed to the user control device 1416 as described above.

In some embodiments, the security communicator device 1412 and/or the security cloud server 1414 can be configured such that, if the device signal 1520, the converted device signal 1522, and/or the processed signal 1524 are to include a large size of file (e.g., a video stream), the signals are not transmitted over the cellular network 1464. For example, if the device signal 1520, the converted device signal 1522, or the processed device signal 1512 includes data which are larger than a predetermined size, the signal will not be transmitted over the cellular network 1464 and can only be transmitted over a broadband network.

Referring to FIGS. 16A-16D, example processes for routing data along different pathways in the home security system 1400. In these examples, data are transmitted locally without communicating with the security cloud server 1414.

Figure 16A:
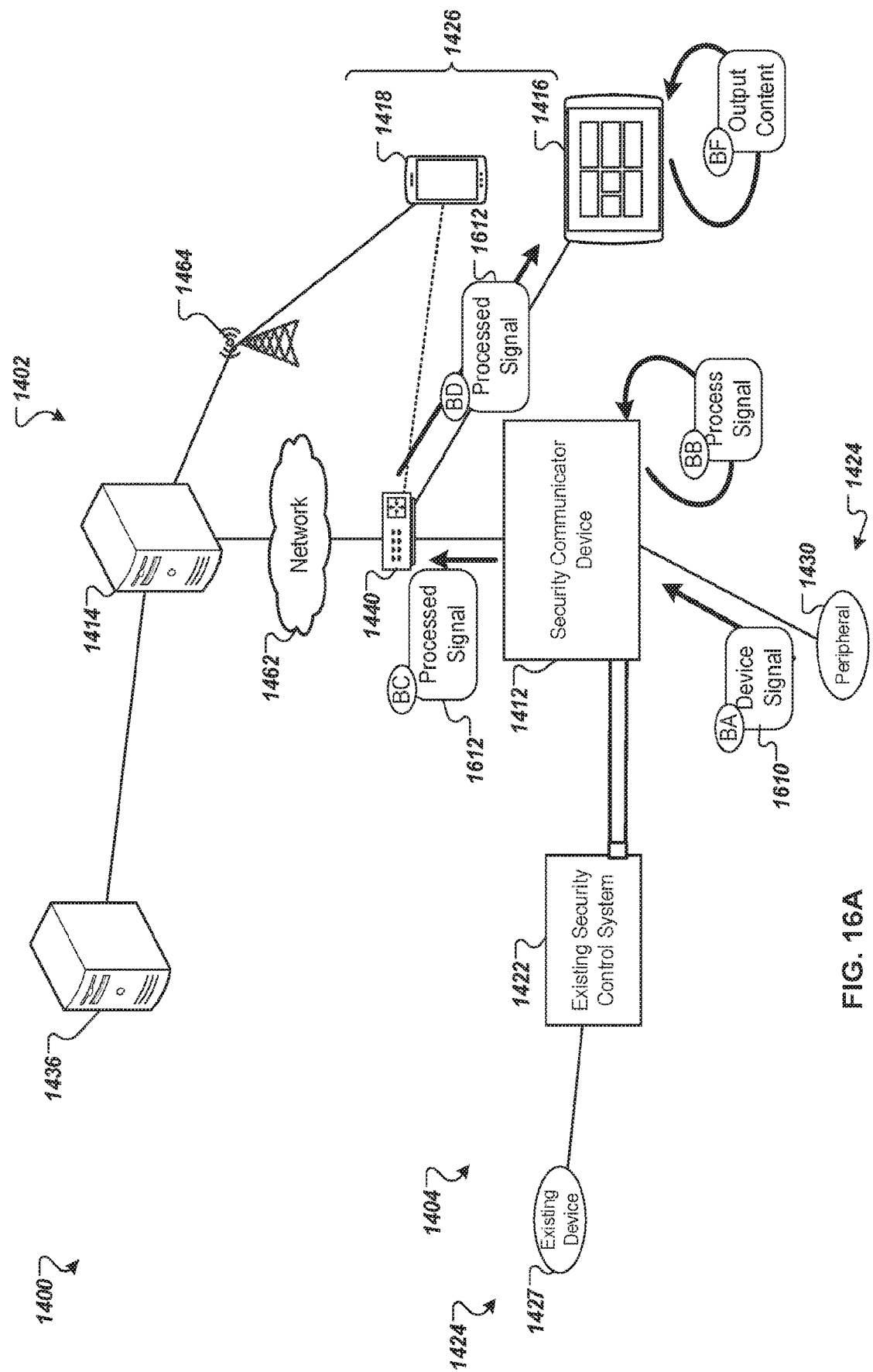
FIGS. 16A-16D illustrate yet other example pathways for routing data from a security device to an output device in the integrated home security system.

FIG. 16A illustrates an example pathway for routing data from a security device to an output device in the integrated home security system. In this example, a peripheral device 1430 connected to the security communicator device 1412 transmits a device signal 1610 to the security communicator device 1412 (Step BA). As described herein, the peripheral device 1430 can be a sensor, camera, or other security and/or automation devices. The device signal 1610 can be generated at the peripheral device 1430 and represent measurements, status information, image (still image or video), sound, and/or other data stream which may be detected by the peripheral device 1430.

When the security communicator device 1412 receives the device signal 1610 from the peripheral device 1430, the security communicator device 1412 can process the device signal 1610 for analysis or other purposes (Step BB). In one example, the device signal 1610 can be processed to identify media data, such as images (still images or video) and/or sounds, which may be displayed to a user using a media output device (e.g., the user control device 1416 or the user computing device 1418). In another example, the device signal 1610 can be processed to identify the status information and/or measurements obtained by the peripheral device 1430.

The security communicator device 1412 can transmit a processed signal 1612 using the local network access device 1440 (Step BC). In this example, the user control device 1416 is connected to the local network access device 1440. Thus, the processed signal 1612 can be routed through the local network access device 1440 to the user control device 1416 (Step BD).

The user control device 1416 can output content using the processed signal 1612 (Step F). In embodiments where the processed signal 1612 represents media data stream (e.g., still images or video), the user control device 1416 can display the media conveyed by the processed signal 1452. In embodiments where the processed signal 1612 includes information about sensor status information, the user control device 1416 can display or present the sensor status information.

Figure 16B:
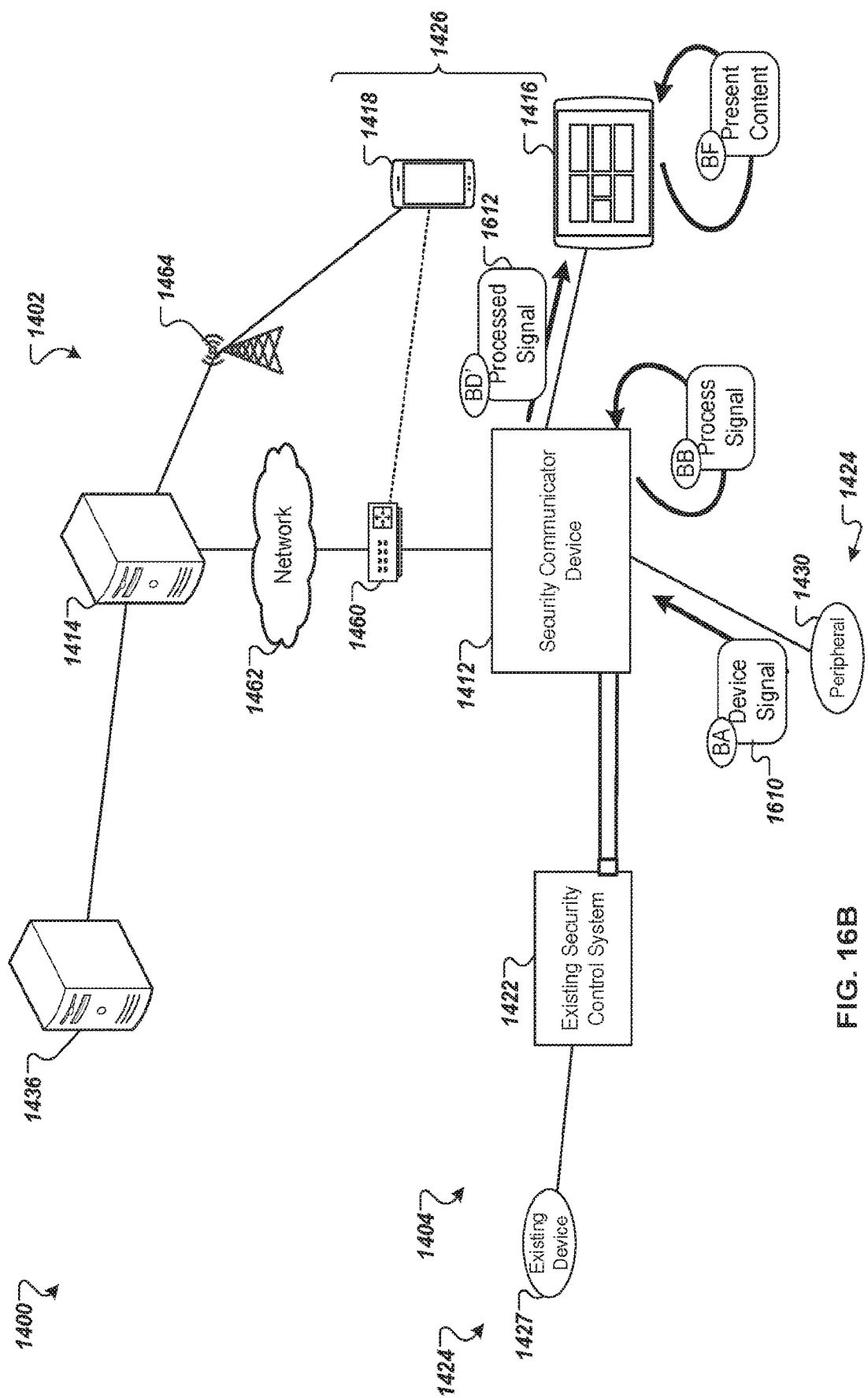

FIG. 16B illustrates an example pathway for routing data from a security device to an output device in the integrated home security system. The pathway in this example is similar to the pathway in the example of FIG. 16A except that the processed signal 1612 that is transmitted from the security communicator device 1412 is transmitted directly to the user control device 1416 (Step BD'). In the example of FIG. 7B, the user control device 1416 is directly connected to the security communicator device 1412 and receives the processed signal 1612 from the security communicator device 1412, instead of being routed through the local network access device 1440 (Steps BC and BD of FIG. 16A).

Figure 16C:
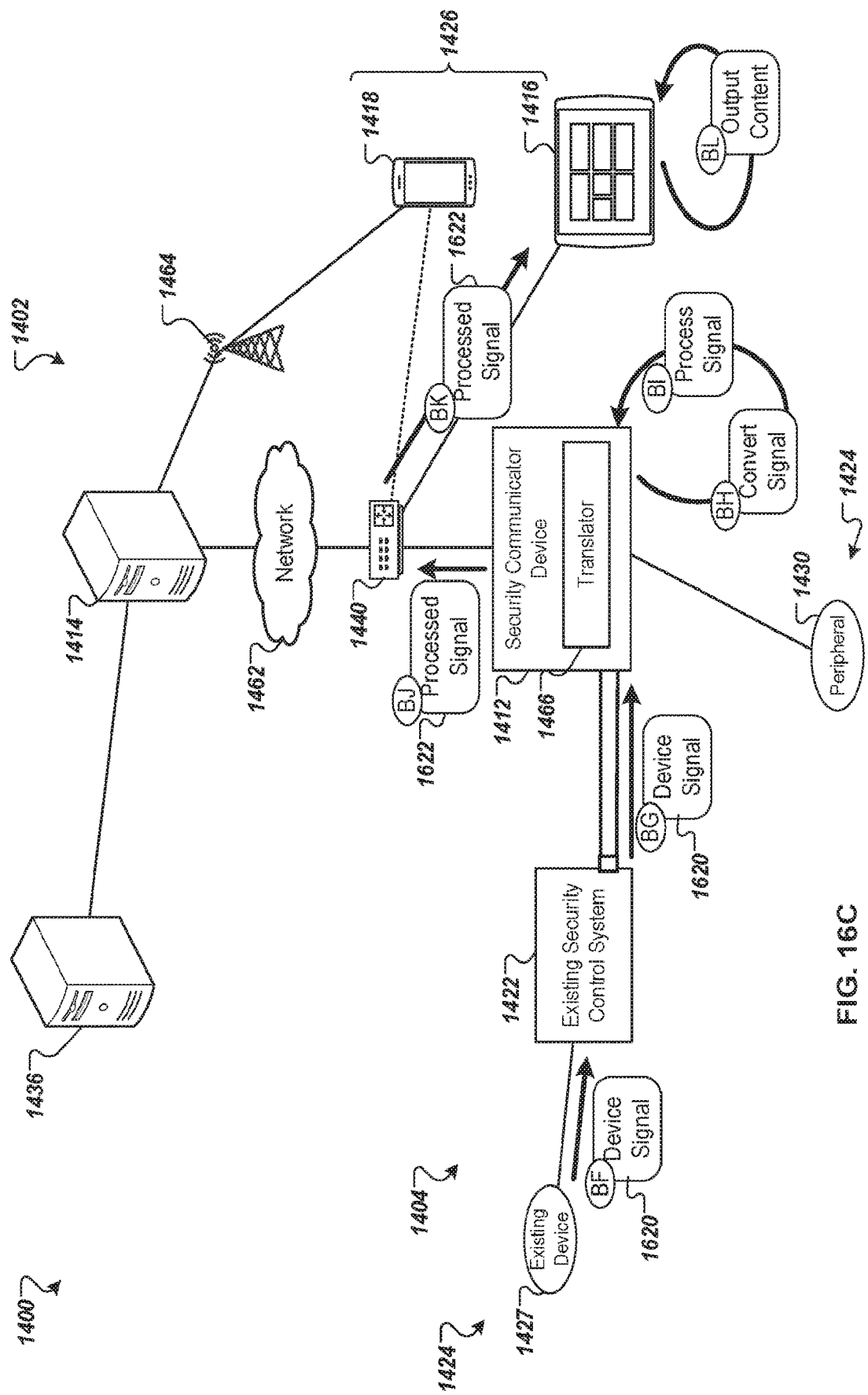

FIG. 16C illustrates an example pathway for routing data from a security device to an output device in the integrated home security system. In this example, an existing security device 1427 connected to the existing security control system 1422 transmits a device signal 1620 to the existing security control system 1422 (Step BF). As described herein, the existing security device 1427 can be a sensor, camera, or other security and/or automation devices which are installed by connecting to the existing security control system 1422 at the premises. The device signal 1620 can be generated at the existing security device 1427 and represent measurements, status information, image (still image or video), sound, and/or other data stream which may be detected by the existing security device 1427.

The existing security control system 1422 receives the device signal 1620 from the existing security device 1427, and transmits the device signal 1620 to the security communicator device 1412 (Step BG).

In some implementations, the security communicator device 1412 can convert the device signal 1620 to a converted device signal (Step BH). For example, the security communicator device 1412 can include the translator 1466 to convert the device signal 1620 to a converted device signal suitable for the protocol used by the security communicator device 1412.

The security communicator device 1412 can process the device signal 1620 (or the converted device signal thereof) for analysis or other purposes (Step BI). In one example, the device signal 1620 can be processed to identify media data, such as images (still images or video) and/or sounds, which may be displayed to a user using a media output device (e.g., the user control device 1416 or the user computing device 1418). In another example, the device signal 1620 can be processed to identify the status information and/or measurements obtained by the peripheral device 1430.

The security communicator device 1412 can transmit a processed signal 1622 using the local network access device 1440 (Step BJ). In this example, the user control device 1416 is connected to the local network access device 1440. Thus, the processed signal 1622 can be routed through the local network access device 1440 to the user control device 1416 (Step BK).

The user control device 1416 can output content using the processed signal 1622 (Step BL). In embodiments where the processed signal 1622 represents media data stream (e.g., still images or video), the user control device 1416 can display the media conveyed by the processed signal 1622. In embodiments where the processed signal 1622 includes information about sensor status information, the user control device 1416 can display or present the sensor status information.

Figure 16D:
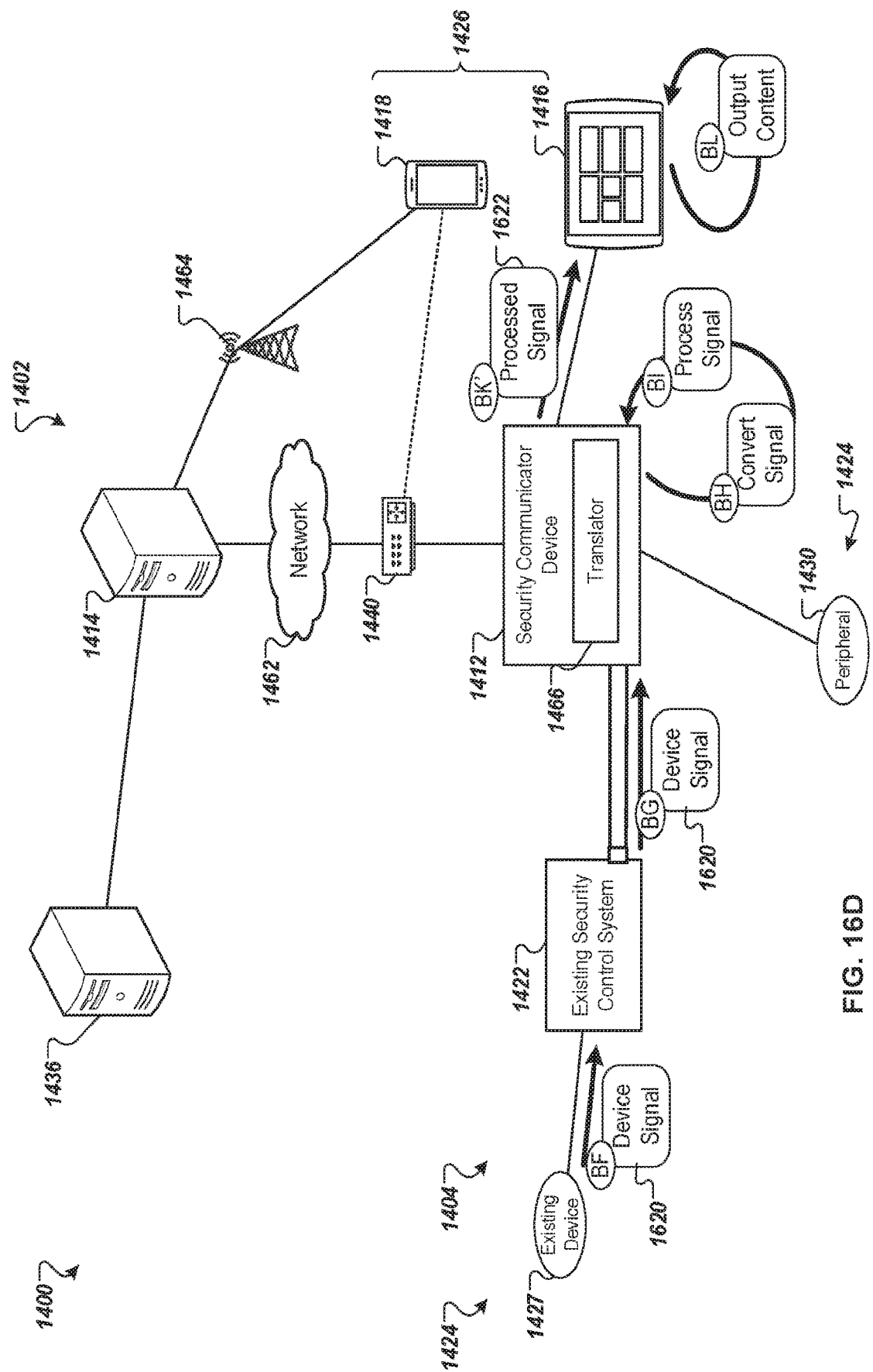

FIG. 16D illustrates an example pathway for routing data from a security device to an output device in the integrated home security system. The pathway in this example is similar to the pathway in the example of FIG. 16C except that the processed signal 1622 that is transmitted from the security communicator device 1412 is transmitted directly to the user control device 1416 (Step BK'). In the example of FIG. 16D, the user control device 1416 is directly connected to the security communicator device 1412 and receives the processed signal 1622 from the security communicator device 1412, instead of being routed through the local network access device 1440 (Steps BJ and BK of FIG. 16C).

In FIGS. 14-16, although the user control device 1416 is primarily described as an output device that receives a processed signal and outputs content associated with the processed signal, other output devices, such as the user computing device 1418 can be instead used in the same or similar manner.

As illustrated in FIGS. 14 and 15, the security communicator device 1412 can operate to select from among multiple different communication channels to establish communication between the security communicator device 1412 and the security cloud server 1414. For example, the security communicator device 1412 can selectively use one of different types of data communications with the security cloud server 1414, such as broadband (Ethernet and Wi-Fi) and cellular. Alternatively, the security communicator device 1412 can select and use two or more of such different data communication channels, and split data stream into two or more parts and transmit them along the selected different communication channels.

In an exemplary embodiment, the security communicator device 1412 includes two or more, three or more, four or more, or yet additional communication interfaces. For example, the security communicator device 1412 can include cellular, Ethernet, and wireless communication interfaces, each of which may be utilized in parallel or independently. The security communicator device 1412 can include a housing/frame which contains components of the communicator device, and the cellular, Ethernet, and/or wireless communication interfaces can be located within the housing/frame. The security communicator device 1412 that includes multiple communication interfaces, including cellular, Ethernet, and wireless communication interfaces, insulates the security communication device (and users, installers, contractors, etc.) from cellular carrier sunsets or other communication protocol obsolescence.

Such various communication interfaces of the security communicator device 1412 can facilitate broad compatibility and extend the useful service life of existing security systems (e.g., legacy security platforms) to which the security communicator device 1412 is connected. For example, with IP connections on board (e.g., Ethernet and Wi-Fi), the security communicator device 1412 is less hindered by cell sunsets or communication protocol obsolescence. The Internet will not likely sunset over the expected useful life of the system. Moreover, multiple communication interfaces provide a backup connection that can promote robust and reliable communication. For example, with a backup connection always at the ready, the security communicator device facilitates constant connectivity. The connection is thus less dependent on a network with spotty or intermittent coverage, or that may become obsolete. Moreover, in some example embodiments, an auto-switch capability promotes a constant connection to cellular or IP communication paths (e.g., to always maintain alarm reporting).

In various example embodiments, the security communicator device can include three paths of WAN connectivity (e.g., from the single communicator device housing/frame). The security communicator device thus may link to the security cloud server (e.g., such as a cloud service provided by Alula of St. Paul, Minn.) using Ethernet, Wi-Fi or CAT-M1 cellular communication paths. In an example embodiment, the security communicator device is compatible with 5G communication. With CAT-M1 IoT-optimized communications to access the cellular network, the security communication device is operational with the common and current 4G LTE networks, as well as the newest 5G cellular technology. Such flexibility in communication may further reduce exposure to cellular communication protocol obsolescence. The Wi-Fi communication interface may connect directly to a broadband router and/or create a Wi-Fi access point for a touchpad associated with the communicator device. As such, the security communicator device described herein can facilitate adoption of improved communication protocols, enhanced security, surveillance, and automation features, and reduced dependence on cellular carriers.

The security communicator device can be configured to automatically switch from cloud platform control to local control based on detection of one or more local network accesses available to the security communicator device.

The security communicator device can select communication path priorities through preferences established in a network services platform. For example, the security communicator device is configured to select, from among a plurality of communication paths, an optimal communication path to be used by the security communicator device based on one or more of a plurality of factors. In some implementations, the plurality of factors include costs associated with using the plurality of communication paths. In some implementations, the plurality of factors include current availability of the plurality of communication paths. In some implementations, the plurality of factors include latency needs related to sensor data to be transmitted by the communicator device. In some implementations, the plurality of factors include sensor triggered criteria. In addition or alternatively, such multiple communication options can be prioritized based on, for example, the type of data being transmitted. In one example, a video stream can be attempted to be sent over broadband first and, if the broadband is not available, then over cellular. In another example, the system is configured to permit for a video stream to be sent over broadband only, but not over cellular.

Figure 17:
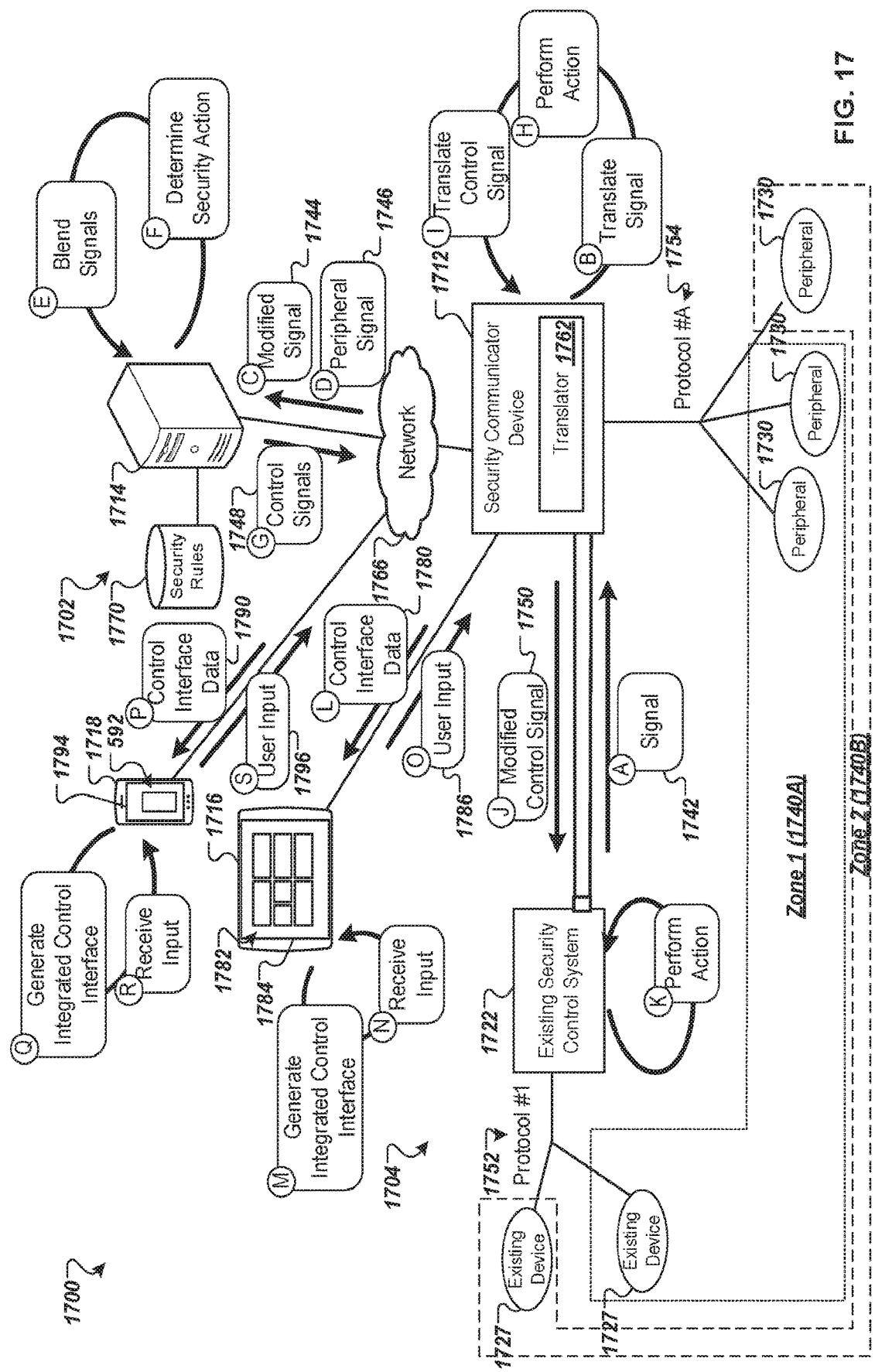
FIG. 17 illustrates an example technique for blending information from an existing security platform with other inputs of a security integration system, and outputting a blend of information using output devices.

Referring now to FIGS. 17-19, an example technique 1700 for blending information from an existing security platform 1704 with other inputs, such as inputs from peripheral devices 1730 (e.g., sensors, automation devices, etc.) of a security integration system 1702, and further providing an integrated user control interface for both of the security integration system 1702 and the existing security platform 1704, thereby permitting for integrated view and control of security and automation devices at a premise.

The security integration system 1702 can be used to implement the security integration system 110 and/or the integrated security system 400, and/or be part of the security integration system 110 and/or the integrated security system 400. The security integration system 1702 includes a security communicator device 1712 and a security cloud server 1714, which are similar to the security communicator device 112 and the security cloud server 114. The security cloud sever 1714 is communicatively connected with the security communicator device 1712 via one or more networks 1766, which is similar to the networks 166 (including one or more broadband networks and one or more cellular networks). The existing security platform 1704 is similar to the existing security platform 120, and includes an existing security control system 1722, which is similar to the existing security control device of the existing security platform 120. The existing security control system 1722 can connect to one or more existing devices 1727, such as sensors (e.g., the sensors 128), control panels (e.g., keypads) (e.g., the control panel 123), and an audio output device (e.g., the sound output device 126). The security communicator device 1712 can connect to one or more peripheral devices 1730, such as sensors (e.g., the security sensors 132) and automation devices (e.g., the home automation devices 134).

The security integration system 1702 can include a user control device 1716 (e.g., the user controller 116) that is connected to the security communicator device 1712. The user control device 1716 can be connected to the security communicator device 1712 through a local network access device, or directly paired with the security communicator device 1712 using one or more wireless and/or wired communication interfaces (e.g., Bluetooth, Wi-Fi Direct, Zigbee, NFC, and other suitable wireless or wired communication protocols). In some implementations, the user control device 1716 can be a portable device, such as a touchpad. In other implementations, the user control device 1716 can be fixed at a suitable location. As described herein, the user control device 1716 provides an integrated user interface for receiving a user input and/or outputting a blend of information (e.g., alerts, notifications, images, videos, etc.) to the user. The user control device 1716 can provide a display device for displaying such information. The user control device 1716 can be of various types, such as a mobile computing device with a display screen (e.g., a touchpad). In some implementations, a plurality of user control device 1716 can be used which are connected to the security communicator device 1712.

In the security integration system 1702, a user computing device 1718 (e.g., the mobile computing device 118) may be used in addition to, or alternatively to, the user control device 1716. The user computing device 1718 can be a computing device which is not originally part of the security integration system 1702 but later configured to be used with the devices in the security integration system 1702. For example, the user computing device 1718 can be a user's own mobile device (e.g., a smartphone or tablet) that runs a software application designed to work with the security communicator 1712, the security cloud server 1714, the existing security control system 1722, and/or the security devices 1724 (e.g., the existing devices 1727 and the peripheral devices 1730). As described herein, such a software application running on the user computing device 1718 can provide an integrated user interface for receiving a user input and/or outputting a blend of information to the user. For example, the user computing device 1718 can be connected to the security cloud server 1714 via a cellular network (e.g., the cellular network 1764), or via a local network access device.

Similarly to those described in FIG. 1B, the security communicator device 1712 is capable of being connected to one of different existing security control systems 1722 in a wired configuration. Alternatively, the security communicator device 1712 can be wirelessly connected to the existing security control system 1722. Such existing security control systems 1722 may be made by different manufacturers, and use different protocols, functions, and/or operational models. As described herein, the security communicator device 1712 can be wired to the existing security control system 1722 through one or more communication interfaces (e.g., data bus, telephone lines, etc.) that are available from the existing security control system 1722.

When the security communicator device 1712 is connected to the existing security control system 1722, the existing security control system 1722 can be disconnected from the existing communication network (e.g., telephone, cable, and/or Internet services) so that the existing security control system 1722 does not communicate with a central monitoring station 124 (e.g., the central monitoring station 124). In addition or alternatively, the functionalities of the existing security control system 1722 can be at least partially disabled, and/or modified so that the security communicator device 1712 takes over at least part of the operation of the existing security control system.

When the security communicator device 1712 is connected to the existing security control system 1722, the security communicator device 1712 can listen to data from the existing security control system 1722. Such data can include information about alarm status, device status (e.g., status of an existing device 1727 connected to the existing security control system 1722), etc. The data can be tapped from the communication interface (e.g., data bus, telephone lines, etc.) of the existing security control system 1722 to which the security communicator device 1712 is connected.

In addition, the security communicator device 1712 can receive inputs from other security and automation devices which are separate from the existing security control system 1722 and connected to the security communicator device 1712. For example, the security communicator device 1712 can receive inputs from peripheral devices 1730 (e.g., the peripheral devices 130), such as sensors, cameras, home automation devices, etc., connected to the security communicator device 1712. Such inputs can include sensor/device status, trouble indication, battery status, alarm status, and other information associated with the peripheral devices 1730 connected to the security communicator device 1712.

The data from the existing security control system 1722 can be blended with the inputs from the devices connected to the security communicator device 1712, and such blended data can be used to determine one or more actions for controlling at least part of the entire security and automation system (including both the security integration system 1702 and the existing security platform 1704). For example, as illustrated also in FIG. 1C, a premise may have a plurality of zones 1740 (including 1740A and 1740B) (e.g., the zones 190 in FIG. 1C), each of which may be controlled independently. Each of the zones 1740 may include one or more existing devices 1727 being part of the existing security platform 1704, and/or one or more peripheral devices 1730 being added as part of the security integration system 1702. The blended data can be used to determine an appropriate action for controlling a mix of the existing devices 1727 and the peripheral devices 1730 in each of the zones 1740.

In some implementations, the security cloud server 1714 can receive and combine the data from the existing security control system 1722 and the inputs from the peripheral devices 1730, and determine one or more appropriate actions for controlling the existing devices 1727 and the peripheral devices 1730 through the security communicator device 1712 and/or the existing security control system 1722. Alternatively, at least part of such process in the security cloud server 1714 can be performed locally by the security communicator device 1712.

The control scheme by the security communicator device 1712 can vary for different existing security control systems 1722. For example, for an existing security control system having data bus, the security communicator device can intercept the data bus to take over the control of the existing security control system (e.g., control alarm). For an existing security control system without data bus or for an existing security control system that haven't been integrated with the security communicator device, the security communicator device can intercept a phone line from the existing security control system to get information (e.g., alarm report). Further, the security communicator device can transmit the intercepted data (e.g., alarm report) over to the cloud server for processing and analysis. In addition, the cloud server can obtain other data (which are not available from legacy systems) from other sources (existing and new sensors, etc.).

The cloud server can process the intercepted data (e.g., the alarm report) and such other data, and use the data for integrated controls and functionalities with multiple devices/systems together.

Referring still to FIG. 17, the security communicator device 1712 can include a translator 1762 that enables communication between the security communicator device 1712 and the connected existing security control system 1722 that use different protocols. Alternatively, the translator 1762 is not included in the security communicator device 1712 and may be provided separately.

The existing security control system 1722 connected to the security communicator device 1712 may communicate with associated existing devices 1727 using a first protocol 1752 (e.g., Protocol #1), and process information provided by the sensors and determine an appropriate system operation, such as issuing an alarm message. In the meantime, the security communicator device 1712 is configured to communicate with the peripheral devices 1730 using a second protocol 1754 (e.g., Protocol #A). The translator 1762 is configured to serve integration and translation functions so that the security communicator device 1712 communicates with the existing security control system 1722 and/or take over at least part of the features and functionalities of the existing security control system 1722.

In some implementations, the translator 1762 is configured to translate one or more multiple protocols 1752 used by different existing security control systems to a protocol 1754 (e.g., Protocol #A) that is used by the security communicator device 1712, and/or translate the protocol 1754 to the multiple protocols 1752. This includes translating between protocols with mismatched features, such as translating between a first protocol that includes device types and a second protocol that does not include device types, and translating between a third protocol that uses a single packet to represent an event and a fourth protocol that uses multiple packets to represent the same event. In some implementations, the translator 1762 can translate among multiple different protocols by using a universal/intermediate protocol into which an incoming packet is translated and then from which the outgoing packet is translated. For example, the translator 1762 can translate from a first protocol into the universal/intermediate protocol and then from the universal/intermediate protocol into a second protocol. The universal/intermediate protocol can provide a variety of advantages, including efficiently providing a system that can translate between multiple different protocols without requiring specific protocol-to-protocol mappings.

With reference still to FIG. 17, an example process for integrated view and control of a home security and automation system can be performed by obtaining a signal 1742 from the existing security control system 1722 (Step A). The signal 1742 can represent a signal generated by one or more existing devices 1727 and received by the existing security control system 1722. The signal 1742 can include information about sensor status, alarm status, and other suitable information associated with the existing security control system 1722 and/or the existing devices 1727 connected to the existing security control system 1722.

The security communicator device 1712 can receive and translate the signal 1742 to a modified signal 1744 (Step B). In some implementations, the security communicator device 1712 converts the signal 1742 to the modified signal 1744 when the protocol of the signal 1742 is not compatible with the protocol of the security communicator device 1712. For example, the translator 1762 can convert the signal 1742 of a first protocol (e.g., Protocol #1) to the modified signal 1744 of a second protocol (e.g., Protocol #A). Once converted, the security communicator device 1712 can transmit the modified signal 1744 to the security cloud server 1714 for analysis (Step C). In embodiments where no translation is needed, the security communicator device 1712 can route the signal 1742 to the security cloud server 1714 with no or little modification to the signal 1742.

In addition, a peripheral signal 1746 to the security cloud server 1714 can be obtained from one of more peripheral devices 1730 connected to the security communicator device 1712 (Step D). For example, the security communicator device 1712 receives the peripheral signal 1746 from the peripheral devices 1730 and transmits it to the security cloud server 1714 for analysis. The peripheral signal 1746 can represent inputs from the peripheral devices 1730, such as sensor/device status, trouble indication, battery status, alarm status, and other information associated with the peripheral devices 1730 connected to the security communicator device 1712.

The security cloud server 1714 can receive the modified signal 1744 (or the signal 1742 if there is no translation) and/or the peripheral signal 1746, and process the signals to generate blended data (Step E). Then, the security cloud server 1714 can determine a security action based on the blended data (Step F). In some implementations, security control rules 1770 are provided and used to determine such a security action. The security control rules 1770 can provide a list of actions to be taken based on different combinations between possible statuses of existing devices connected to the existing security control system and possible statuses of peripheral devices connected to the security communicator device.

The security action includes one or more operations to be performed by the security communicator device 1712, the existing security control system 1722, and/or the security cloud server 1714, and/or other components associated with the device 1712, the system 1722, and/or the server 1714.

By way of example, if a sensor signal representative of a motion in a room (e.g., a zone) is first detected from one of the peripheral devices connected to the security communicator device 1712, no surveillance image for a space outside a house near the room is captured from one of the peripheral devices connected to the security communicator device 1712, and an alarm signal representative of an open window is detected from the existing security control system 1722, then the combination of the detected sensor signal, no surveillance image, and the alarm signal can lead to a security action that causes the security communicator device 1712 (and then the existing security control system 1722) to stop the alarm, understanding that a resident inside the house accidentally opens the window without disarming the security system.

The security cloud server 1714 can transmit one or more control signals 1748 to the security communicator device 1712 (Step G). The control signals 1748 can be generated to represent the security action determined by the security cloud server 1714. The security communicator device 1712 can perform a desired action based on the control signals 1748 (Step H). By way of example, the security communicator device 1712 can control the peripheral devices 1730 according to the control signals 1748.

In addition or alternatively, the control signals 1748 can include data for controlling the existing security control system 1722 and/or the existing devices 1727 associated with the system 1722. In such cases, the security communicator device 1712 converts at least part of the control signals 1748 to one or more modified control signals 1750

(Step I). In some implementations, the security communicator device 1712 converts the control signals 1748 to the modified control signal 1750 when the protocol of the control signals 1748 is not compatible with the protocol of the existing security control system 1722. For example, the translator 1762 can convert the control signals 1748 of the second protocol (e.g., Protocol #A) to the modified control signals 1750 of the first protocol (e.g., Protocol #1). Once converted, the security communicator device 1712 can transmit the modified control signals 1750 to the existing security control system 1722 (Step J). When receiving the modified control signals 1750, the existing security control system 1722 can perform a desired action based on the modified control signals 1750 (Step K). By way of example, the existing security control system 1722 can control the existing devices 1727 according to the modified control signals 1750. In embodiments where no translation is needed, the security communicator device 1712 can route at least part of the control signals 1748 to the existing security control system 1722 with no or little modification to the control signals 1748.

Referring still to FIG. 17, the security communicator device 1712 transmits control interface data 1780 to the user control device 1716 (Step L). The control interface data 1780 can be at least part of the control signals 1748 that are routed from the security cloud server 1714. In some implementations, the control signals 1748 can be the control interface data 1780 and transmitted to the user control device 1716. Alternatively, the control interface data 1780 can be generated at the security communicator device 1712 based on the control signals 1748. The control interface data 1780 can include at least part of the blended data generated at the security cloud server 1714, and can be used in generating an integrated user interface on the user control device 1716.

The user control device 1716 generates an integrated control interface 1782 (Step M). For example, the user control device 1716 includes a display screen 1784 and generates the integrated control interface 1782 thereon. The integrated control interface 1782 is configured to output various pieces of security and automation information obtained from the blended data generated at the security cloud server 1714. In addition, the integrated control interface 1782 can receive user inputs of controlling the entire integrated system (including the existing security platform, the security communicator device, the peripheral devices, and the security cloud server). The integrated control interface 1782 can be configured to integrate the outputs obtained from the existing security control system 1722 and the outputs from the security communicator device 1712 and the peripheral devices connected to the security communicator device 1712. For example, the integrated control interface 1782 can provide an all-in-one dashboard that displays both of the security information from the existing security control system 1722 and the information about the peripheral devices 1730 from the security communicator device 1712.

In some implementations, the integrated control interface 1782 can provide panel-like user controls that integrate accesses to the take-over devices (connected to the existing security control system 1722) and new devices (connected to the security communicator device 1712), thereby streamlining installations and operations and simplifying training and setup. Further, the integrated control interface 1782 can permit for a user to quickly customize security and automation controls for the premises.

The user control device 1716 can receive a user input for managing and/or controlling the entire integrated system (Step N). For example, a user can provide a user input by interacting with the integrated control interface 1782 displayed on the display screen 1784 of the user control device 1716. The user control device 1716 can transmit data about the user input 1786 to the security communicator device 1712 (Step O). The security communicator device 1712 can transmit the data to the security cloud server 1714 for analysis, and/or locally process the data, to determine and take an appropriate action in response to the user input.

Similarly to the user control device 1716, the user computing device 1718 can be used to provide an integrated control interface. In some implementations, however, the user computing device 1718 can communicate with the security cloud server 1714 without the security communicator device 1712. In other implementations, the user computing device 1718 can communicate with the security cloud server 1714 through the security communicator device 1712.

Control interface data 1790 can be transmitted to the user computing device 1718 (Step P). The control interface data 1790 can be at least part of the control signals 1748 that are transmitted from the security cloud server 1714. In some implementations, the control signals 1748 can be the control interface data 1790 and can be transmitted to the user computing device 1718. The control interface data 1790 can be identical or similar to the control interface data 1780. The control interface data 1790 can include at least part of the blended data generated at the security cloud server 1714, and can be used in generating an integrated user interface on the user computing device 1718.

The user computing device 1718 generates an integrated control interface 1792 (Step Q). For example, the user computing device 1718 includes a display screen 1794 and generates the integrated control interface 1792 thereon. Similarly to the integrated control interface 1782, the integrated control interface 1792 is configured to output various pieces of security and automation information obtained from the blended data generated at the security cloud server 1714. In addition, the integrated control interface 1792 can receive user inputs of controlling the entire integrated system (including the existing security platform, the security communicator device, the peripheral devices, and the security cloud server). The integrated control interface 1792 can be configured to integrate the outputs obtained from the existing security control system 1722 and the outputs from the security communicator device 1712 and the peripheral devices connected to the security communicator device 1712. For example, the integrated control interface 1792 can provide an all-in-one dashboard that displays both of the security information from the existing security control system 1722 and the information about the peripheral devices 1730 from the security communicator device 1712.

In some implementations, the integrated control interface 1792 can provide panel-like user controls that integrate accesses to the take-over devices (connected to the existing security control system 1722) and new devices (connected to the security communicator device 1712), thereby streamlining installations and operations and simplifying training and setup. Further, the integrated control interface 1792 can permit for a user to quickly customize security and automation controls for the premises.

In some implementations, the integrated control interface 1792 provided on the user computing device 1718 can be designed to provide identical or similar appearance as the integrated control interface 1782 on the user control device 1716, such that users can easily recognize security statuses and control the entire integrated system through the same or similar-looking user interface on different control devices.

The user computing device 1718 can receive a user input for managing and/or controlling the entire integrated system (Step R). For example, a user can provide a user input by interacting with the integrated control interface 1792 displayed on the display screen 1794 of the user computing device 1718. The user computing device 1718 can transmit data about the user input 1796 to the security cloud server 1714 (Step S). The security cloud server 1714 can process the data to determine and take an appropriate action in response to the user input.

Figure 18A:
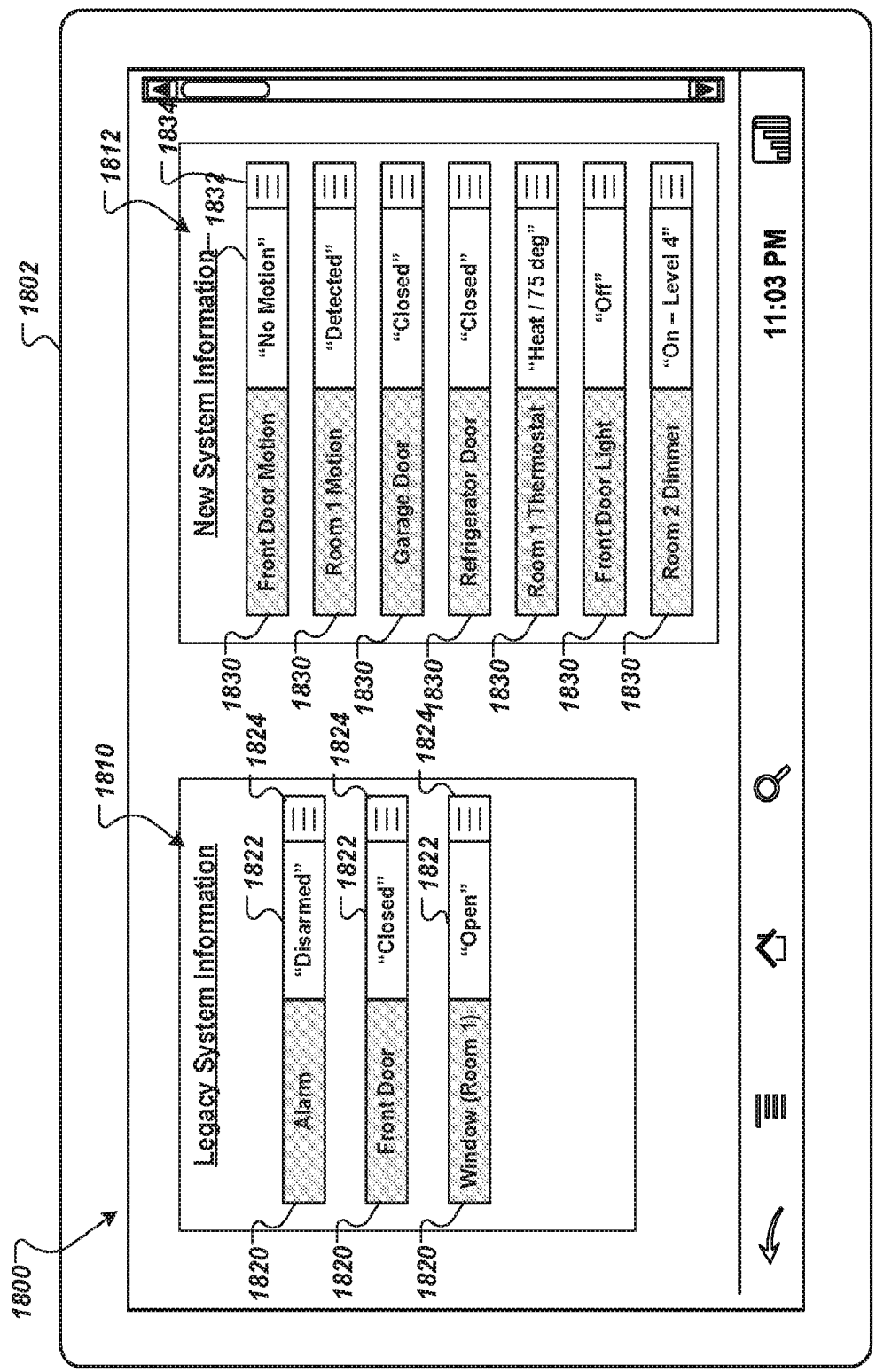
FIGS. 18A-18B illustrate example integrated control interfaces on output devices.
Figure 18B:
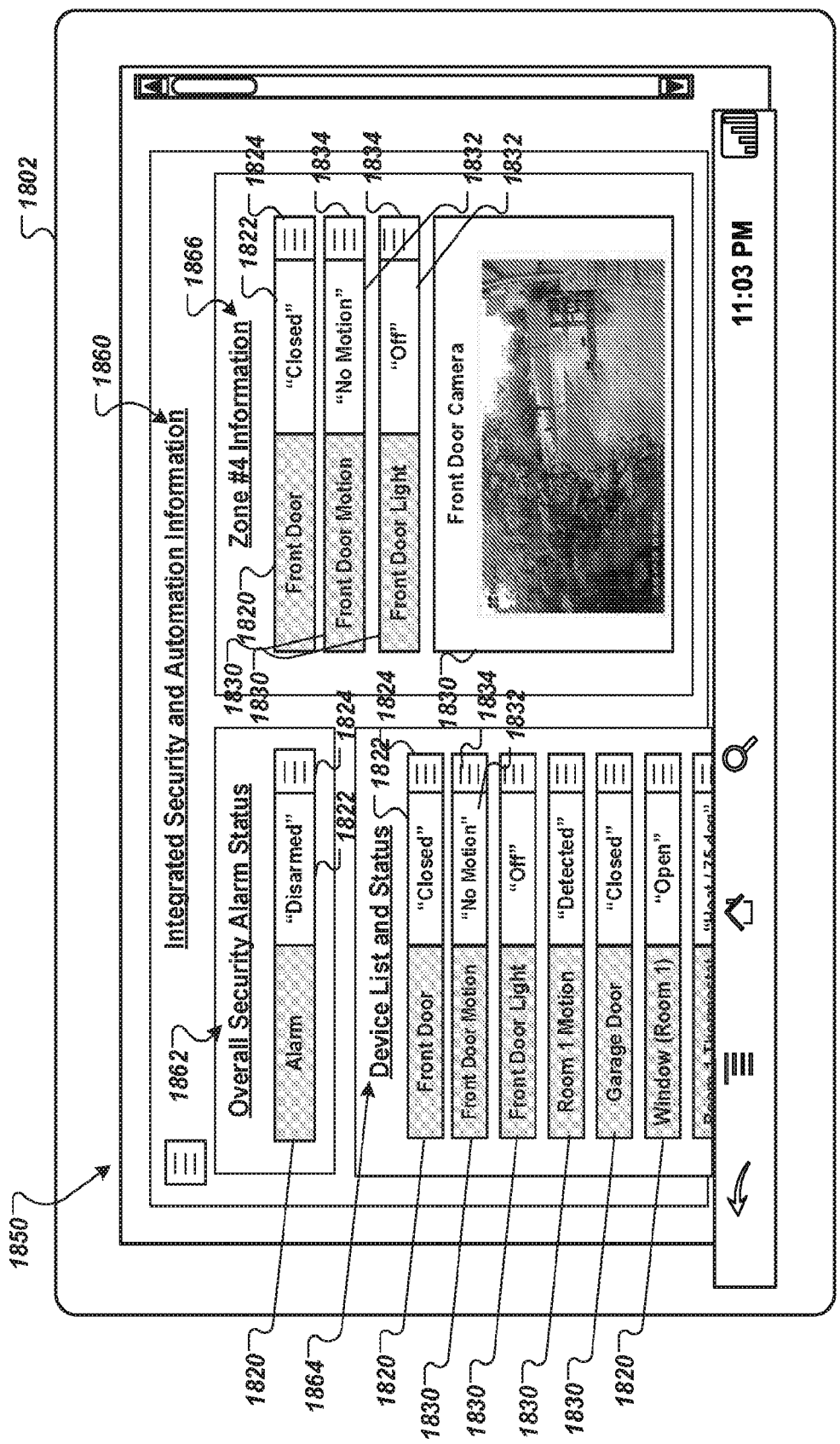

FIGS. 18A and 18B illustrate example integrated control interfaces on output devices. Referring to FIG. 18A, an example integrated control interface 1800 is provided on an output device 1802, such as the user control device 1716 and the user computing device 1718. The integrated control interface 1800 can implement the integrated control interface 1782 or the integrated control interface 1792.

The integrated control interface 1800 can include a legacy security system section 1810 and a new security system section 1812. The legacy security system section 1810 provides information about a legacy security system (e.g., the existing security platform 1704). For example, the legacy security system section 1810 can show a list of legacy security devices 1820 (e.g., the existing devices 1727), such as security alarms, control panels, speakers, etc. In addition, the legacy security system section 1810 can show statuses 1822 of the legacy security devices. The legacy security system section 1810 can be configured to receive user inputs for each of the legacy security devices through, for example, menu controls 1824.

The new security system section 1812 provides information about a new security system (e.g., the security integration system 1702). For example, the new security system section 1812 can shows a list of new security and automation devices 1830 (e.g., the peripheral devices 1730), such as sensors (e.g., the security sensors 132) and automation devices (e.g., the home automation devices 134). In addition, the new security system section 1812 can show statuses 1832 of the new security devices. The new security system section 1812 can be configured to receive user inputs for each of the new security devices through, for example, menu controls 1834.

Referring to FIG. 18B, an example integrated control interface 1850 is provided on the output device 1802, such as the user control device 1716 and the user computing device 1718. The integrated control interface 1850 can implement the integrated control interface 1782 or the integrated control interface 1792.

The integrated control interface 1850 can include an integrated security and automation section 1860. The integrated security and automation section 1860 provides a blend of information from a legacy security system (e.g., the existing security platform 1704) and information from a new security system (e.g., the security integration system 1702). In some implementations, the integrated security and automation section 1860 includes one or more subsections, such as an overall security alarm status subsection 1862, a device list and status subsection 1864, and a zone information subsection 1866. The subsections 1862, 1864, and 1866 can show a mix of information about the legacy security devices 1820 (e.g., the existing devices 1727) and the new security and automation devices 1830 (e.g., the peripheral devices 1730).

For example, the overall security alarm status subsection 1862 shows a legacy security device 1820 ("Alarm"), a status 1822 of the device, and a menu control 1824 for receiving a user input for controlling the device 1820. In addition or alternatively, the overall security alarm status subsection 1862 can show a new security device (e.g., a new alarm system connected to the security communicator device), a status of the device, and a menu control for receiving a user input for controlling the device. Further, the device list and status subsection 1864 shows a list of one or more legacy security devices 1820 ("Front Door," "Window (Room1)," etc.) and one or more new security and automation devices 1830 ("Front Door Motion," "Front Door Light," "Room 1 Motion," "Garage Door," etc.). The device list and status subsection 1864 can further include the statuses 1822 and 1832 and the menu controls 1824 and 1834. Moreover, the zone information subsection 1866 provides information about one or more zones at the premises (e.g., the zones 1740) and shows a list of one or more legacy security devices 1820 ("Front Door," etc.) and one or more new security and automation devices 1830 ("Front Door Motion," "Front Door Light," "Front Door Camera," etc.). The zone information subsection 1866 can further include the statuses 1822 and 1832 and the menu controls 1824 and 1834.

Figure 19A:
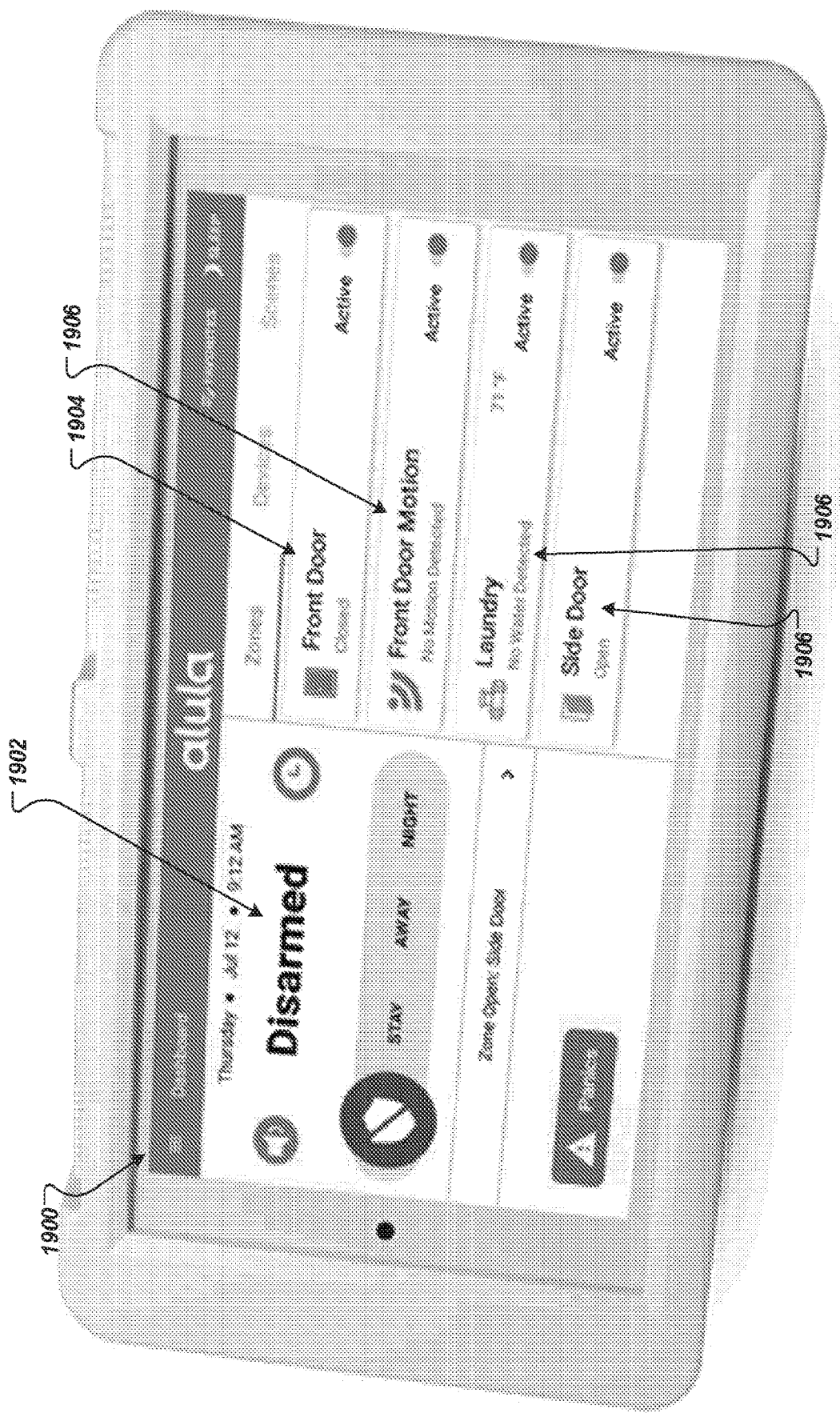
FIGS. 19A-19C illustrate example integrated control interfaces on output devices.
Figure 19C:
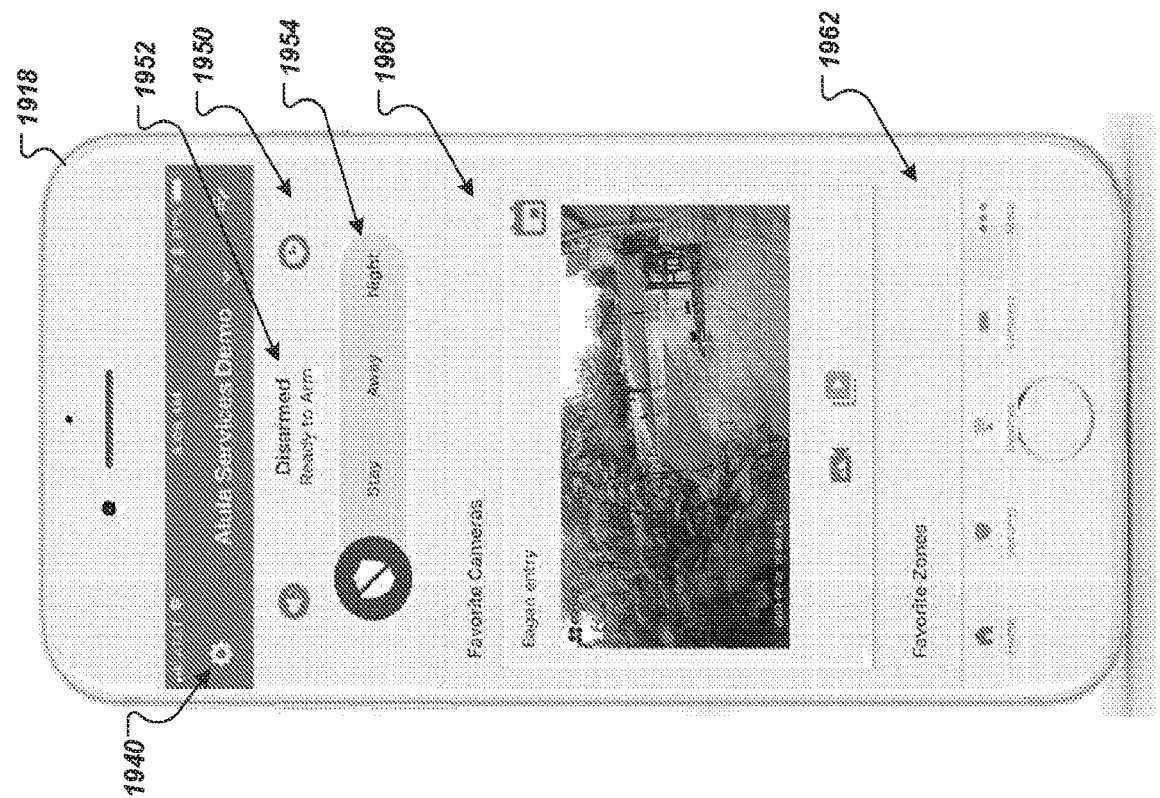
Figure 19B:
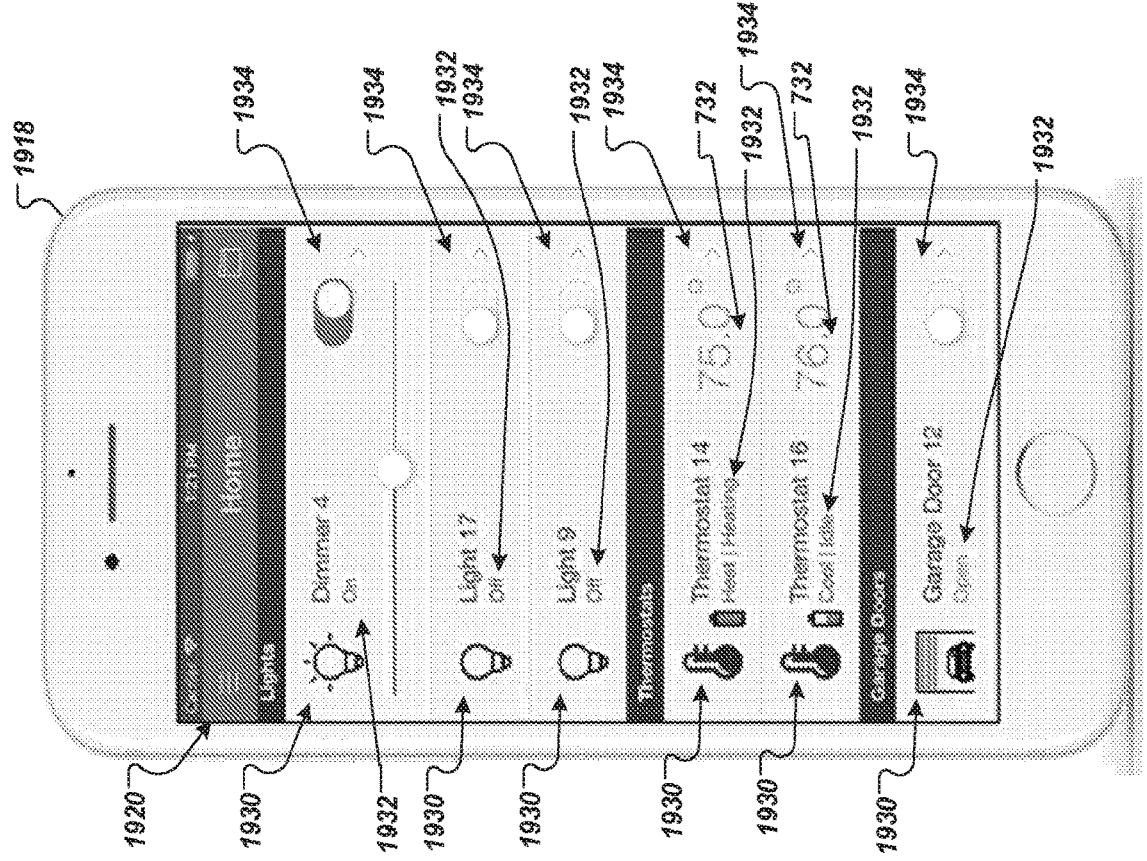

FIGS. 19A-19C illustrate example integrated control interfaces on output devices. Referring to FIG. 19A, an example integrated control interface 1900 is provided on an output device 1916, such as the user control device 1716. The integrated control interface 1900 can implement the integrated control interfaces 1782, 1792, 1800, and 1850.

In this example, the integrated control interface 1900 shows an alarm status 1902, which can be obtained from the legacy security system, and further shows different devices statuses, such as a status 1904 from a legacy security device (e.g., "Front Door" sensor), and a status 1906 from a new security and automation device (e.g., "Front Door Motion" sensor," "Laundry" sensor, and "Side Door" sensor).

Referring to FIG. 19B, an example integrated control interface 1920 is provided on an output device 1916, such as the user computing device 1718. The integrated control interface 1920 can implement the integrated control interfaces 1782, 1792, 1800, and 1850. In this example, the integrated control interface 1920 shows a list of legacy and/or new security and automation devices 1930, their status information 1932, and input control elements 1934 for controlling them.

Referring to FIG. 19C, an example integrated control interface 1940 is provided on an output device 1948, such as the user computing device 1718. The integrated control interface 1940 can implement the integrated control interfaces 1782, 1792, 1800, and 1850. In this example, the integrated control interface 1940 shows a legacy security alarm device 1950, its status information 1952, and input control elements 1954 for controlling the alarm device. Further, the integrated control interface 1940 shows an image or video 1960 from a surveillance camera (which may be a legacy camera connected to the legacy security panel, or a new camera connected to the security communicator device). Moreover, the integrated control interface 1940 shows one or more zones 1962 at the premises, such as the zones 1940.

Figure 20:
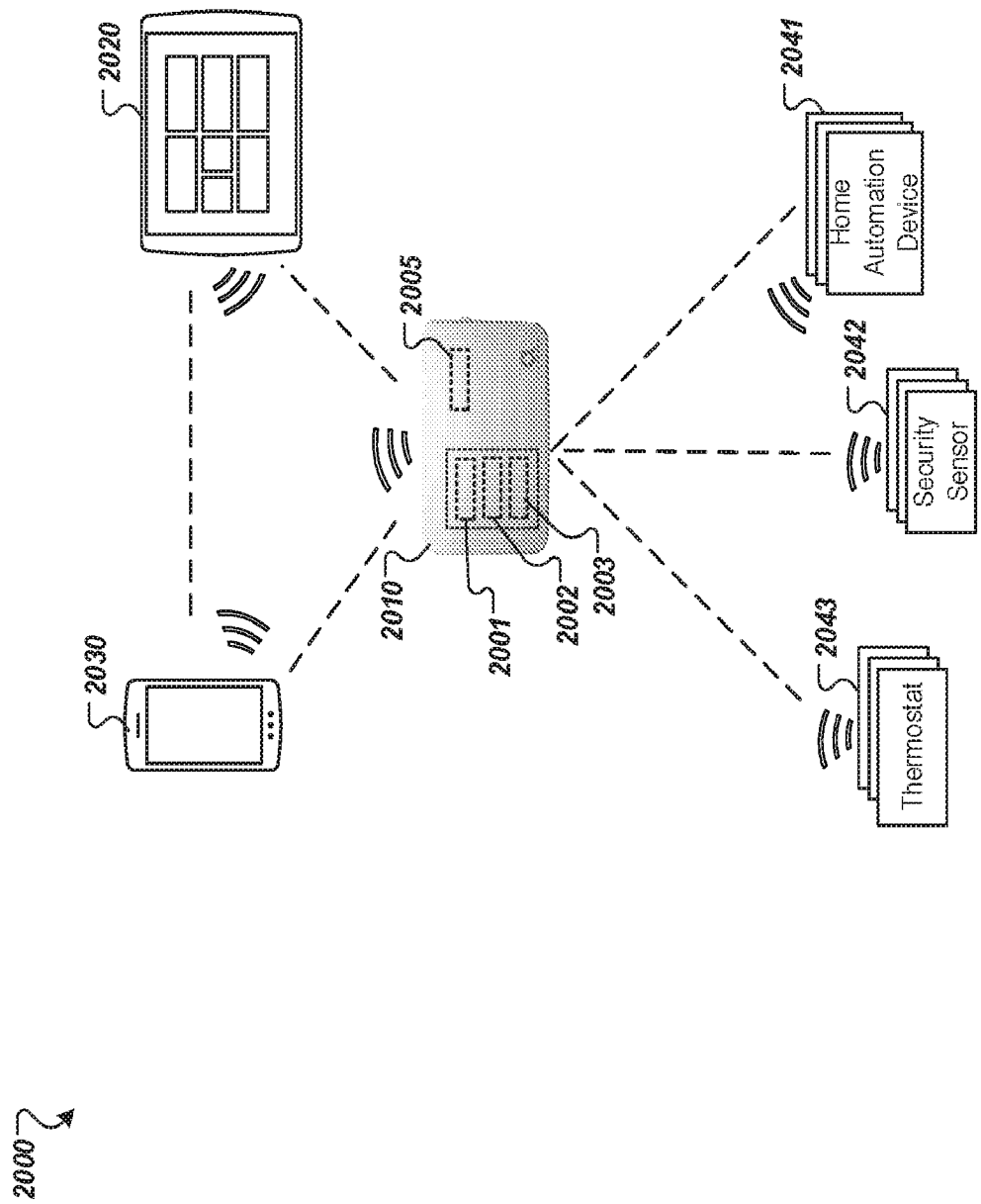
FIG. 20 is a schematic view of an example system including a communicator device.

Referring now to FIG. 20, an example system 2000 is shown, including a communicator device 2010, a touchpad 2020, a mobile device 2030, and a plurality of peripheral devices 2041, 2042, 2043. The communicator device 2010 is configured for connection with a legacy security platform to enhance the legacy security platform with one or more features. For example, communicator device 2010 may be configured to turn a conventional security panel into an integrated home-automation, alarm, and surveillance system with cellular and IP communication capabilities, and/or connection to smart home as a service platforms.

The legacy security platform (not shown in FIG. 20) may include a control panel that does not include one or more of Z-Wave home-automation, interactive services, IP connectivity, and/or cellular communications capabilities, and/or is incompatible with one or more peripheral devices 2041, 2042, 2043. The communicator device 2010 may be configured to connect to the legacy control panel's keypad bus. In an example embodiment, the communicator device 2010 is at least partially self-programming. For example, the communicator device 2010 may be configured to automatically detect a type of security panel, or features and functionality of a security panel, to which it is connected. Automatic detection may facilitate installation with the legacy security platform.

In an example embodiment, communicator device 2010 includes a plurality of communication interfaces. For example, the communicator device 2010 includes a wireless communication interface 2001 (e.g., Wi-Fi), an Ethernet communication interface 2002, and a cellular communication interface 2003 (e.g., 4G/LTE, CAT M1 for 5F transition, etc.). The communicator device 2010 may thus be described as capable of providing triple-path cloud connectivity. Communicator device may communicate alarm or home-automation events, or other communications, via one or more of the communication interfaces. For example, the communicator device may select the lowest-cost communication path (e.g., wireless communication interface 2001). Alternatively or additionally, the communicator device 2010 may select a communication path based on available bandwidth, such as where a particular communication path is unavailable, or for a communication having particular bandwidth requirements. In an example embodiment, the communicator device 2010 may automatically select a particular communication path, or switch between communication paths, promoting reliable and robust communication.

System 2000 includes one or more peripheral devices 2041, 2042, 2043. Peripheral devices 2041, 2042, 2043 may include automated locks, thermostats, lights, garage door controllers, sensors, other devices. In some embodiments, one or more peripheral devices 2041, 2042, 2043 were not part of the legacy security platform (e.g., were integrated with system 2000 after communicator 2010 was connected), and/or are not compatible with the legacy security panel. Communicator device 2010 is configured to operate with peripheral devices 2041, 2042, 2043, such that the peripheral devices 2041, 2042, 2043 can be used in system 2000 to enhance its functionality. In an example embodiment, communicator device 2010 provides local network and remote connectivity using wireless communication interface 2001 (e.g., Wi-Fi), which can facilitate addition of peripheral devices 2041, 2042, 2043 to system 2000.

In some embodiments, the communicator device 2010 is configured to communicate using proprietary communication protocols. For example, the communicator device 2010 may communicate with proprietary encrypted security sensors. One or more peripheral devices 2041, 2042, 2043, for example, that include proprietary encrypted security sensors, may be added to system 2000. In some example embodiments, the communicator device 2010 may include a translator 2005 to facilitate communication with the proprietary encrypted security sensors.

In an example embodiment, communicator device 2010 facilitates video viewing of local cameras 2041, 2042 over a home network connection, such as a shared network between communicator device 2010 and local cameras 2041, 2042.

In an example embodiment, system 2000 is configured to provide an array of security and automation features in a single, unified user interface. The communicator device 2010 can facilitate replacement of conventional keypads (e.g., with physical buttons) with large-display touchpads. Doing so can improve the user experience and facilitate efficient programming and monitoring of the system 2000. Additionally, the touchpad 2020 can provide a unified user experience between use inside the premises (e.g., on touchpad 2020) and outside the premises (e.g., on a mobile application of mobile device 2030). In an example embodiment, a consistent user interface is provided on both the touchpad 2020 and one or more mobile devices 2030. Moreover, the user interface of touchpad 2020 and mobile device 2030 may display security, surveillance, and home automation features simultaneously on the display. In some embodiments, touchpad 2020 and mobile device 2030 may each be configured to display a user-specific dashboard with integrated video (e.g., from a surveillance camera 2042, 2043) home automation (e.g., front door sensor), and security services on a single page for simultaneous viewing by a user.

In an example embodiment, the communicator device 2010 creates a dedicated local network to communicate with local devices (e.g., local IP devices), such as touchpad 2020.

In an example embodiment, all sensor data (e.g., anything with a contact ID), may be incorporated with the communicator device for alarm events and home-automation events, for example.

In some embodiments, the communicator device 2010 allows local network connections to be configured over a cellular communication path with the communicator device 2010. The system 2000 may thus be remotely managed. A communicator device 2010 that facilitate remote management can reduce the need to dispatch a installer/truck to a premises. For example, Wi-Fi credentials can be remotely managed and changed over the cellular network so that the communicator device 2010 can be reconnected to the Wi-Fi network without dispatching an installer/truck. Alternatively or additionally, other system configurations may be remotely selected or updated.

Figure 21:
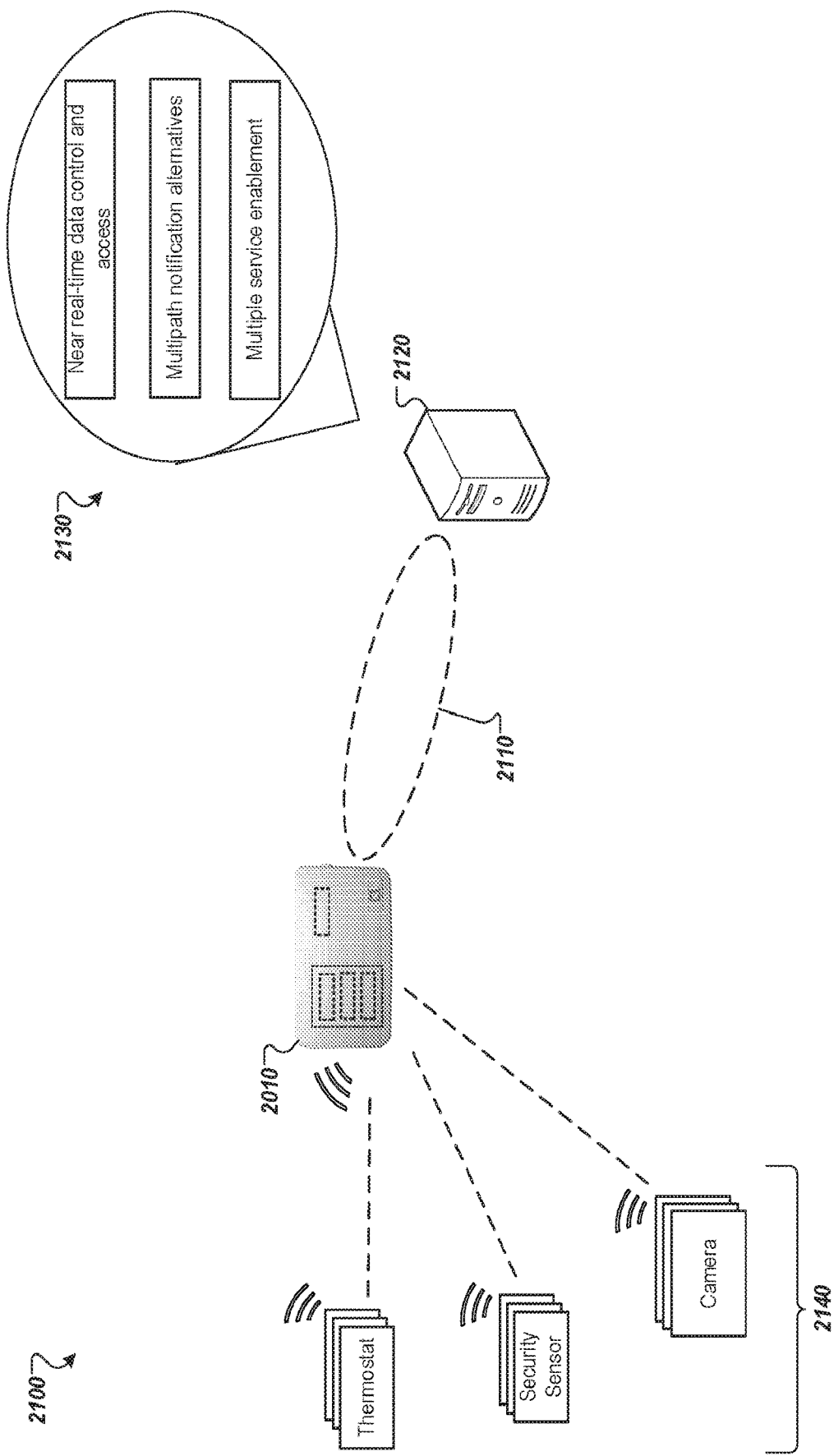
FIG. 21 depicts an example system within which the communicator device is configured to provide the services and features described throughout this document.

FIG. 21 depicts an example system 2100 within which the communicator device 2010 is configured to provide the services and features described throughout this document. The system 2100 can be similar to the system 2000 described above with regard to FIG. 20.

In the depicted example, the communicator device 2010 is configured to communicate with a variety of peripheral devices using a variety of communication protocols, standards, and communication interfaces (2140). For example, the communicator device 2010 is configured to communicate with cameras, such as cameras that include object detection, facial recognition features, and/or other image-based analysis and identification features. The communicator device 2010 is also configured to communicate securely with activity monitoring sensors and/or other sensors, such as through encrypted, obfuscated, and/or other secured communication techniques. Such sensors can include, for example, personal monitored devices, new security monitored devices (e.g., security monitored devices enrolled with the communicator device 2010 separately from an existing/separate security panel, such as a legacy security panel), new IoT sensors (e.g., IoT sensors enrolled with the communicator device 2010 separately from an existing/separate IoT hub/device), and/or other sensors/devices. The communicator device 2010 is also configured to communicate with various devices, sensors, and systems using industry standard protocols and devices, such as communications via BLUETOOTH, Wi-Fi, Z-wave, and/or others. The communicator device 2010 is also configured to communicate with voice and/or graphical peripherals, such as smart speaker devices (e.g., AMAZON ALEXA, GOOGLE HOME). In some instances, the communicator device 2010 provides authentication and/or control of various operations on the communicator device 2010 and/or connected systems (e.g., connected security panels, connected home automation panels, connected IoT hubs) via communication with voice and/or graphical peripherals, cameras with object detection and/or other detection features (e.g., facial recognition features), and/or others of the connected devices.

The communicator device 2010 is configured to communicate with a cloud based computer system 2120 via one or more communication networks 2110, such as over one or more IP networks (e.g., Ethernet, Wi-Fi, and/or other IP networks) and/or cellular networks (e.g., 4G LTE, 5G IoT, and/or other cellular networks).

The cloud based computer system 2120 can provide various services 2130 related to the communicator device 2010, such as real-time and/or near real-time data and control access, multipath notification alternatives, multiple service enablement, and/or other services. The services 2130 can be provided to a user across any of a variety of devices, such as the touchpad 2020, the mobile device 2030, and/or other user devices. The services 2130 can be provided to such devices when they are local and/or remote from the premises where the communicator device 2010 is located.

Figure 22:
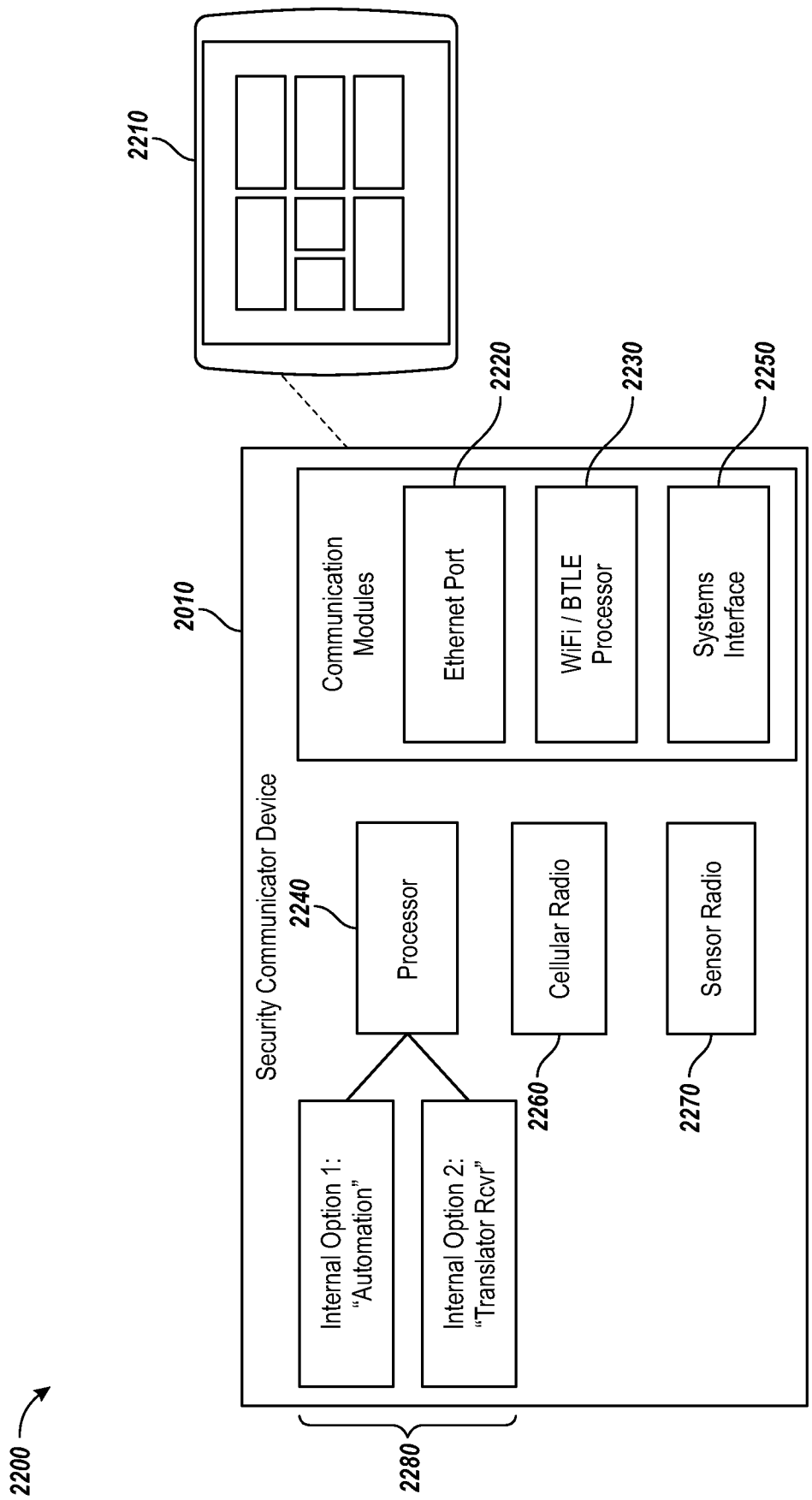
FIG. 22 is depicts an example system with a more detailed view of the components of the communicator device.

FIG. 22 is depicts an example system 2200 with a more detailed view of the components of the communicator device 2010. The example system 2200 can be similar to the systems 2000 and/or 2100 described above with regard to FIGS. 20 and 21, respectively.

In the depicted example, the communicator device 2010 includes an Ethernet port 2220, a Wi-Fi/BTLE processor 2230, a processor 2240, an interface 2250 to connect with security and/or automation systems (e.g., Vista, Concord, DSC, Networx, Simon, Napco-Legacy Panel, and/or others), and/or a cellular radio 2260. The communicator device 2010 can optionally include a sensor radio 2270, which can enable sensors to either be enrolled into the panel the communicator device 2010 is attached to via the interface 2250, or alternatively be monitored through the cloud platform (2120) independent of any monitored security offering. This can allow consumers having systems upgraded to include the communicator device 2010 to add a sensor that can be monitored without triggering alarms on the security system. Accordingly, the communicator device 2010 can support an ability to add both panel monitored and/or cloud monitored sensors to these legacy systems via the interface 2250. The communicator device 2010 can optionally include one or more internal options 2280 to enhance the processor 2240, such as an automation hardware chipset/module that is optimized to communicate with and/or process automation-based information and/or a translator receiver chipset/module that is optimized to receive translator communication. The system 2200 can additionally include a touchscreen interface 2210, such as interfaces provided by the touchpad 2020, the mobile device 2030, and/or other touch-based interface devices that are configured to communicate with the communicator device 2010.

Figure 23:
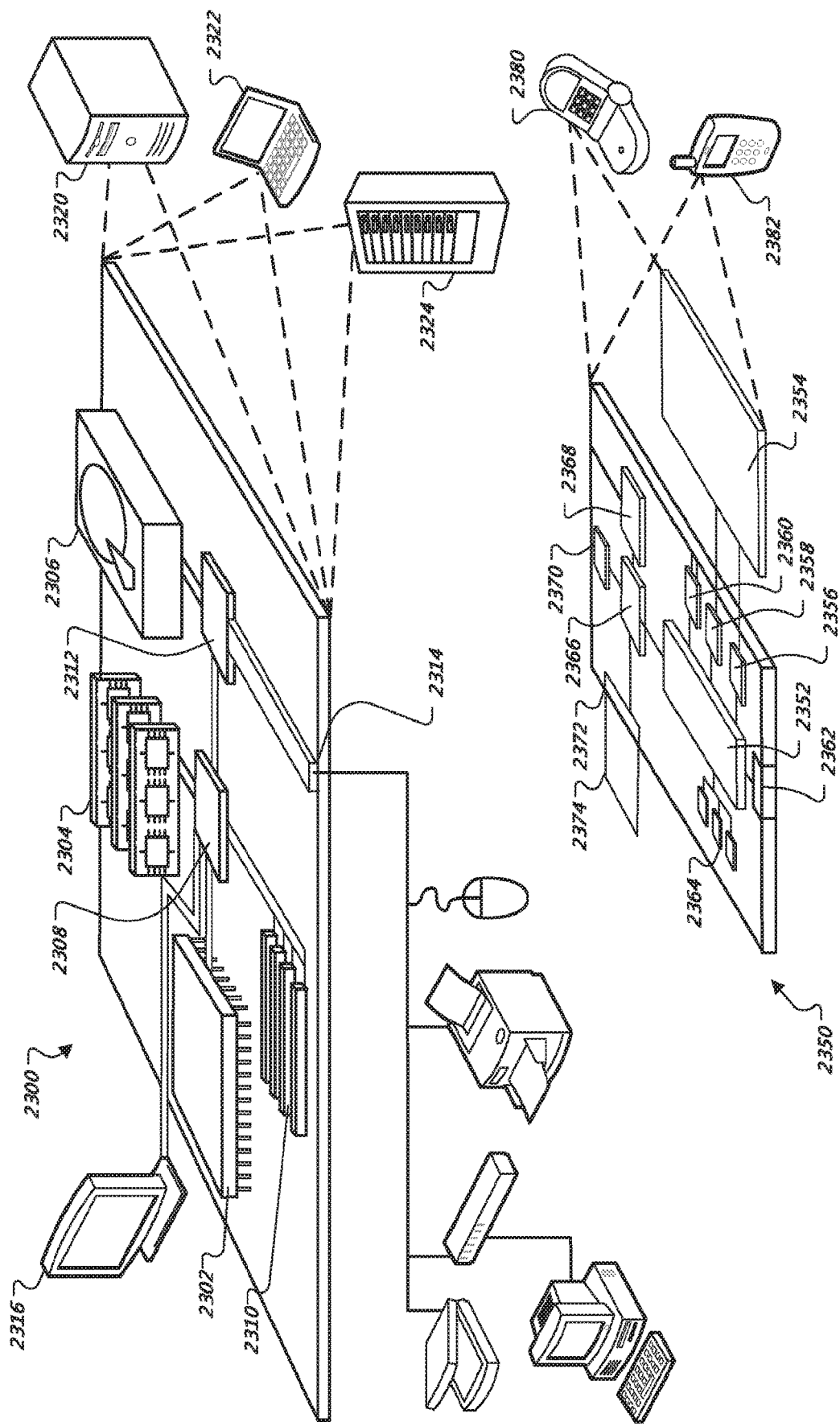
FIG. 23 is a block diagram of computing devices that may be used to implement the systems and methods described in this document, as either a client or as a server or plurality of servers.

FIG. 23 is a block diagram of computing devices 2300, 2350 that may be used to implement the systems and methods described in this document, as either a client or as a server or plurality of servers. Computing device 2300 is intended to represent various forms of digital computers, such as laptops, desktops, workstations, personal digital assistants, servers, blade servers, mainframes, and other appropriate computers. Computing device 2350 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 2300 includes a processor 2302, memory 2304, a storage device 2306, a high-speed interface 2308 connecting to memory 2304 and high-speed expansion ports 2310, and a low speed interface 2312 connecting to low speed bus 2314 and storage device 2306. Each of the components 2302, 2304, 2306, 2308, 2310, and 2312, are interconnected using various busses, and may be mounted on a common motherboard or in other manners as appropriate. The processor 2302 can process instructions for execution within the computing device 2300, including instructions stored in the memory 2304 or on the storage device 2306 to display graphical information for a GUI on an external input/output device, such as display 2316 coupled to high-speed interface 2308. In other implementations, multiple processors and/or multiple buses may be used, as appropriate, along with multiple memories and types of memory. Also, multiple computing devices 2300 may be connected, with each device providing portions of the necessary operations (e.g., as a server bank, a group of blade servers, or a multi-processor system).

The memory 2304 stores information within the computing device 2300. In one implementation, the memory 2304 is a volatile memory unit or units. In another implementation, the memory 2304 is a non-volatile memory unit or units. The memory 2304 may also be another form of computer-readable medium, such as a magnetic or optical disk.

The storage device 2306 is capable of providing mass storage for the computing device 2300. In one implementation, the storage device 2306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 2304, the storage device 2306, or memory on processor 2302.

The high-speed controller 2308 manages bandwidth-intensive operations for the computing device 2300, while the low speed controller 2312 manages lower bandwidth-intensive operations. Such allocation of functions is an example only. In one implementation, the high-speed controller 2308 is coupled to memory 2304, display 2316 (e.g., through a graphics processor or accelerator), and to high-speed expansion ports 2310, which may accept various expansion cards (not shown). In the implementation, low-speed controller 2312 is coupled to storage device 2306 and low-speed expansion port 2314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 2300 may be implemented in a number of different forms, as shown in the figure. For example, it may be implemented as a standard server 2320, or multiple times in a group of such servers. It may also be implemented as part of a rack server system 2324. In addition, it may be implemented in a personal computer such as a laptop computer 2322. Alternatively, components from computing device 2300 may be combined with other components in a mobile device (not shown), such as device 2350. Each of such devices may contain one or more of computing device 2300, 2350, and an entire system may be made up of multiple computing devices 2300, 2350 communicating with each other.

Computing device 2350 includes a processor 2352, memory 2364, an input/output device such as a display 2354, a communication interface 2366, and a transceiver 2368, among other components. The device 2350 may also be provided with a storage device, such as a microdrive or other device, to provide additional storage. Each of the components 2350, 2352, 2364, 2354, 2366, and 2368, are interconnected using various buses, and several of the components may be mounted on a common motherboard or in other manners as appropriate.

The processor 2352 can execute instructions within the computing device 2350, including instructions stored in the memory 2364. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 2350, such as control of user interfaces, applications run by device 2350, and wireless communication by device 2350.

Processor 2352 may communicate with a user through control interface 2358 and display interface 2356 coupled to a display 2354. The display 2354 may be, for example, a TFT (Thin-Film-Transistor Liquid Crystal Display) display or an OLED (Organic Light Emitting Diode) display, or other appropriate display technology. The display interface 2356 may comprise appropriate circuitry for driving the display 2354 to present graphical and other information to a user. The control interface 2358 may receive commands from a user and convert them for submission to the processor 2352. In addition, an external interface 2362 may be provide in communication with processor 2352, so as to enable near area communication of device 2350 with other devices. External interface 2362 may provided, for example, for wired communication in some implementations, or for wireless communication in other implementations, and multiple interfaces may also be used.

The memory 2364 stores information within the computing device 2350. The memory 2364 can be implemented as one or more of a computer-readable medium or media, a volatile memory unit or units, or a non-volatile memory unit or units. Expansion memory 2374 may also be provided and connected to device 850 through expansion interface 2372, which may include, for example, a SIMM (Single In Line Memory Module) card interface. Such expansion memory 2374 may provide extra storage space for device 2350, or may also store applications or other information for device 2350. Specifically, expansion memory 2374 may include instructions to carry out or supplement the processes described above, and may include secure information also. Thus, for example, expansion memory 2374 may be provide as a security module for device 2350, and may be programmed with instructions that permit secure use of device 2350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 2364, expansion memory 2374, or memory on processor 2352 that may be received, for example, over transceiver 2368 or external interface 2362.

Device 2350 may communicate wirelessly through communication interface 2366, which may include digital signal processing circuitry where necessary. Communication interface 2366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 2368. In addition, short-range communication may occur, such as using a Bluetooth, WiFi, or other such transceiver (not shown). In addition, GPS (Global Positioning System) receiver module 2370 may provide additional navigation- and location-related wireless data to device 2350, which may be used as appropriate by applications running on device 2350.

Device 2350 may also communicate audibly using audio codec 2360, which may receive spoken information from a user and convert it to usable digital information. Audio codec 2360 may likewise generate audible sound for a user, such as through a speaker, e.g., in a handset of device 2350. Such sound may include sound from voice telephone calls, may include recorded sound (e.g., voice messages, music files, etc.) and may also include sound generated by applications operating on device 2350.

The computing device 2350 may be implemented in a number of different forms, as shown in the figure. For example, it may be implemented as a cellular telephone 2380. It may also be implemented as part of a smartphone 2382, personal digital assistant, or other similar mobile device.

Additionally computing device 2300 or 2350 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for providing integrated security control, the system comprising:
    a security cloud server;
    a user control device; and
    a security communicator device configured to communicate with the security cloud server via one or more networks, the security communicator device configured to be connected to an existing security panel at a premises and further configured to perform operations comprising:
        receiving a signal from the existing security panel, the signal representative of an existing device connected to the existing security panel;
        transmitting the signal to the security cloud server;
        receiving a peripheral device signal representative of a peripheral device connected to the security communicator device;
        transmitting the peripheral device signal to the security cloud server;
        receiving a control signal from the security cloud server, the control signal including information about a security action determined based on the signal and the peripheral device signal;
        controlling the existing security panel using the control signal;
        connecting to the user control device; and
        transmitting the control signal to the user control device, the control signal being usable to generate an integrated control interface at the user control device.

2. The system of claim 1, wherein the operations further comprises:
    receiving a user input from the user control device, the user input received through the integrated control interface.

3. The system of claim 1, wherein the integrated control interface includes a blend of information about the existing device and information about the peripheral device.

4. The system of claim 1, wherein the user control device is a portable device.

5. The system of claim 1, wherein the user control device is connected to the security communicator device through a local network access device.

6. The system of claim 1, wherein controlling the existing security panel comprises:
transmitting the control signal to the existing security panel, the control signal usable by the existing security panel to control the existing device.

7. The system of claim 1, wherein the operations further comprises:
controlling the peripheral device based on the control signal.

8. The system of claim 1, wherein the operations further comprises:
translating the signal to a modified signal, the modified signal configured to be compatible with a protocol of the security communicator device.

9. The system of claim 1, wherein the operations further comprises:
converting the control signal to a modified control signal, the modified control signal configured to be compatible with a protocol of the existing security panel.

10. The system of claim 1, wherein the existing device and the peripheral device is arranged in a security zone being independently monitored and controlled.

11. The system of claim 1, wherein the security communicator device is connected to one of data bus and/or telephone line of the existing security panel.

12. The system of claim 1, wherein the networks include one or more of an Ethernet communication, a wireless communication, and a cellular communication.

13. The system of claim 1, wherein the security communicator device includes a local area network (LAN) interface.

14. The system of claim 1, wherein the security communicator device includes a plurality of communication interfaces, the security communicator device configured to select a communication interface from the plurality of communication interfaces for connecting to the security cloud server or the user control device.

15. The system of claim 14, wherein the security communicator device is configured to communicate at least one of security events, alarms, or home automation events to the security cloud server or the user control device via the selected communication interface.

16. The system of claim 14, wherein the security communicator device is configured to select a communication interface based on at least one of availability, quality, speed, or cost of utilizing a communication path associated with the communication interface.

17. The system of claim 14, wherein the security communicator device is configured to select an available communication interface to maintain a connection to the security cloud server.

18. The system of claim 1, wherein the existing device connected to the existing security panel is a sensor.

19. The system of claim 1, wherein the security communicator device is wirelessly connected to the existing security panel.

20. The system of claim 1, wherein the peripheral device connected to the security communicator device is one of an automated lock, alarm, motion detector, lighting, security camera, glass break detector, thermostat, or garage door controller.

* * * * *